US011913254B2

(12) United States Patent
Allen et al.

(10) Patent No.: US 11,913,254 B2
(45) Date of Patent: Feb. 27, 2024

(54) ELECTRO-MECHANICAL LOCK CORE

(71) Applicant: dormakaba USA Inc., Reamstown, PA (US)

(72) Inventors: Brendon Allen, Indianapolis, IN (US); Street Anthony Barnett, III, Whitestown, IN (US); Michael Hans Viklund, Indianapolis, IN (US); John Andrew Snodgrass, Indianapolis, IN (US)

(73) Assignee: dormakaba USA, Inc., Indianapolis, IN (US)

( * ) Notice: Subject to any disclaimer, the term of this patent is extended or adjusted under 35 U.S.C. 154(b) by 717 days.

(21) Appl. No.: 16/643,540

(22) PCT Filed: Sep. 7, 2018

(86) PCT No.: PCT/US2018/050117

§ 371 (c)(1),
(2) Date: Feb. 29, 2020

(87) PCT Pub. No.: WO2019/051337

PCT Pub. Date: Mar. 14, 2019

(65) Prior Publication Data

US 2020/0199911 A1 Jun. 25, 2020

Related U.S. Application Data

(60) Provisional application No. 62/556,195, filed on Sep. 8, 2017.

(51) Int. Cl.

| | |
|---|---|
| ***E05B 47/00*** | (2006.01) |
| ***E05B 47/06*** | (2006.01) |
| ***E05B 9/08*** | (2006.01) |

(52) U.S. Cl.
CPC .......... *E05B 47/0012* (2013.01); *E05B 9/086* (2013.01); *E05B 47/068* (2013.01);
(Continued)

(58) Field of Classification Search
CPC .. E05B 63/0056; E05B 17/044; E05B 17/045; E05B 13/005; E05B 13/101;
(Continued)

(56) References Cited

U.S. PATENT DOCUMENTS 3,298,211 A * 1/1967 Russell .................. E05B 9/086 70/369
3,347,072 A 10/1967 Rose
(Continued)

FOREIGN PATENT DOCUMENTS

CN 1056921 A 12/1991
CN 1181121 A 5/1998
(Continued)

OTHER PUBLICATIONS

International Search Report and Written Opinion, ISA/US, PCT/US19/27220, dated Jun. 10, 2019, 13 pgs.
(Continued)

*Primary Examiner* — Alyson M Merlino
(74) *Attorney, Agent, or Firm* — Faegre Drinker Biddle & Reath LLP

(57) ABSTRACT

An interchangeable electro-mechanical lock core for use with a lock device having a locked state and an unlocked state is disclosed. The interchangeable electro-mechanical lock core may include a moveable plug having a first position relative to a lock core body which corresponds to the lock device being in the locked state and a second position relative to a lock core body which corresponds to the lock device being in the unlocked state. The interchangeable electro-mechanical lock core may include a core keeper
(Continued)

moveably coupled to a lock core body. The core keeper may be positionable in a retain position wherein the core keeper extends beyond an envelope of lock core body to hold the lock core body in an opening of the lock device and a remove position wherein the core keeper is retracted relative to the envelope of the lock core body to permit removal.

19 Claims, 45 Drawing Sheets

(52) U.S. Cl.
CPC ....... *E05B 47/0615* (2013.01); *E05B 47/0642* (2013.01); *E05B 2047/0091* (2013.01); *E05B 2047/0094* (2013.01)

(58) Field of Classification Search
CPC ..... E05B 2047/0023; E05B 2047/0026; E05B 9/086; E05B 47/0615; E05B 47/0642; E05B 47/068; E05B 47/0626; E05B 47/0634; Y10T 70/7661
See application file for complete search history.

(56) References Cited

U.S. PATENT DOCUMENTS 3,824,817 A 7/1974 Orr
3,905,213 A 9/1975 Roberts
3,990,283 A 11/1976 Nelson
4,386,510 A 6/1983 Best et al.
4,484,462 A 11/1984 Berkowitz
RE31,910 E 6/1985 Oliver
4,526,256 A 7/1985 Urdal
4,745,785 A 5/1988 Othmar
4,747,281 A 5/1988 Monahan
4,789,859 A 12/1988 Clarkson et al.
4,850,210 A * 7/1989 Adler ...................... E05B 9/086 70/383
4,876,783 A 10/1989 Campion et al.
4,972,694 A 11/1990 Aulbers et al.
4,995,249 A 2/1991 Preissler et al.
4,998,422 A 3/1991 Borgmann et al.
4,998,423 A 3/1991 Hsu
5,010,753 A 4/1991 Boris, Jr.
5,044,180 A 9/1991 Horst
5,121,618 A 6/1992 Scott
5,209,087 A 5/1993 Cox
5,235,832 A 8/1993 Lux et al.
5,367,295 A 11/1994 Gokcebay et al.
5,507,162 A 4/1996 Chhatwal
5,552,777 A 9/1996 Gokcebay et al.
5,654,696 A 8/1997 Barrett et al.
5,682,779 A 11/1997 Dolev
5,701,773 A 12/1997 Markisello
5,749,253 A 5/1998 Glick et al.
5,752,399 A 5/1998 Shen
5,752,400 A 5/1998 Kim
5,813,260 A 9/1998 Widen
5,816,085 A 10/1998 Winardi et al.
5,839,305 A 11/1998 Aston
5,839,307 A 11/1998 Field et al.
5,921,123 A 7/1999 Schwarzkopf et al.
5,931,030 A 8/1999 Chen
5,933,086 A 8/1999 Tischendorf et al.
5,974,912 A 11/1999 Cheng et al.
6,000,609 A 12/1999 Gokcebay et al.
6,014,877 A 1/2000 Shen
6,035,673 A 3/2000 Harrison
6,125,673 A 10/2000 Luker
6,158,259 A 12/2000 Schmitz et al.
6,227,020 B1 5/2001 Lerchner
6,264,256 B1 7/2001 Hankel et al.
6,292,893 B1 9/2001 Micali
6,317,313 B1 11/2001 Mosgrove et al.
6,334,347 B1 1/2002 Iscla
6,337,618 B1 1/2002 Craig et al.
6,338,261 B1 1/2002 Liu
6,363,762 B1 4/2002 Kueng
6,370,928 B1 4/2002 Chies et al.
6,374,653 B1 4/2002 Gokcebay et al.
6,382,006 B1 5/2002 Field et al.
6,384,711 B1 5/2002 Cregger et al.
6,412,321 B1 7/2002 Aramburu et al.
6,442,986 B1 9/2002 Russell et al.
6,463,773 B1 10/2002 Dimig
6,474,122 B2 11/2002 Davis
6,523,377 B1 2/2003 Vonlanthen
6,552,650 B1 4/2003 Gokcebay et al.
6,554,326 B1 4/2003 Goldman
6,564,601 B2 5/2003 Hyatt, Jr.
6,581,426 B2 6/2003 Bates et al.
6,604,394 B2 8/2003 Davis
6,615,625 B2 9/2003 Davis
6,668,606 B1 12/2003 Russell et al.
6,705,140 B1 3/2004 Dimig et al.
6,708,539 B1 3/2004 Widen
6,718,806 B2 4/2004 Davis
6,764,013 B2 7/2004 Ben-Aissa
6,766,673 B2 7/2004 Gast et al.
6,786,070 B1 9/2004 Dimig et al.
6,807,834 B2 10/2004 Tsai
6,822,552 B2 11/2004 Liden et al.
6,826,935 B2 12/2004 Gokcebay et al.
6,840,072 B2 1/2005 Russell et al.
6,848,286 B2 2/2005 Dimig
6,865,916 B2 3/2005 Goldman
6,880,376 B1 4/2005 Ko
6,927,670 B1 8/2005 Gokcebay et al.
6,967,562 B2 11/2005 Menard et al.
6,973,576 B2 12/2005 Giobbi
6,975,202 B1 12/2005 Rodriguez et al.
7,012,503 B2 3/2006 Nielsen
7,021,092 B2 4/2006 Loughlin et al.
7,036,344 B2 5/2006 Gast et al.
7,042,334 B2 5/2006 Mosgrove et al.
7,061,367 B2 6/2006 Mosgrove et al.
7,099,474 B1 8/2006 Liden et al.
7,111,165 B2 9/2006 Liden et al.
7,114,357 B2 10/2006 Armstrong et al.
7,123,127 B2 10/2006 Mosgrove et al.
7,205,882 B2 4/2007 Libin
7,222,508 B2 5/2007 Dickhans et al.
7,229,013 B2 6/2007 Ben-Aissa
7,251,474 B2 7/2007 Engstrom et al.
7,278,025 B2 10/2007 Saito et al.
7,296,447 B2 11/2007 Priest et al.
7,305,560 B2 12/2007 Giobbi
7,334,443 B2 2/2008 Meekma et al.
7,337,315 B2 2/2008 Micali
7,353,396 B2 4/2008 Micali et al.
7,363,788 B2 4/2008 Dimig et al.
7,380,279 B2 5/2008 Prokupets et al.
7,424,812 B2 9/2008 Loughlin et al.
7,434,426 B2 10/2008 Loughlin et al.
7,437,755 B2 10/2008 Farino et al.
7,446,644 B2 11/2008 Schaffzin et al.
7,471,199 B2 12/2008 Zimmerman et al.
7,472,280 B2 12/2008 Giobbi
7,591,160 B2 9/2009 Keller
7,600,129 B2 10/2009 Libin et al.
7,624,280 B2 11/2009 Oskari
7,624,606 B1 12/2009 Huang et al.
7,628,048 B2 12/2009 Huang et al.
7,640,773 B2 1/2010 Bellamy et al.
7,660,994 B2 2/2010 Libin et al.
7,673,481 B2 3/2010 Amir
7,690,231 B1 4/2010 Field et al.
7,694,542 B2 4/2010 Loughlin et al.
7,706,778 B2 4/2010 Lowe
7,712,342 B2 5/2010 Loughlin et al.
7,716,486 B2 5/2010 Libin et al.
7,802,293 B2 9/2010 Boyer et al.
7,822,989 B2 10/2010 Libin et al.

(56) References Cited

U.S. PATENT DOCUMENTS

| | | | |
|---|---|---|---|
| 7,845,201 | B2 | 12/2010 | Meyerle et al. |
| 7,845,202 | B2 | 12/2010 | Padilla et al. |
| 7,870,769 | B2 | 1/2011 | Andersson |
| 7,870,770 | B2 | 1/2011 | Blanch |
| 7,874,190 | B2 | 1/2011 | Krisch et al. |
| 7,905,125 | B2 | 3/2011 | Herdman |
| 7,934,406 | B2 | 5/2011 | Loughlin et al. |
| 7,958,759 | B2 | 6/2011 | Herdman |
| 7,966,854 | B2 | 6/2011 | Imedio Ocana |
| 7,980,106 | B2 | 7/2011 | Huang et al. |
| 7,992,346 | B2 | 8/2011 | Finke |
| 8,011,217 | B2 | 9/2011 | Marschalek et al. |
| 8,015,597 | B2 | 9/2011 | Libin et al. |
| 8,028,553 | B2 | 10/2011 | Lange |
| 8,035,478 | B2 | 10/2011 | Lee |
| 8,047,027 | B2 | 11/2011 | Loughlin et al. |
| 8,070,061 | B2 | 12/2011 | Habraken |
| 8,074,271 | B2 | 12/2011 | Davis et al. |
| 8,074,479 | B2 | 12/2011 | Harley |
| 8,079,240 | B2 | 12/2011 | Brown et al. |
| 8,122,746 | B2 | 2/2012 | Hyatt, Jr. |
| 8,144,941 | B2 | 3/2012 | Adams et al. |
| 8,151,611 | B2 | 4/2012 | Herdman |
| 8,161,783 | B2 | 4/2012 | Huang et al. |
| 8,166,532 | B2 | 4/2012 | Chowdhury et al. |
| 8,222,993 | B2 | 7/2012 | Bliding et al. |
| 8,256,254 | B2 | 9/2012 | Bellamy |
| 8,261,319 | B2 | 9/2012 | Libin et al. |
| 8,272,241 | B2 | 9/2012 | Brown et al. |
| 8,276,414 | B2 | 10/2012 | Luo |
| 8,325,039 | B2 | 12/2012 | Picard et al. |
| 8,331,544 | B2 | 12/2012 | Kraus et al. |
| 8,336,349 | B2 | 12/2012 | Thimmappa et al. |
| 8,352,730 | B2 | 1/2013 | Giobbi |
| 8,368,507 | B2 | 2/2013 | Conreux et al. |
| 8,370,911 | B1 | 2/2013 | Mallard |
| 8,375,753 | B2 | 2/2013 | Goldman |
| 8,419,083 | B2 | 4/2013 | Burmesch |
| 8,447,969 | B2 | 5/2013 | Robinton et al. |
| 8,448,484 | B2 | 5/2013 | Huang et al. |
| 8,453,481 | B2 | 6/2013 | Meekma |
| 8,456,277 | B2 | 6/2013 | Gillert et al. |
| 8,459,071 | B2 | 6/2013 | Andersson |
| 8,466,773 | B2 | 6/2013 | Willgert |
| 8,468,861 | B2 | 6/2013 | Pukari et al. |
| 8,482,378 | B2 | 7/2013 | Sadighi et al. |
| 8,482,379 | B2 | 7/2013 | Conreux et al. |
| 8,490,443 | B2 | 7/2013 | Gokcebay |
| 8,490,444 | B2 | 7/2013 | Saari |
| 8,495,898 | B2 | 7/2013 | Gokcebay |
| 8,511,552 | B2 | 8/2013 | Habraken |
| 8,516,865 | B2 | 8/2013 | Ferreira Sanchez |
| 8,525,686 | B2 | 9/2013 | Burdenko |
| 8,528,373 | B2 | 9/2013 | Hyatt et al. |
| 8,539,802 | B2 | 9/2013 | Meyerle |
| 8,543,684 | B2 | 9/2013 | Hulusi et al. |
| 8,544,303 | B2 | 10/2013 | Andersson |
| 8,552,875 | B2 | 10/2013 | Burdenko |
| 8,581,690 | B2 | 11/2013 | Lappalainen et al. |
| 8,593,249 | B2 | 11/2013 | Bliding et al. |
| 8,604,903 | B2 | 12/2013 | Bowen et al. |
| 8,616,031 | B2 | 12/2013 | Ullrich et al. |
| 8,620,268 | B2 | 12/2013 | Metivier |
| 8,628,019 | B2 | 1/2014 | Audebert et al. |
| 8,635,462 | B2 | 1/2014 | Ullmann |
| 8,640,513 | B2 | 2/2014 | Goren et al. |
| 8,640,514 | B2 | 2/2014 | Goren et al. |
| 8,643,469 | B2 | 2/2014 | Haeberli |
| 8,683,833 | B2 | 4/2014 | Marschalek et al. |
| 8,689,013 | B2 | 4/2014 | Habraken |
| 8,712,365 | B2 | 4/2014 | Metivier |
| 8,720,238 | B1 | 5/2014 | Davis |
| 8,730,004 | B2 | 5/2014 | Elfstrom et al. |
| 8,736,418 | B2 | 5/2014 | Bozionek et al. |
| 8,776,557 | B2 | 7/2014 | Wang |
| 8,776,561 | B1 | 7/2014 | Jones |
| 8,780,201 | B1 | 7/2014 | Scalisi et al. |
| 8,787,902 | B2 | 7/2014 | Kim |
| 8,793,784 | B2 | 7/2014 | Metivier et al. |
| 8,794,042 | B2 | 8/2014 | Herdman |
| 8,800,402 | B2 | 8/2014 | Weum |
| 8,805,434 | B2 | 8/2014 | Vasudevan |
| 8,823,795 | B1 | 9/2014 | Scalisi et al. |
| 8,836,470 | B2 | 9/2014 | Pineau et al. |
| 8,840,020 | B2 | 9/2014 | Litz et al. |
| 8,842,180 | B1 | 9/2014 | Kasmir et al. |
| 8,854,177 | B2 | 10/2014 | Pineau et al. |
| 8,872,915 | B1 | 10/2014 | Scalisi et al. |
| 8,881,252 | B2 | 11/2014 | Van et al. |
| 8,893,420 | B2 | 11/2014 | Milde et al. |
| 8,907,763 | B2 | 12/2014 | Pineau et al. |
| 8,912,879 | B2 | 12/2014 | Fyke et al. |
| 8,919,024 | B2 | 12/2014 | Milde, Jr. |
| 8,922,333 | B1 | 12/2014 | Kirkjan |
| 8,928,457 | B2 | 1/2015 | Jin et al. |
| 8,931,195 | B2 | 1/2015 | Milde, Jr. |
| 8,933,778 | B2 | 1/2015 | Birkel et al. |
| 8,937,659 | B1 | 1/2015 | Scalisi et al. |
| 8,941,465 | B2 | 1/2015 | Pineau et al. |
| 8,941,736 | B1 | 1/2015 | Scalisi |
| 8,947,530 | B1 | 2/2015 | Scalisi |
| 8,953,040 | B1 | 2/2015 | Scalisi et al. |
| 8,970,344 | B2 | 3/2015 | Payson et al. |
| 8,973,417 | B2 | 3/2015 | Bench et al. |
| 8,990,889 | B2 | 3/2015 | Van et al. |
| D727,769 | S | 4/2015 | Scalisi |
| 9,002,536 | B2 | 4/2015 | Hatton |
| 9,010,163 | B2 | 4/2015 | Romero |
| 9,010,650 | B2 | 4/2015 | Audebert et al. |
| 9,013,575 | B2 | 4/2015 | Scalisi |
| 9,019,067 | B2 | 4/2015 | Bryla et al. |
| 9,020,854 | B2 | 4/2015 | Giobbi |
| D729,678 | S | 5/2015 | Scalisi |
| 9,024,759 | B2 | 5/2015 | Uyeda et al. |
| 9,027,372 | B2 | 5/2015 | Hickman |
| 9,049,352 | B2 | 6/2015 | Scalisi et al. |
| 9,051,759 | B2 | 6/2015 | Herdman |
| 9,053,622 | B2 | 6/2015 | Scalisi |
| 9,055,202 | B1 | 6/2015 | Scalisi et al. |
| 9,057,210 | B2 | 6/2015 | Dumas et al. |
| 9,058,738 | B1 | 6/2015 | Scalisi |
| 9,060,103 | B2 | 6/2015 | Scalisi |
| 9,060,104 | B2 | 6/2015 | Scalisi |
| 9,065,987 | B2 | 6/2015 | Kasmir et al. |
| 9,077,716 | B2 | 7/2015 | Myers et al. |
| 9,085,917 | B2 | 7/2015 | Kriete et al. |
| 9,087,246 | B1 | 7/2015 | Chin et al. |
| 9,094,584 | B2 | 7/2015 | Scalisi et al. |
| 9,098,825 | B2 | 8/2015 | Bashkin |
| 9,098,953 | B2 | 8/2015 | Kincaid et al. |
| 9,113,051 | B1 | 8/2015 | Scalisi |
| 9,113,052 | B1 | 8/2015 | Scalisi et al. |
| 9,118,819 | B1 | 8/2015 | Scalisi et al. |
| 9,122,856 | B2 | 9/2015 | Litz et al. |
| 9,129,457 | B2 | 9/2015 | Sumcad et al. |
| 9,133,647 | B2 | 9/2015 | Oh et al. |
| 9,140,509 | B2 | 9/2015 | Sullivan et al. |
| 9,141,090 | B2 | 9/2015 | Kalous et al. |
| 9,148,416 | B2 | 9/2015 | Tse |
| 9,148,417 | B2 | 9/2015 | Fieweger |
| 9,158,288 | B2 | 10/2015 | Libin et al. |
| 9,160,987 | B1 | 10/2015 | Kasmir et al. |
| 9,165,444 | B2 | 10/2015 | Scalisi |
| 9,172,920 | B1 | 10/2015 | Kasmir et al. |
| 9,172,921 | B1 | 10/2015 | Scalisi et al. |
| 9,172,922 | B1 | 10/2015 | Kasmir et al. |
| 9,179,107 | B1 | 11/2015 | Scalisi et al. |
| 9,179,108 | B1 | 11/2015 | Scalisi et al. |
| 9,179,109 | B1 | 11/2015 | Kasmir et al. |
| 9,183,683 | B2 | 11/2015 | Osman et al. |
| 9,196,104 | B2 | 11/2015 | Dumas et al. |
| 9,196,133 | B2 | 11/2015 | Scalisi et al. |
| 9,197,867 | B1 | 11/2015 | Scalisi et al. |
| 9,206,620 | B2 | 12/2015 | Karsil et al. |

(56) References Cited

U.S. PATENT DOCUMENTS

| | | | |
|---|---|---|---|
| 9,208,628 | B2 | 12/2015 | Gokcebay |
| 9,217,616 | B2 | 12/2015 | Sullivan et al. |
| 9,218,696 | B2 | 12/2015 | Dumas et al. |
| 9,222,282 | B2 | 12/2015 | Russo et al. |
| 9,222,284 | B2 | 12/2015 | Gokcebay |
| D747,384 | S | 1/2016 | Scalisi |
| D747,385 | S | 1/2016 | Scalisi |
| D747,640 | S | 1/2016 | Scalisi |
| 9,230,424 | B1 | 1/2016 | Scalisi et al. |
| 9,237,318 | B2 | 1/2016 | Kasmir et al. |
| 9,247,219 | B2 | 1/2016 | Kasmir et al. |
| 9,251,360 | B2 | 2/2016 | Meyer et al. |
| 9,253,176 | B2 | 2/2016 | Ford et al. |
| 9,253,455 | B1 | 2/2016 | Harrison et al. |
| 9,258,281 | B2 | 2/2016 | Metivier et al. |
| 9,273,492 | B2 | 3/2016 | Gokcebay |
| 9,292,985 | B2 | 3/2016 | Ahearn et al. |
| 9,303,935 | B2 | 4/2016 | Milde, Jr. |
| 9,305,412 | B2 | 4/2016 | Winkelman |
| 9,307,403 | B2 | 4/2016 | Neafsey et al. |
| 9,310,147 | B2 | 4/2016 | Milde, Jr. |
| 9,312,926 | B2 | 4/2016 | Neafsey et al. |
| 9,316,025 | B2 | 4/2016 | Lien |
| 9,316,454 | B2 | 4/2016 | Milde, Jr. |
| 9,317,985 | B2 | 4/2016 | Tehranchi et al. |
| 9,317,986 | B2 | 4/2016 | Tehranchi et al. |
| 9,322,194 | B2 | 4/2016 | Cheng et al. |
| 9,322,201 | B1 | 4/2016 | Cheng et al. |
| 9,326,094 | B2 | 4/2016 | Johnson et al. |
| D755,037 | S | 5/2016 | Czerwinski et al. |
| 9,328,533 | B2 | 5/2016 | Wu |
| 9,328,535 | B2 | 5/2016 | Baker et al. |
| 9,330,514 | B2 | 5/2016 | Kuenzi et al. |
| 9,332,377 | B2 | 5/2016 | Agardh et al. |
| 9,336,637 | B2 | 5/2016 | Neil et al. |
| 9,342,936 | B2 | 5/2016 | Scalisi |
| 9,349,113 | B2 | 5/2016 | Bashkin |
| 9,351,100 | B2 | 5/2016 | Tarnhed et al. |
| 9,353,551 | B2 | 5/2016 | Martinez et al. |
| 9,359,794 | B2 | 6/2016 | Cheng |
| 9,363,803 | B2 | 6/2016 | Seo et al. |
| 9,369,454 | B2 | 6/2016 | Porzio et al. |
| 9,369,455 | B2 | 6/2016 | Huang et al. |
| 9,374,349 | B1 | 6/2016 | Corlett et al. |
| 9,378,598 | B2 | 6/2016 | Dumas et al. |
| 9,378,599 | B2 | 6/2016 | Lee |
| 9,382,739 | B1 | 7/2016 | Johnson et al. |
| 9,390,572 | B2 | 7/2016 | Almomani |
| 9,395,133 | B2 | 7/2016 | Milde et al. |
| 9,406,178 | B2 | 8/2016 | Pukari |
| 9,426,653 | B2 | 8/2016 | Becker et al. |
| 9,437,062 | B2 | 9/2016 | Ahearn et al. |
| 9,437,063 | B2 | 9/2016 | Schoenfelder et al. |
| 9,443,362 | B2 | 9/2016 | Singh |
| 9,443,365 | B2 | 9/2016 | Ahearn et al. |
| 9,447,609 | B2 | 9/2016 | Johnson et al. |
| 9,449,443 | B2 | 9/2016 | Libin et al. |
| 9,449,448 | B2 | 9/2016 | Andersen |
| 9,454,889 | B2 | 9/2016 | Kerning |
| 9,462,470 | B2 | 10/2016 | Ehrensvard |
| 9,464,462 | B1 | 10/2016 | Liu |
| 9,467,859 | B2 | 10/2016 | Moss et al. |
| 9,470,017 | B1 | 10/2016 | Cheng et al. |
| 9,470,018 | B1 | 10/2016 | Cheng et al. |
| 9,472,034 | B2 | 10/2016 | Ahearn et al. |
| 9,476,226 | B2 | 10/2016 | Wheeler et al. |
| 9,478,084 | B1 | 10/2016 | Robinson |
| 9,489,511 | B2 | 11/2016 | Rodzevski et al. |
| 9,489,787 | B1 | 11/2016 | Ives-Halperin et al. |
| 9,500,006 | B2 | 11/2016 | Dayanikli et al. |
| 9,501,880 | B2 | 11/2016 | Handville et al. |
| 9,501,883 | B2 | 11/2016 | Handville et al. |
| 9,508,206 | B2 | 11/2016 | Ahearn et al. |
| 9,508,239 | B1 | 11/2016 | Harrison et al. |
| 9,509,719 | B2 | 11/2016 | Neely |
| 9,514,327 | B2 | 12/2016 | Ford |
| 9,524,594 | B2 | 12/2016 | Ouyang et al. |
| 9,524,601 | B1 | 12/2016 | Dumas |
| 9,528,294 | B2 | 12/2016 | Johnson et al. |
| 9,528,296 | B1 | 12/2016 | Cheng et al. |
| 9,530,262 | B2 | 12/2016 | Johnson |
| 9,530,264 | B2 | 12/2016 | Caterino et al. |
| 9,530,295 | B2 | 12/2016 | Johnson |
| 9,531,721 | B2 | 12/2016 | Neafsey et al. |
| 9,534,420 | B1 | 1/2017 | Cheng et al. |
| 9,536,359 | B1 | 1/2017 | Gokcebay |
| 9,536,363 | B2 | 1/2017 | Ahearn et al. |
| 9,540,848 | B1 | 1/2017 | Wu |
| 9,542,785 | B2 | 1/2017 | Meganck et al. |
| 9,546,504 | B2 | 1/2017 | Overgaard |
| 9,548,973 | B2 | 1/2017 | Hulusi et al. |
| 9,553,860 | B2 | 1/2017 | Meyer |
| 9,562,370 | B2 | 2/2017 | Ohl et al. |
| 9,567,773 | B2 | 2/2017 | Dore et al. |
| 9,574,372 | B2 | 2/2017 | Johnson et al. |
| 9,580,931 | B2 | 2/2017 | Myers et al. |
| 9,587,415 | B2 | 3/2017 | Walls et al. |
| 9,589,397 | B1 | 3/2017 | Christopher et al. |
| 9,589,403 | B2 | 3/2017 | Lingan et al. |
| 9,589,406 | B2 | 3/2017 | Borg et al. |
| 9,591,682 | B2 | 3/2017 | Astrand et al. |
| 9,593,522 | B1 | 3/2017 | Murar et al. |
| 9,595,148 | B2 | 3/2017 | Borg et al. |
| 9,613,476 | B2 | 4/2017 | Johnson |
| 9,613,483 | B2 | 4/2017 | Giobbi |
| 9,617,757 | B2 | 4/2017 | Lowder |
| 9,619,954 | B2 | 4/2017 | Allibhoy et al. |
| 9,624,695 | B1 | 4/2017 | Cheng et al. |
| 9,626,859 | B2 | 4/2017 | Ribas et al. |
| 9,631,400 | B2 | 4/2017 | Liu et al. |
| 9,640,001 | B1 | 5/2017 | Vazquez et al. |
| 9,640,004 | B2 | 5/2017 | Lowder |
| 9,644,398 | B1 | 5/2017 | Cheng et al. |
| 9,644,399 | B2 | 5/2017 | Johnson et al. |
| 9,644,400 | B1 | 5/2017 | Cheng et al. |
| 9,647,996 | B2 | 5/2017 | Johnson et al. |
| 9,652,913 | B2 | 5/2017 | Drako et al. |
| 9,652,917 | B2 | 5/2017 | Johnson et al. |
| 9,654,450 | B2 | 5/2017 | Ford et al. |
| 9,659,422 | B2 | 5/2017 | Lovelock et al. |
| 9,659,424 | B2 | 5/2017 | Huber et al. |
| 9,663,972 | B2 | 5/2017 | Ullrich et al. |
| 9,666,000 | B1 | 5/2017 | Schoenfelder et al. |
| 9,672,345 | B2 | 6/2017 | Davis et al. |
| 9,672,674 | B2 | 6/2017 | Meganck et al. |
| 9,679,429 | B2 | 6/2017 | Duncan et al. |
| 9,681,426 | B2 | 6/2017 | Seo et al. |
| 9,683,391 | B2 | 6/2017 | Johnson et al. |
| 9,683,392 | B1 | 6/2017 | Cheng et al. |
| 9,685,015 | B2 | 6/2017 | Johnson |
| 9,685,017 | B2 | 6/2017 | Johnson |
| 9,685,018 | B2 | 6/2017 | Johnson |
| 9,690,272 | B2 | 6/2017 | Chin et al. |
| 9,690,348 | B2 | 6/2017 | Chin et al. |
| 9,690,959 | B2 | 6/2017 | Chin et al. |
| 9,691,198 | B2 | 6/2017 | Cheng et al. |
| 9,691,205 | B2 | 6/2017 | Robinson |
| 9,691,207 | B2 | 6/2017 | Almomani |
| 9,695,616 | B2 | 7/2017 | Johnson et al. |
| 9,697,656 | B2 | 7/2017 | Trani |
| 9,697,657 | B2 | 7/2017 | Anderson et al. |
| 9,697,664 | B2 | 7/2017 | Ribas et al. |
| 9,704,314 | B2 | 7/2017 | Johnson et al. |
| 9,704,316 | B2 | 7/2017 | Kirkjan |
| 9,704,320 | B2 | 7/2017 | Johnson et al. |
| 9,705,265 | B2 | 7/2017 | Lowder |
| 9,706,365 | B2 | 7/2017 | Johnson et al. |
| 9,710,987 | B2 | 7/2017 | Scoggins et al. |
| 9,713,002 | B2 | 7/2017 | Roy et al. |
| 9,721,413 | B2 | 8/2017 | Dumas et al. |
| 9,722,756 | B2 | 8/2017 | Seo et al. |
| 9,725,927 | B1 | 8/2017 | Cheng |
| 9,726,448 | B1 | 8/2017 | Milde et al. |
| 9,727,328 | B2 | 8/2017 | Johnson |

(56) References Cited

U.S. PATENT DOCUMENTS

| | | | |
|---|---|---|---|
| 9,728,022 | B2 | 8/2017 | Gengler et al. |
| 9,728,023 | B2 | 8/2017 | Johnson |
| 9,736,284 | B2 | 8/2017 | Scalisi et al. |
| 9,739,555 | B2 | 8/2017 | Milde et al. |
| 9,741,186 | B1 | 8/2017 | Lemke |
| 9,743,049 | B2 | 8/2017 | Scalisi et al. |
| 9,747,735 | B1 | 8/2017 | Drako et al. |
| 9,747,737 | B2 | 8/2017 | Kuenzi |
| 9,747,739 | B2 | 8/2017 | Gengler et al. |
| 9,754,433 | B2 | 9/2017 | Lagimodiere et al. |
| 9,760,705 | B2 | 9/2017 | Davis et al. |
| 9,761,073 | B2 | 9/2017 | Cheng et al. |
| 9,761,074 | B2 | 9/2017 | Cheng et al. |
| 9,763,086 | B2 | 9/2017 | Benoit et al. |
| 9,767,267 | B2 | 9/2017 | Davis et al. |
| 9,767,630 | B1 | 9/2017 | Kazerani et al. |
| 9,767,632 | B2 | 9/2017 | Johnson |
| 9,769,161 | B2 | 9/2017 | Davis et al. |
| 9,769,435 | B2 | 9/2017 | Scalisi et al. |
| 9,773,364 | B2 | 9/2017 | Kerning et al. |
| 9,779,569 | B2 | 10/2017 | Yun |
| 9,781,599 | B2 | 10/2017 | Myers et al. |
| 9,786,133 | B2 | 10/2017 | Harrison et al. |
| 9,792,747 | B2 | 10/2017 | Baumgarte et al. |
| 9,797,166 | B2 | 10/2017 | Dore et al. |
| 9,799,183 | B2 | 10/2017 | Harrison et al. |
| 9,803,942 | B2 | 10/2017 | Milde, Jr. |
| 9,805,534 | B2 | 10/2017 | Ho et al. |
| 9,811,960 | B2 | 11/2017 | Voss |
| 9,818,247 | B2 | 11/2017 | Johnson |
| 9,826,561 | B2 | 11/2017 | Bolin et al. |
| 9,836,906 | B2 | 12/2017 | Carstens et al. |
| 9,841,743 | B2 | 12/2017 | Davis |
| 9,842,446 | B2 | 12/2017 | Vecchiotti et al. |
| 9,842,447 | B2 | 12/2017 | Badger, II |
| 9,847,020 | B2 | 12/2017 | Davis |
| 9,852,559 | B2 | 12/2017 | Rettig et al. |
| 9,852,562 | B2 | 12/2017 | Belhadia et al. |
| 9,852,567 | B2 | 12/2017 | Hild et al. |
| 9,860,928 | B2 | 1/2018 | Astrand et al. |
| 9,865,112 | B2 | 1/2018 | Maiwand et al. |
| 9,865,113 | B2 | 1/2018 | Maiwand et al. |
| 9,865,144 | B2 | 1/2018 | Trani |
| 9,870,460 | B2 | 1/2018 | Eberwine et al. |
| 9,870,665 | B2 | 1/2018 | Maiwand et al. |
| 9,879,932 | B2 | 1/2018 | Milde et al. |
| 9,883,370 | B2 | 1/2018 | Kerning et al. |
| 9,886,617 | B2 | 2/2018 | Rowe et al. |
| 9,886,806 | B2 | 2/2018 | Bashkin |
| 9,888,216 | B2 | 2/2018 | Scalisi et al. |
| 9,892,579 | B2 | 2/2018 | Ku |
| 9,898,880 | B2 | 2/2018 | Nagisetty et al. |
| 9,902,368 | B2 | 2/2018 | Maiwand et al. |
| 9,913,135 | B2 | 3/2018 | Perold et al. |
| 9,916,707 | B2 | 3/2018 | Vincent et al. |
| 9,916,746 | B2 | 3/2018 | Johnson et al. |
| 9,922,473 | B1 | 3/2018 | Haworth et al. |
| 9,922,481 | B2 | 3/2018 | Johnson et al. |
| 9,924,319 | B2 | 3/2018 | Hoyer et al. |
| 9,934,637 | B2 | 4/2018 | Ribas et al. |
| 9,940,491 | B2 | 4/2018 | Lim et al. |
| 9,940,768 | B2 | 4/2018 | Carstens et al. |
| 9,947,153 | B2 | 4/2018 | Bergerhoff et al. |
| 9,947,154 | B2 | 4/2018 | Davis et al. |
| 9,947,155 | B2 | 4/2018 | Trani |
| 9,947,158 | B2 | 4/2018 | Baumgarte et al. |
| 9,959,690 | B2 | 5/2018 | Zielinski et al. |
| 9,959,692 | B2 | 5/2018 | Hild et al. |
| 9,963,107 | B2 | 5/2018 | Murar et al. |
| 9,965,911 | B2 | 5/2018 | Wishne |
| 9,972,144 | B2 | 5/2018 | Klein et al. |
| 9,985,950 | B2 | 5/2018 | Caterino et al. |
| 9,997,036 | B2 | 6/2018 | Scalisi |
| 9,998,922 | B2 | 6/2018 | Robinton et al. |
| 10,008,057 | B2 | 6/2018 | Ives-Halperin et al. |
| 10,008,061 | B2 | 6/2018 | Klink et al. |
| 10,009,145 | B2 | 6/2018 | Seo et al. |
| 10,012,010 | B2 | 7/2018 | Baker et al. |
| 10,013,825 | B2 | 7/2018 | Belhadia et al. |
| 10,015,653 | B2 | 7/2018 | Lang et al. |
| 10,017,963 | B2 | 7/2018 | Johnson et al. |
| 10,026,249 | B2 | 7/2018 | Grandpre et al. |
| 10,026,253 | B2 | 7/2018 | Giobbi |
| 10,027,170 | B2 | 7/2018 | Holmstroem |
| 10,033,702 | B2 | 7/2018 | Ford et al. |
| 10,033,972 | B2 | 7/2018 | Almomani et al. |
| 10,037,525 | B2 | 7/2018 | Neafsey |
| 10,044,519 | B2 | 8/2018 | Kasmir et al. |
| 10,050,948 | B2 | 8/2018 | Lagerstedt et al. |
| 10,062,232 | B2 | 8/2018 | Allibhoy et al. |
| 10,062,251 | B2 | 8/2018 | Kasmir et al. |
| 10,074,224 | B2 | 9/2018 | Ho et al. |
| 10,083,559 | B2 | 9/2018 | Schoenfelder et al. |
| 10,083,560 | B2 | 9/2018 | Baumgarte et al. |
| 10,115,256 | B2 | 10/2018 | Davis |
| 10,125,519 | B1 | 11/2018 | Gengler et al. |
| 10,181,231 | B2 | 1/2019 | Kristensen et al. |
| 10,186,099 | B2 | 1/2019 | Ahearn et al. |
| 10,192,383 | B2 | 1/2019 | Aase |
| 10,249,120 | B2 | 4/2019 | Ahearn et al. |
| 10,264,433 | B2 | 4/2019 | Ahearn et al. |
| 10,282,930 | B2 | 5/2019 | Borg et al. |
| 10,349,279 | B2 | 7/2019 | Myers et al. |
| 10,360,743 | B2 | 7/2019 | Ahearn et al. |
| 10,366,551 | B2 | 7/2019 | Drako et al. |
| 10,453,280 | B2 | 10/2019 | Kontturi |
| 10,472,859 | B2 | 11/2019 | Ku |
| 10,490,005 | B2 | 11/2019 | Caterino et al. |
| 10,492,066 | B2 | 11/2019 | Tarmey et al. |
| 10,540,835 | B2 | 1/2020 | Kuenzi et al. |
| 10,554,644 | B2 | 2/2020 | Toepke et al. |
| 10,580,240 | B2 | 3/2020 | Caterino et al. |
| 11,339,589 | B2 * | 5/2022 | Allen .................. E05B 47/0642 |
| 11,447,980 | B2 | 9/2022 | Snodgrass |
| 11,466,473 | B2 * | 10/2022 | Barnett, III ......... E05B 47/0642 |
| 2002/0144526 | A1 | 10/2002 | Ming-Chih |
| 2003/0217574 | A1 | 11/2003 | Meis |
| 2004/0007032 | A1 | 1/2004 | Davis |
| 2004/0055346 | A1 | 3/2004 | Gillert |
| 2004/0069028 | A1 | 4/2004 | Dimig et al. |
| 2004/0107751 | A1 | 6/2004 | Hyatt |
| 2004/0154364 | A1 | 8/2004 | Dimig et al. |
| 2004/0255628 | A1 | 12/2004 | Meyerle |
| 2005/0050929 | A1 | 3/2005 | Meyerle |
| 2005/0127687 | A1 | 6/2005 | Dimig |
| 2006/0010945 | A1 | 1/2006 | Herdman |
| 2006/0059548 | A1 | 3/2006 | Hildre et al. |
| 2006/0170533 | A1 | 8/2006 | Chioiu et al. |
| 2007/0017265 | A1 | 1/2007 | Andersson |
| 2007/0200665 | A1 | 8/2007 | Studerus |
| 2007/0229257 | A1 | 10/2007 | Bliding et al. |
| 2008/0072636 | A1 | 3/2008 | Padilla et al. |
| 2008/0086844 | A1 | 4/2008 | Meyerle |
| 2008/0180211 | A1 | 7/2008 | Lien |
| 2008/0229793 | A1 | 9/2008 | Lange |
| 2009/0013736 | A1 | 1/2009 | Voosen |
| 2009/0127328 | A1 | 5/2009 | Aissa |
| 2009/0280862 | A1 | 11/2009 | Loughlin et al. |
| 2009/0320538 | A1 | 12/2009 | Pellaton |
| 2010/0011822 | A1 | 1/2010 | Imedio Ocana |
| 2010/0116007 | A1 | 5/2010 | Thimmappa et al. |
| 2010/0194526 | A1 | 8/2010 | Loughlin et al. |
| 2010/0194527 | A1 | 8/2010 | Loughlin et al. |
| 2010/0199733 | A1 | 8/2010 | Herdman |
| 2011/0232341 | A1 | 9/2011 | Herdman |
| 2011/0291798 | A1 | 12/2011 | Schibuk |
| 2012/0169461 | A1 | 7/2012 | Dubois, Jr. |
| 2012/0213362 | A1 | 8/2012 | Bliding et al. |
| 2012/0313383 | A1 | 12/2012 | Lundberg et al. |
| 2013/0008213 | A1 | 1/2013 | Brown et al. |
| 2013/0014552 | A1 | 1/2013 | Bench et al. |
| 2013/0015671 | A1 | 1/2013 | Calleberg |
| 2013/0061055 | A1 | 3/2013 | Schibuk |
| 2013/0063246 | A1 | 3/2013 | Kim |

(56) References Cited

U.S. PATENT DOCUMENTS

| | | | |
|---|---|---|---|
| 2013/0139561 | A1 | 6/2013 | Parto et al. |
| 2013/0212661 | A1 | 8/2013 | Neafsey et al. |
| 2013/0257589 | A1 | 10/2013 | Mohiuddin et al. |
| 2013/0312468 | A1 | 11/2013 | Read et al. |
| 2013/0335193 | A1 | 12/2013 | Hanson et al. |
| 2014/0002236 | A1 | 1/2014 | Pineau et al. |
| 2014/0051407 | A1 | 2/2014 | Ahearn et al. |
| 2014/0077929 | A1 | 3/2014 | Dumas et al. |
| 2014/0145823 | A1 | 5/2014 | Aase |
| 2014/0150502 | A1 | 6/2014 | Duncan |
| 2014/0157842 | A1 | 6/2014 | Almomani et al. |
| 2014/0165673 | A1 | 6/2014 | Tyner et al. |
| 2014/0223976 | A1 | 8/2014 | Chiou et al. |
| 2014/0260452 | A1 | 9/2014 | Chen |
| 2014/0292481 | A1 | 10/2014 | Dumas et al. |
| 2014/0298869 | A1 | 10/2014 | Wang |
| 2014/0313010 | A1 | 10/2014 | Huang et al. |
| 2014/0340196 | A1 | 11/2014 | Myers et al. |
| 2014/0365773 | A1 | 12/2014 | Gerhardt et al. |
| 2014/0365781 | A1 | 12/2014 | Dmitrienko et al. |
| 2015/0101370 | A1 | 4/2015 | Russo et al. |
| 2015/0119019 | A1 | 4/2015 | Minichmayr |
| 2015/0163206 | A1 | 6/2015 | McCarthy et al. |
| 2015/0184425 | A1 | 7/2015 | Ellis et al. |
| 2015/0206367 | A1 | 7/2015 | Goldman et al. |
| 2015/0233142 | A1 | 8/2015 | Schweitzer et al. |
| 2015/0235492 | A1 | 8/2015 | Hong et al. |
| 2015/0240531 | A1 | 8/2015 | Blust et al. |
| 2015/0259950 | A1 | 9/2015 | Schweitzer et al. |
| 2015/0279132 | A1 | 10/2015 | Perotti |
| 2015/0287256 | A1 | 10/2015 | Davis |
| 2015/0292240 | A1 | 10/2015 | Ribas et al. |
| 2015/0292246 | A1 | 10/2015 | Schweitzer et al. |
| 2015/0294517 | A1 | 10/2015 | Herrala |
| 2015/0300048 | A1 | 10/2015 | Yen et al. |
| 2015/0339870 | A1 | 11/2015 | Cojocaru et al. |
| 2015/0350913 | A1 | 12/2015 | Eberwine et al. |
| 2015/0356797 | A1 | 12/2015 | McBride et al. |
| 2015/0356801 | A1 | 12/2015 | Nitu et al. |
| 2016/0014103 | A1 | 1/2016 | Masters et al. |
| 2016/0019733 | A1 | 1/2016 | Robinton et al. |
| 2016/0035165 | A1 | 2/2016 | Dumas et al. |
| 2016/0040452 | A1 | 2/2016 | Ku |
| 2016/0042581 | A1 | 2/2016 | Ku |
| 2016/0042582 | A1 | 2/2016 | Hyde et al. |
| 2016/0047142 | A1 | 2/2016 | Gengler et al. |
| 2016/0048673 | A1 | 2/2016 | Marchiori et al. |
| 2016/0049027 | A1 | 2/2016 | Soldner et al. |
| 2016/0086400 | A1 | 3/2016 | Dumas et al. |
| 2016/0145900 | A1 | 5/2016 | Kaiser |
| 2016/0189454 | A1 | 6/2016 | Johnson et al. |
| 2016/0241559 | A1 | 8/2016 | Trani et al. |
| 2016/0241999 | A1 | 8/2016 | Chin et al. |
| 2016/0249159 | A1 | 8/2016 | Berg et al. |
| 2016/0258189 | A1 | 9/2016 | Frolov |
| 2016/0258202 | A1 | 9/2016 | Scalisi |
| 2016/0261824 | A1 | 9/2016 | Scalisi |
| 2016/0275733 | A1 | 9/2016 | Carstens et al. |
| 2016/0275735 | A1 | 9/2016 | Carstens et al. |
| 2016/0275739 | A1 | 9/2016 | Scalisi |
| 2016/0275741 | A1 | 9/2016 | Carstens et al. |
| 2016/0277383 | A1 | 9/2016 | Guyomarc'H et al. |
| 2016/0277388 | A1 | 9/2016 | Lowe et al. |
| 2016/0284147 | A1 | 9/2016 | Trani |
| 2016/0284170 | A1 | 9/2016 | Kasmir et al. |
| 2016/0284183 | A1 | 9/2016 | Trani |
| 2016/0300417 | A1 | 10/2016 | Hatton |
| 2016/0300476 | A1 | 10/2016 | Kasmir et al. |
| 2016/0307380 | A1 | 10/2016 | Ho et al. |
| 2016/0308859 | A1 | 10/2016 | Barry et al. |
| 2016/0319569 | A1 | 11/2016 | Johnson et al. |
| 2016/0319571 | A1 | 11/2016 | Johnson |
| 2016/0330413 | A1 | 11/2016 | Scalisi et al. |
| 2016/0341537 | A1 | 11/2016 | Ku |
| 2016/0343188 | A1 | 11/2016 | Johnson |
| 2016/0344091 | A1 | 11/2016 | Trani |
| 2016/0358433 | A1 | 12/2016 | Johnson |
| 2016/0358437 | A1 | 12/2016 | Johnson et al. |
| 2017/0002587 | A1 | 1/2017 | Wheeler |
| 2017/0009491 | A1 | 1/2017 | Nguyen et al. |
| 2017/0016249 | A1 | 1/2017 | Johnson et al. |
| 2017/0022733 | A1 | 1/2017 | Lowder |
| 2017/0022735 | A1 | 1/2017 | Lowder |
| 2017/0024693 | A1 | 1/2017 | Wiechers |
| 2017/0030109 | A1 | 2/2017 | Duncan et al. |
| 2017/0034485 | A1 | 2/2017 | Scalisi |
| 2017/0048495 | A1 | 2/2017 | Scalisi |
| 2017/0051533 | A1 | 2/2017 | Kester et al. |
| 2017/0076520 | A1 | 3/2017 | Ho et al. |
| 2017/0084132 | A1 | 3/2017 | Scalisi |
| 2017/0085843 | A1 | 3/2017 | Scalisi et al. |
| 2017/0085844 | A1 | 3/2017 | Scalisi et al. |
| 2017/0098335 | A1 | 4/2017 | Payack, Jr. |
| 2017/0109954 | A1 | 4/2017 | Drako et al. |
| 2017/0132861 | A1 | 5/2017 | Ho et al. |
| 2017/0145714 | A1 | 5/2017 | Ohl et al. |
| 2017/0180539 | A1 | 6/2017 | Payack, Jr. |
| 2017/0187995 | A1 | 6/2017 | Scalisi et al. |
| 2017/0193724 | A1 | 7/2017 | Johnson et al. |
| 2017/0211294 | A1 | 7/2017 | Reese et al. |
| 2017/0213404 | A1 | 7/2017 | Sivalingam et al. |
| 2017/0221291 | A1 | 8/2017 | Gokcebay |
| 2017/0226772 | A1 | 8/2017 | Lowder |
| 2017/0228603 | A1 | 8/2017 | Johnson |
| 2017/0228953 | A1 | 8/2017 | Lupovici |
| 2017/0236345 | A1 | 8/2017 | Watters |
| 2017/0236346 | A1 | 8/2017 | Murar et al. |
| 2017/0236350 | A1 | 8/2017 | Lin |
| 2017/0236354 | A1 | 8/2017 | Baker et al. |
| 2017/0241164 | A1 | 8/2017 | Brown et al. |
| 2017/0243420 | A1 | 8/2017 | Lien |
| 2017/0243455 | A1 | 8/2017 | Johnson et al. |
| 2017/0251366 | A1 | 8/2017 | Perna et al. |
| 2017/0263065 | A1 | 9/2017 | Johnson |
| 2017/0284128 | A1 | 10/2017 | Lim et al. |
| 2017/0302424 | A1 | 10/2017 | Seo et al. |
| 2017/0311161 | A1 | 10/2017 | Kuenzi |
| 2017/0321453 | A1 | 11/2017 | Zheng et al. |
| 2017/0328661 | A1 | 11/2017 | Milde, Jr. |
| 2017/0330226 | A1 | 11/2017 | Kuenzi et al. |
| 2017/0337758 | A1 | 11/2017 | Ahearn et al. |
| 2017/0345236 | A1 | 11/2017 | Kuenzi et al. |
| 2017/0352207 | A1 | 12/2017 | Siklosi |
| 2017/0365119 | A1 | 12/2017 | Yun |
| 2018/0007041 | A1 | 1/2018 | Davis et al. |
| 2018/0045479 | A1 | 2/2018 | Milde, Jr. |
| 2018/0051484 | A1 | 2/2018 | Picard et al. |
| 2018/0068503 | A1 | 3/2018 | Prasad et al. |
| 2018/0069722 | A1 | 3/2018 | Scalisi et al. |
| 2018/0073274 | A1 | 3/2018 | Johnson et al. |
| 2018/0081335 | A1 | 3/2018 | Davis |
| 2018/0082577 | A1 | 3/2018 | Davis |
| 2018/0089915 | A1 | 3/2018 | Lundberg |
| 2018/0091500 | A1 | 3/2018 | Baty et al. |
| 2018/0091641 | A1 | 3/2018 | Trani |
| 2018/0094456 | A1 | 4/2018 | Lowder |
| 2018/0096593 | A1 | 4/2018 | Davis |
| 2018/0103030 | A1 | 4/2018 | Einberg et al. |
| 2018/0114384 | A1 | 4/2018 | Graziano |
| 2018/0115897 | A1 | 4/2018 | Einberg et al. |
| 2018/0122219 | A1 | 5/2018 | Caterino et al. |
| 2018/0130273 | A1 | 5/2018 | Eid |
| 2018/0135336 | A1 | 5/2018 | Johnson et al. |
| 2018/0135337 | A1 | 5/2018 | Johnson et al. |
| 2018/0146336 | A1 | 5/2018 | Hoyer et al. |
| 2018/0151007 | A1 | 5/2018 | Einberg et al. |
| 2018/0151013 | A1 | 5/2018 | Carstens et al. |
| 2018/0179785 | A1 | 6/2018 | Liddell et al. |
| 2018/0179786 | A1 | 6/2018 | Johnson |
| 2018/0191889 | A1 | 7/2018 | Gerhardt et al. |
| 2018/0204399 | A1 | 7/2018 | Newman |
| 2018/0211457 | A1 | 7/2018 | Haworth et al. |
| 2018/0211462 | A1 | 7/2018 | Wendling et al. |
| 2018/0225899 | A1 | 8/2018 | Baumgarte et al. |

(56) References Cited

U.S. PATENT DOCUMENTS

| | | | |
|---|---|---|---|
| 2018/0253917 A1 | 9/2018 | Kazerani et al. |
| 2018/0261029 A1 | 9/2018 | Johnson et al. |
| 2018/0268675 A1 | 9/2018 | Johnson et al. |
| 2018/0270214 A1 | 9/2018 | Caterino et al. |
| 2018/0332033 A1 | 11/2018 | Lakhani et al. |
| 2018/0357845 A1 | 12/2018 | Berg et al. |
| 2019/0026731 A1 | 1/2019 | Neafsey |
| 2019/0035185 A1 | 1/2019 | Kuenzi |
| 2019/0035188 A1 | 1/2019 | Kuenzi et al. |
| 2019/0141504 A1 | 5/2019 | Ahearn et al. |
| 2019/0172281 A1 | 6/2019 | Einberg et al. |
| 2019/0218826 A1 | 7/2019 | Allen et al. |
| 2019/0279451 A1 | 9/2019 | Wishne |
| 2019/0325678 A1 | 10/2019 | Ahearn et al. |
| 2019/0335334 A1 | 10/2019 | Myers et al. |
| 2019/0340854 A1 | 11/2019 | Ahearn et al. |
| 2019/0347883 A1 | 11/2019 | Klink et al. |
| 2019/0362578 A1 | 11/2019 | Baker et al. |
| 2020/0024868 A1 | 1/2020 | Snodgrass |
| 2020/0040607 A1 | 2/2020 | Snodgrass et al. |
| 2020/0151986 A1 | 5/2020 | Kuenzi et al. |
| 2020/0318392 A1 | 10/2020 | Barnett, III et al. |
| 2021/0246689 A1 | 8/2021 | Allen et al. |
| 2022/0251879 A1 | 8/2022 | Allen et al. |

FOREIGN PATENT DOCUMENTS

| | | | |
|---|---|---|---|
| CN | 1702274 | A | 11/2005 |
| CN | 2858885 | Y | 1/2007 |
| CN | 1930351 | A | 3/2007 |
| CN | 101065552 | A | 10/2007 |
| CN | 101500861 | A | 8/2009 |
| CN | 104763242 | A | 7/2015 |
| CN | 105971401 | A | 9/2016 |
| DE | 29703559 | U1 | 4/1997 |
| DE | 19612156 | C2 | 7/1998 |
| DE | 29911356 | U1 | 10/1999 |
| DE | 19854454 | C2 | 9/2000 |
| DE | 102007005214 | B3 | 6/2008 |
| DE | 202008007068 | U1 | 10/2009 |
| DE | 102018202563 | A1 | 8/2019 |
| EP | 0588209 | A1 | 3/1994 |
| EP | 0999328 | A1 | 5/2000 |
| EP | 1065335 | A1 | 1/2001 |
| EP | 1079051 | A1 | 2/2001 |
| EP | 1174572 | A2 | 1/2002 |
| EP | 1653415 | A1 | 5/2006 |
| EP | 1903168 | A2 | 3/2008 |
| EP | 2275628 | A2 | 1/2011 |
| EP | 2348490 | A1 | 7/2011 |
| EP | 2620919 | A1 | 7/2013 |
| EP | 2725823 | A1 | 4/2014 |
| EP | 2998485 | A1 | 3/2016 |
| EP | 3009992 | A1 | 4/2016 |
| EP | 3147868 | A1 | 3/2017 |
| EP | 3156980 | A1 | 4/2017 |
| EP | 3188136 | A1 | 7/2017 |
| EP | 1908898 | B1 | 12/2017 |
| EP | 3293995 | A1 | 3/2018 |
| EP | 3327679 | A1 | 5/2018 |
| EP | 3358534 | A1 | 8/2018 |
| GB | 2178476 | A | 2/1987 |
| GB | 2262770 | B | 3/1995 |
| WO | 2004/020767 | A1 | 3/2004 |
| WO | 2004/034336 | A1 | 4/2004 |
| WO | 2007/142405 | A1 | 12/2007 |
| WO | 2012/009607 | A1 | 1/2012 |
| WO | 2012/073265 | A1 | 6/2012 |
| WO | 2013/019281 | A1 | 2/2013 |
| WO | 2014/140922 | A2 | 9/2014 |
| WO | 2014/150172 | A2 | 9/2014 |
| WO | 2014/151692 | A2 | 9/2014 |
| WO | 2015/013275 | A1 | 1/2015 |
| WO | 2015/031812 | A1 | 3/2015 |
| WO | 2015/054646 | A2 | 4/2015 |
| WO | 2015/054667 | A1 | 4/2015 |
| WO | 2015/138726 | A1 | 9/2015 |
| WO | 2015/138740 | A1 | 9/2015 |
| WO | 2015/138747 | A1 | 9/2015 |
| WO | 2016/001489 | A1 | 1/2016 |
| WO | 2016/023558 | A1 | 2/2016 |
| WO | 2016/075545 | A1 | 5/2016 |
| WO | 2016/130777 | A1 | 8/2016 |
| WO | 2016/131416 | A1 | 8/2016 |
| WO | 2016/150951 | A1 | 9/2016 |
| WO | 2016/172119 | A1 | 10/2016 |
| WO | 2016/185013 | A1 | 11/2016 |
| WO | 2016/196025 | A1 | 12/2016 |
| WO | 2016/202796 | A1 | 12/2016 |
| WO | 2017/066849 | A1 | 4/2017 |
| WO | 2017/082823 | A1 | 5/2017 |
| WO | 2017/091826 | A1 | 6/2017 |
| WO | 2017/136110 | A1 | 8/2017 |
| WO | 2017/175020 | A1 | 10/2017 |
| WO | 2017/180381 | A1 | 10/2017 |
| WO | 2017/180388 | A1 | 10/2017 |
| WO | 2017/180454 | A1 | 10/2017 |
| WO | 2017/180563 | A1 | 10/2017 |
| WO | 2017/201029 | A1 | 11/2017 |
| WO | 2017/207476 | A1 | 12/2017 |
| WO | 2018/041904 | A1 | 3/2018 |
| WO | 2018/075605 | A1 | 4/2018 |
| WO | 2018/081697 | A1 | 5/2018 |
| WO | 2018/091660 | A1 | 5/2018 |
| WO | 2018/104383 | A1 | 6/2018 |
| WO | 2018/104384 | A1 | 6/2018 |
| WO | 2018/128754 | A1 | 7/2018 |
| WO | 2018/128755 | A1 | 7/2018 |
| WO | 2018/136740 | A2 | 7/2018 |
| WO | 2018/136744 | A1 | 7/2018 |
| WO | 2019/051337 | A1 | 3/2019 |
| WO | 2019/200257 | A1 | 10/2019 |

OTHER PUBLICATIONS

International Preliminary Report on Patentability received for PCT Patent Application No. PCT/US2019/027220, dated Oct. 22, 2020, 9 pages.

International Preliminary Report on Patentability received for PCT Patent Application No. PCT/US2018/050117, dated Mar. 19, 2020, 17 pages.

International Search Report and Written Opinion received for PCT Patent Application No. PCT/US2018/050117, dated Nov. 8, 2018, 18 pages.

Computer Generated Translation for DE 102007005214 B3, Generated on Aug. 29, 2023, https://worldwide.espacenet.com/ (Year: 2023).

Computer Generated Translation for DE 202008007068 U1, Generated on Aug. 29, 2023, https://worldwide.espacenet.com/ (Year: 2023).

* cited by examiner

ELECTRO-MECHANICAL LOCK CORE

RELATED APPLICATIONS

This application is a national stage filing of PCT/US2018/050117, filed Sep. 7, 2018 which claims the benefit of U.S. Provisional Application No. 62/556,195, filed Sep. 8, 2018, titled ELECTRO-MECHANICAL LOCK CORE, the entire disclosures of which are expressly incorporated by reference herein.

FIELD

The present disclosure relates to lock cores and in particular to interchangeable lock cores having an electro-mechanical locking system.

BACKGROUND

Small format interchangeable cores (SFIC) can be used in applications in which re-keying is regularly needed. SFICs can be removed and replaced with alternative SFICs actuated by different keys, including different keys of the same format or different keys using alternative key formats such as physical keys and access credentials such as smartcards, proximity cards, key fobs, cellular telephones and the like.

SUMMARY

In embodiments, an interchangeable electro-mechanical lock core for use with a lock device having a locked state and an unlocked state is provided. The interchangeable electro-mechanical lock core may include a moveable plug having a first position relative to a lock core body which corresponds to the lock device being in the locked state and a second position relative to a lock core body which corresponds to the lock device being in the unlocked state. The interchangeable electro-mechanical lock core may include a core keeper moveably coupled to a lock core body. The core keeper may be positionable in a retain position wherein the core keeper extends beyond an envelope of lock core body to hold the lock core body in an opening of the lock device and a remove position wherein the core keeper is retracted relative to the envelope of the lock core body to permit removal of the lock core body from the opening of the lock device.

The disclosure, in one form thereof, provides an interchangeable lock core for use with a lock device having a locked state and an unlocked state, the interchangeable lock core removable from an opening of the lock device with the aid of a tool, the interchangeable lock core comprising: a lock core body having an exterior lock core body envelope, the lock core body including an upper lock core body having a first cylindrical portion with a first maximum lateral extent, a lower lock core body having a second cylindrical portion with a second maximum lateral extent, and a waist having a third maximum lateral extent, the third maximum lateral extent being less than the first maximum lateral extent and being less than the second maximum lateral extent; a moveable plug positioned within the lower portion of the lock core, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; an operator actuation assembly operable to selectively actuate the moveable plug, the operator actuation assembly moveably supported by the lock core body; a core keeper moveably coupled to the lock core body, the core keeper positionable in a retain position wherein the core keeper extends beyond the lock core body envelope to hold the lock core body in the opening of the lock device and a remove position wherein the core keeper is retracted relative to the lock core body envelope to permit removal of the lock core body from the opening of the lock device; and an actuator adjustably supported relative to the lock core body, a position of the actuator relative to the lock core body being adjustable, the actuator having an allow position allowing the core keeper to be actuated from the retain position to the remove position and a disallow position wherein the actuator does not allow the core keeper to be actuated by the interchangeable lock core between the retain position and the remove position, the actuator having a tool receiver adapted to be engaged with the tool such that the tool can move the actuator between the allow position and the disallow position, the tool receiver positioned within the operator actuation assembly envelope when viewed from a direction along the moveable plug axis.

In embodiments of the present disclosure, the moveable plug axis of the interchangeable lock core intersects the operator actuation assembly, and the operator actuation assembly envelope is defined about the moveable plug axis.

In embodiments of the present disclosure, the interchangeable lock core features a tool receiver of the actuator including a socket sized to receive the tool.

In embodiments of the present disclosure, the operator actuation assembly of the interchangeable lock core includes a cover removeable from a remainder of the operator actuation assembly to provide access to the tool receiver of the actuator.

In embodiments of the present disclosure, the interchangeable lock core further includes: a cam; and a control sleeve carrying the core keeper, the actuator operable in the allow position to position the cam to rotationally lock the control sleeve to the moveable plug, whereby rotational movement of the moveable plug when the control sleeve is rotationally locked to the moveable plug rotates the control sleeve to move the core keeper from the retain position to the remove position; in the allow position, the actuator is operatively coupled to the core keeper through the cam and the control sleeve.

In embodiments of the present disclosure, the cam comprises a bell crank.

In embodiments of the present disclosure, the actuator of the interchangeable lock core undergoes a rotation to move between the allow position and the disallow position.

In embodiments of the present disclosure the actuator of the interchangeable lock core undergoes both a rotation and a translation to move between the allow position and the disallow position.

In another form thereof, the present disclosure provides an interchangeable lock core for use with a lock device having a locked state and an unlocked state, the interchangeable lock core being removable from an opening of the lock device, the interchangeable lock core comprising: a lock core body having an exterior lock core body envelope; a moveable plug positioned in the lock core body, the moveable plug having a first position relative to the lock core body which corresponds to the lock device being in the locked state and a second position relative to the lock core body which corresponds to the lock device being in the unlocked state; a core keeper moveably coupled to the lock core body, the core keeper positionable in a retain position wherein the core keeper extends beyond the lock core body envelope to hold the lock core body in the opening of the lock device and a remove position wherein the core keeper is retracted relative to the lock core body envelope to permit removal of the lock core body from the opening of the lock device; an actuator moveable relative to the core keeper, the actuator supported by the lock core body and moveable relative to the lock core body in multiple degrees of freedom, the actuator having a first position corresponding to the remove position of the core keeper and a second position corresponding to the retain position of the core keeper, the actuator requiring a movement in each of two degrees of freedom to move from the second position to the first position.

In embodiments of the present disclosure, the movement in each of two degrees of freedom of the actuator comprises a translation and a rotation.

In embodiments of the present disclosure, after the translation, the actuator is operatively coupled to the core keeper, whereby, after the translation, the rotation of the actuator produces a rotation of the core keeper.

In embodiments of the present disclosure, the actuator comprises a tool receiving socket.

In embodiments of the present disclosure, the actuator comprises a control pin threadedly received in the interchangeable lock core.

In embodiments of the present disclosure, the actuator comprises a bell crank, and the two degrees of freedom comprise two rotational degrees of freedom.

In a further embodiment thereof, the present disclosure provides an interchangeable lock core for use with a lock device having a locked state and an unlocked state, the interchangeable lock core being removable from an opening of the lock device with the aid of a tool, the interchangeable lock core comprising: a lock core body having an exterior lock core body envelope; a moveable plug positioned in the lock core body, the moveable plug having a first position relative to the lock core body which corresponds to the lock device being in the locked state and a second position relative to the lock core body which corresponds to the lock device being in the unlocked state; a core keeper moveably coupled to the lock core body, the core keeper positionable in a retain position wherein the core keeper extends beyond the lock core body envelope to hold the lock core body in the opening of the lock device and a remove position wherein the core keeper is retracted relative to the lock core body envelope to permit removal of the lock core body from the opening of the lock device; and an actuator moveably supported relative to the lock core body, the actuator having an allow position allowing the core keeper to be actuated from the retain position of the core keeper to the remove position of the core keeper and a disallow position wherein the actuator does not allow the core keeper to be actuated by the interchangeable lock core between the retain position and the remove position, the actuator having a tool receiver adapted to be engaged with the tool such that a rotation of the tool relative to the plug will move the actuator between the allow position and the disallow position when the tool is engaged with the tool receiver.

In embodiments of the present disclosure, the tool receiver of the actuator includes a socket sized to receive the tool.

In embodiments of the present disclosure, the rotation of the tool relative to the plug to move the actuator between the first position and the second position causes a linear displacement of the actuator.

In embodiments of the present disclosure, the interchangeable lock core of further includes: a cam; and a control sleeve carrying the core keeper, the actuator operable in the allow position to position the cam to rotationally lock the control sleeve to the moveable plug, whereby rotational movement of the moveable plug when the control sleeve is rotationally locked to the moveable plug rotates the control sleeve to move the core keeper from the retain position to the remove position; in the allow position, the actuator operatively coupled to the core keeper through the cam and the control sleeve. In alternatives form of the disclosure, the cam comprises a bell crank.

In embodiments of the present disclosure, the actuator undergoes a rotation to move between the allow position and the disallow position.

In embodiments of the present disclosure, the actuator undergoes both a rotation and a translation to move between the allow position and the disallow position.

In yet another form thereof, the present disclosure provides an interchangeable lock core for use with a lock device having a locked state and an unlocked state, the interchangeable lock core being removable from an opening of the lock device, the interchangeable lock core comprising: a lock core body having an exterior lock core body envelope, a first end, and a second end; a moveable plug positioned in the lock core body proximate the first end of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; a control sleeve carrying a core keeper and moveably coupled to the lock core body, the core keeper positionable by the control sleeve in a retain position wherein the core keeper extends beyond the lock core body envelope to hold the lock core body in the opening of the lock device and a remove position wherein the core keeper is retracted relative to the lock core body envelope to permit removal of the lock core body from the opening of the lock device; a coupler moveably supported in the lock core body, an end of the coupler moveable in a movement toward the first end of the lock core body between a disallow position wherein the coupler does not allow the core keeper to be actuated by the interchangeable lock core between the retain position and the remove position and an allow position allowing the core keeper to be actuated between the retain position and the remove position, a further movement of the coupler while the coupler maintains the allow position resulting in a movement of the core keeper between the retain position and the remove position; and an actuator engageable with the coupler to actuate the coupler between the disallow position and the allow position.

In embodiments of the present disclosure, the further movement of the coupler while the coupler maintains the coupled position comprises a rotation of the coupler.

In embodiments of the present disclosure, the coupler comprises a bell crank rotatably supported in the lock core body and rotatable between the disallow position and the allow position, a rotation of the bell crank resulting in the movement of the end of the coupler toward the first end of the lock core body.

In embodiments of the present disclosure, the interchangeable lock core further includes an operator actuation assembly operable to selectively actuate the moveable plug, the operator actuation assembly moveably supported by the lock core body, the actuator rotatable about an actuator axis to actuate the coupler between the disallow position and the allow position, the actuator axis intersecting the operator actuation assembly.

In embodiments of the present disclosure, the actuator comprises a control pin rotatably supported in the lock core body.

In embodiments of the present disclosure, the actuator undergoes a movement in multiple degrees of freedom to actuate the coupler between the disallow position and the allow position. In certain alternative forms of the present disclosure, the movement in multiple degrees of freedom comprises a translation and a rotation. In further alternative forms of the present disclosure, the movement is relative to the moveable plug, wherein the actuator moves relative to the moveable plug to actuate the coupler between the disallow position and the allow position.

In yet a further embodiment, the present disclosure provides an interchangeable lock core for use with a lock device having a locked state and an unlocked state, the interchangeable lock core removable from an opening of the lock device, the interchangeable lock core comprising: a lock core body having an exterior lock core body envelope; a moveable plug positioned in the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; a control sleeve positioned about the moveable plug; a core keeper moveably coupled to the lock core body, the core keeper positionable by the control sleeve in a retain position wherein the core keeper extends beyond the lock core body envelope to hold the lock core body in the opening of the lock device and a remove position wherein the core keeper is retracted relative to the lock core body envelope to permit removal of the lock core body from the opening of the lock device; a motor supported by the lock core body; and a blocker positioned within the lock core body and moveable by the motor between a first position and a second position; with the blocker in the first position, the control sleeve rotatable by the interchangeable lock core to move the core keeper between the retain position and the remove position; with the blocker in the second position, the control sleeve is not rotatable by the interchangeable lock core to move the core keeper between the retain position and the remove position.

In embodiments of the present disclosure, the interchangeable lock core further includes: an actuator, the actuator moveably supported relative to the lock core body, a position of the actuator relative to the lock core body being adjustable, the actuator having an allow position allowing the core keeper to be actuated between the retain position and the remove position, the actuator having a disallow position disallowing the core keeper to be actuated between the retain position and the remove position.

In embodiments of the present disclosure, the actuator comprises a control pin threadedly received in the interchangeable lock core.

In embodiments of the present disclosure, the actuator undergoes a movement in multiple degrees of freedom to actuate the actuator between the disallow position and the allow position. In certain alternative forms of the present disclosure, the movement in multiple degrees of freedom comprises a translation and a rotation. In further alternative forms of the present disclosure, the movement is relative to the moveable plug, wherein the actuator moves relative to the plug to actuate the coupler between the disallow position and the allow position.

In embodiments of the present disclosure, the actuator includes a tool receiver adapted to be engaged with a tool such that the tool can move the actuator between the allow position and the disallow position.

In embodiments of the present disclosure, the interchangeable lock core further includes an operator actuation assembly operable to selectively actuate the moveable plug, the operator actuation assembly moveably supported by the lock core body, the actuator rotatable about an actuator axis to actuate the coupler between the disallow position and the allow position, the actuator axis intersecting the operator actuation assembly.

In yet another embodiment, the present disclosure provides an interchangeable lock core for use with a lock device having a locked state and an unlocked state, the interchangeable lock core being removable from an opening of the lock device, the interchangeable lock core comprising: a lock core body having an exterior lock core body envelope, a first end, and a second end; a moveable plug positioned in the lock core body proximate the first end of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; a core keeper moveably coupled to the lock core body, the core keeper positionable in a retain position wherein the core keeper extends beyond the lock core body envelope to hold the lock core body in the opening of the lock device and a remove position wherein the core keeper is retracted relative to the lock core body envelope to permit removal of the lock core body from the opening of the lock device; and an actuator translationally supported within the lock core body, the actuator translatable in a direction toward the first end of the lock core body, the actuator having an allow position allowing the core keeper to be actuated between the retain position and the remove position and a disallow position wherein the actuator does not allow the core keeper to be actuated by the interchangeable lock core between the retain position and the remove position, the actuator biased toward the disallow position.

In embodiments of the present disclosure, the actuator is completely contained with the lock core body.

In embodiments of the present disclosure, the actuator undergoes a movement in multiple degrees of freedom to actuate the coupler between the disallow position and the allow position. In certain alternative forms of the present disclosure, the movement in multiple degrees of freedom comprises a translation and a rotation. In further alternative forms of the present disclosure, the movement is relative to the moveable plug, wherein the actuator moves relative to the plug between the disallow position and the allow position.

In embodiments of the present disclosure, the interchangeable lock core further includes: an operator actuation assembly operable to selectively actuate the moveable plug, the operator actuation assembly moveably supported by the lock core body, the actuator rotatable about an actuator axis to actuate the coupler between the disallow position and the allow position, the actuator axis intersecting the operator actuation assembly.

In embodiments of the present disclosure, the interchangeable lock core further includes: an operator actuation assembly operable to selectively actuate the moveable plug, the operator actuation assembly moveably supported by the lock core body, the actuator rotatable about an actuator axis to actuate the actuator between the disallow position and the allow position, the actuator axis intersecting the operator actuation assembly.

The disclosure, in an alternative form thereof, provides an interchangeable lock core for use with a lock device having a locked state and an unlocked state, the interchangeable lock core being removable from an opening of the lock device, the interchangeable lock core comprising: a lock core body having an exterior lock core body envelope, a first end, and a second end; a moveable plug positioned in the lock core body proximate the first end of the lock core body, the moveable plug having a first position relative to the lock core body which corresponds to the lock device being in the locked state and a second position relative to the lock core body which corresponds to the lock device being in the unlocked state, the moveable plug being rotatable between the first position and the second position about a moveable plug axis; an operator actuation assembly supported by the lock core body and extending beyond the second end of the lock core body, the operator actuatable assembly having a first configuration wherein the operator actuatable assembly is freely rotatable relative to the lock core body and is decoupled from the moveable plug and a second configuration wherein the operator actuatable assembly is coupled to the moveable plug to move the moveable plug from the first position to the second position, the operator actuatable assembly being coupled to the lock core body in both the first configuration and the second configuration; a core keeper moveably coupled to the lock core body, the core keeper positionable in a retain position wherein the core keeper extends beyond the lock core body envelope to hold the lock core body in the opening of the lock device and a remove position wherein the core keeper is retracted relative to the lock core body envelope to permit removal of the lock core body from the opening of the lock device; an actuator translationally supported within the lock core body, the actuator translatable in a direction toward the first end of the lock core body, the actuator having an allow position allowing the core keeper to be actuated from the retain position to the remove position and a disallow position wherein the actuator does not allow the core keeper to be acutated by the interchangeable lock core between the retain position and the remove position, the actuator biased toward the second position; and a motor supported by the lock core body, the motor controlling when the operator actuatable assembly is in the first configuration and when the actuator is in the second position.

In embodiments of the present disclosure, the actuator undergoes a movement in multiple degrees of freedom to actuate the actuator between the disallow position and the allow position. In certain alternatives forms, the movement in multiple degrees of freedom comprises a translation and a rotation. In further alternative forms, the movement is relative to the moveable plug, wherein the actuator moves relative to the moveable plug to actuate the coupler between the disallow position and the allow position.

In embodiments of the present disclosure, the actuator includes a control pin threadedly received in the interchangeable lock core.

In embodiments of the present disclosure, in the allow position, the actuator is operatively coupled to the core keeper, whereby a rotation of the actuator coincides with a rotation of the core keeper.

In embodiments of the present disclosure, in the allow position, the actuator is operatively coupled to the core keeper via the moveable plug.

In embodiments of the present disclosure, in the disallow position, the actuator is operatively decoupled from the core keeper.

In embodiments of the present disclosure, the interchangeable lock core further includes: an operator actuation assembly operable to selectively actuate the moveable plug, the operator actuation assembly moveably supported by the lock core body.

In embodiments of the present disclosure, the operator actuation assembly comprises a knob including a removeable knob cover selectively covering a power source located in the knob. In certain alternative forms of the present disclosure, the operator actuation assembly includes a power source. In alternatives of the present disclosure, the power source comprises a battery. In further alternatives of the present disclosure, the knob further comprises a tool access through which a tool can be positioned to enter the lock core body. In further yet alternatives of the present disclosure, the power source covers the tool access when the power source is operably engaged with the operator actuation assembly, whereby the power source must be removed from the operator actuation assembly to allow the tool to enter the lock core body through the tool access.

In embodiments of the present disclosure, the lock core body includes an upper lock core body having a first cylindrical portion with a first maximum lateral extent, a lower lock core body having a second cylindrical portion with a second maximum lateral extent, and a waist having a third maximum lateral extent, the third maximum lateral extent being less than the first maximum lateral extent and being less than the second maximum lateral extent. In certain alternative forms of the present disclosure, the core keeper extends from the waist of the lock core body in the retain position.

In embodiments of the present disclosure, the interchangeable lock core further includes a control sleeve carrying the core keeper. In alternative forms of the present disclosure, the moveable plug is positioned within the control sleeve.

In embodiments of the present disclosure, the interchangeable lock core further includes a cam positionable to rotationally lock the control sleeve to the moveable plug, whereby rotational movement of the moveable plug when the control sleeve is rotationally locked to the moveable plug rotates the control sleeve to move the core keeper from the retain position to the remove position. In certain alternative forms of the present disclosure, the cam comprises a bell crank.

In certain alternatives within the scope of the present disclosure, the operator actuation assembly and lock core body are removeable together as a subassembly from the lock device.

In embodiments of the present disclosure, the interchangeable lock core further features a core keeper that, in the remove position, is positioned completely within the lock core body envelope.

In embodiments of the present disclosure, the interchangeable lock core further includes a lock interface positioned proximate a first end of the lock core body. In certain alternatives, the lock interface includes a plurality of recesses sized to receive a plurality of lock pins of a lock cylinder. In certain alternative embodiments of the present disclosure, the interchangeable lock core further includes an operator actuation assembly operable to selectively actuate the moveable plug, the operator actuation assembly moveably supported by the lock core body, the operator actuation assembly positioned proximate a second end of the lock core body, the second end of the lock core body opposite the first end of the lock core body. In further alternatives, the core keeper is positioned intermediate the lock interface and the operator actuation assembly.

In embodiments of the present disclosure, the lock core body comprises: a core body, the moveable plug positioned in the core body; a top cover selectively securable to the core body; and a rear cover selectively securable to the top cover.

In alternative forms of the present disclosure, the moveable plug does not require a translational movement to move between the first position and the second position.

In embodiments of the present disclosure, the interchangeable lock core further includes: a clutch engageable with the moveable plug in an engage position in which the clutch is able to impart a rotation to the moveable plug to actuate the moveable plug between the first position and the second position. In certain alternative forms of the present disclosure the interchangeable lock core further includes a motor supported by the lock core body, the motor actuatable between a motor disallow position in which the clutch is disallowed from achieving the engage position and a motor allow position in which the clutch is allowed to achieve the engage position. In further alternative forms, a clutch engagement feature of the moveable plug is engageable with the clutch.

In embodiments of the present disclosure, the motor is positioned exterior to the moveable plug. In embodiments of the present disclosure, the interchangeable lock core further includes a motor control communicatively connected to the motor, the motor control positioned exterior to the moveable plug.

In embodiments of the present disclosure, the motor maintains a fixed spacing from the moveable plug.

In embodiments of the present disclosure, the lock core body comprises: a core body comprising the lower lock core body, the moveable plug positioned in the core body; a top cover selectively securable to the core body, the upper lock core body including the top cover; and a rear cover selectively securable to the top cover.

In certain embodiments of the present disclosure, the moveable plug is positioned in the lower lock core body.

In embodiments of the present disclosure, the interchangeable lock core further includes: a motor actuatable between a motor disallow position in which an operator is blocked from actuating the moveable plug to an allow position in which an operator is allowed to actuate the moveable plug. In certain alternatives of the present disclosure, the motor is positioned in the upper lock core body.

In embodiments of the present disclosure, the interchangeable lock core further includes: a motor actuatable between a motor disallow position in which the operator actuation assembly is disallowed from actuating the moveable plug and a motor allow position in which the operator actuation assembly is allowed to actuate the moveable plug.

In embodiments of the present disclosure, the interchangeable lock core further includes: an operator actuation assembly operable to selectively actuate the moveable plug, the operator actuation assembly moveably supported by the lock core body; and a motor actuatable between a motor disallow position in which the operator actuation assembly is disallowed from actuating the moveable plug and a motor allow position in which the operator actuation assembly is allowed to actuate the moveable plug.

In embodiments of the present disclosure, in the disallow position, the actuator is decoupled from the core keeper.

In a further yet alternative form, the present disclosure provides a method of actuating an interchangeable lock core to a removal position, comprising: inserting a tool into the interchangeable lock core, the inserting step comprising the step of actuating the tool relative to an actuator internal to the interchangeable lock core, the lock core body having a first end and a second end opposite the first end; with the tool, axially translating the actuator internal to the interchangeable lock core toward the first end of the lock core body of the interchangeable lock core to allow a core keeper to be positioned in a remove position permitting removal of the lock core body from a lock device; and positioning the core keeper in the remove position permitting removal of the lock core body from the lock device.

In alternative forms of the method of the present disclosure, the step of axially translating the actuator comprises the step of rotating the actuator thereby causing an axially translation of the actuator.

In alternative forms of the method of the present disclosure, the step of axially translating the actuator results in the additional step of actuating a coupler into a coupled position in which the coupler is coupled to the core keeper.

In alternative forms of the method of the present disclosure, the positioning step occurs after the translating step.

In alternative forms of the method of the present disclosure, the translating step comprises the step of rotating the tool.

In alternative forms of the method of the present disclosure, the inserting step comprising the step of inserting the tool through an opening in the lock core body, the method further comprising the step of piloting the tool from a position exterior of the lock core body through the opening and into an interior of the lock core body.

In alternative forms of the method of the present disclosure, the interchangeable lock core further includes an operator actuation assembly operable to selectively actuate the moveable plug, the operator actuation assembly moveably supported by the lock core body, the operator actuation assembly including a removeable cover selectively covering the remainder of the operator actuation assembly, the method further comprising the step of: removing the cover prior to the inserting step to uncover an access in the operator actuation assembly, the inserting step further comprising the step of inserting the tool through the access in the operator actuation assembly.

In alternative forms of the method of the present disclosure, the step of rotating the actuator relative to the interchangeable lock core.

In alternative forms of the method of the present disclosure, the interchangeable lock core further comprises a control sleeve carrying the core keeper, and wherein the step of translating the actuator comprises the step of translating the actuator relative to the control sleeve. In yet another form thereof, the present disclosure provides an electromechanical interchangeable locking core for use with a locking device, comprising: a housing;

an operator actuation assembly coupled to the housing; a lock actuator assembly positioned within the housing and operatively coupled to the operator actuation assembly, the lock actuator device including means for actuating the locking device; and a control assembly positioned within the housing, the control assembly including means for controlling when the lock actuator device may actuate the locking device.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 51 illustrates an exploded, front, perspective view of a core plug assembly of the electro-mechanical lock core assembly of FIG. 50;

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
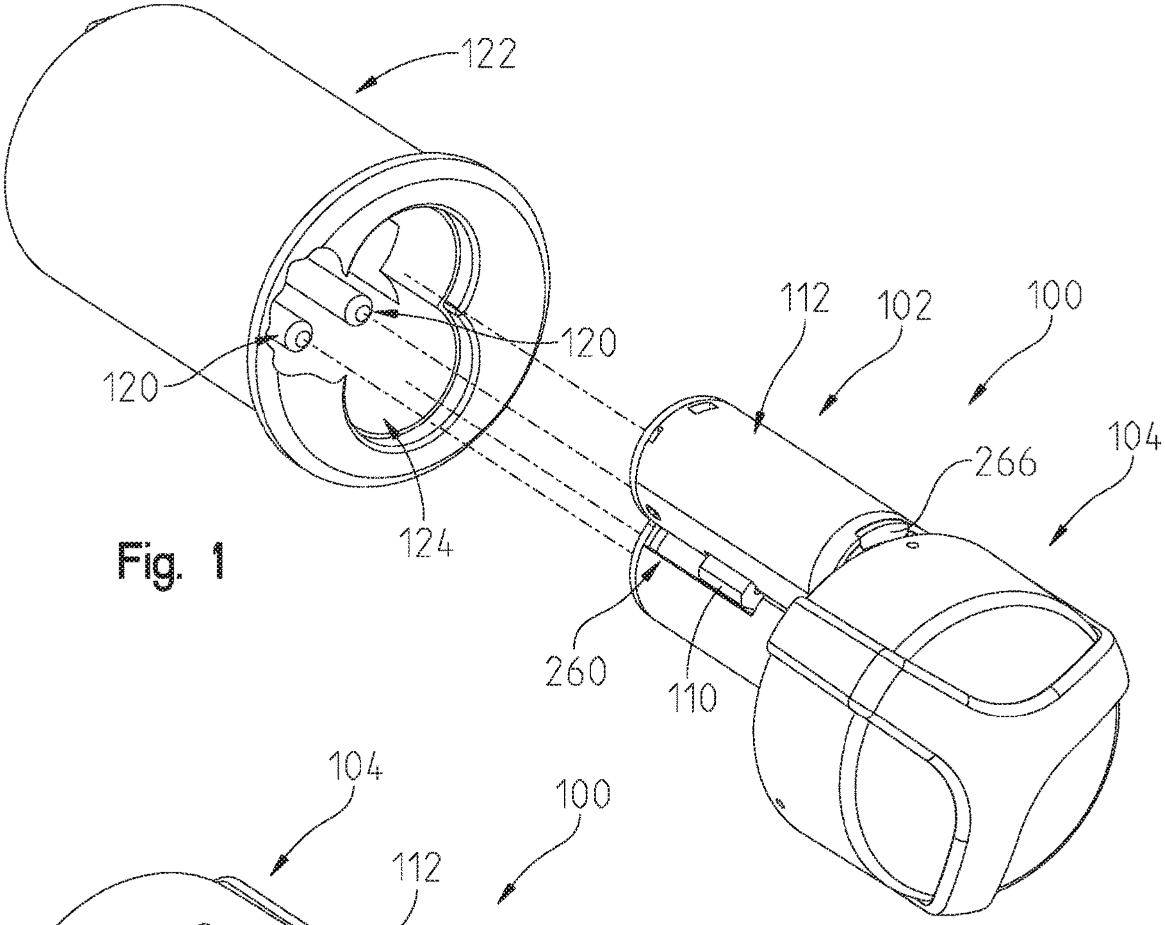
FIG. 1 illustrates an exploded, front, perspective view of an electro-mechanical lock core for assembly to a lock cylinder shown with a partial cutaway.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 2:
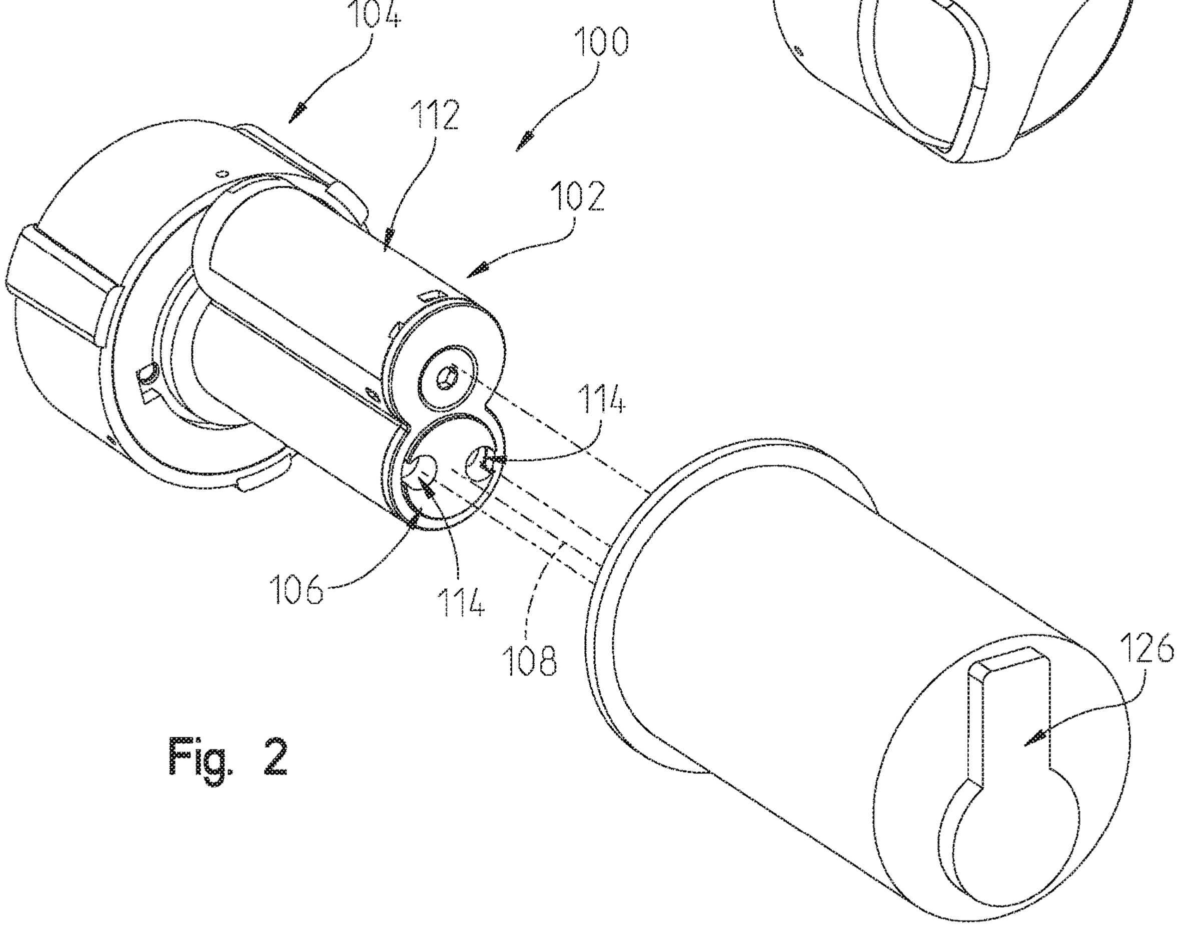
FIG. 2 illustrates an exploded, rear perspective view of the electro-mechanical lock core and lock cylinder of FIG. 1.
Figure 3:
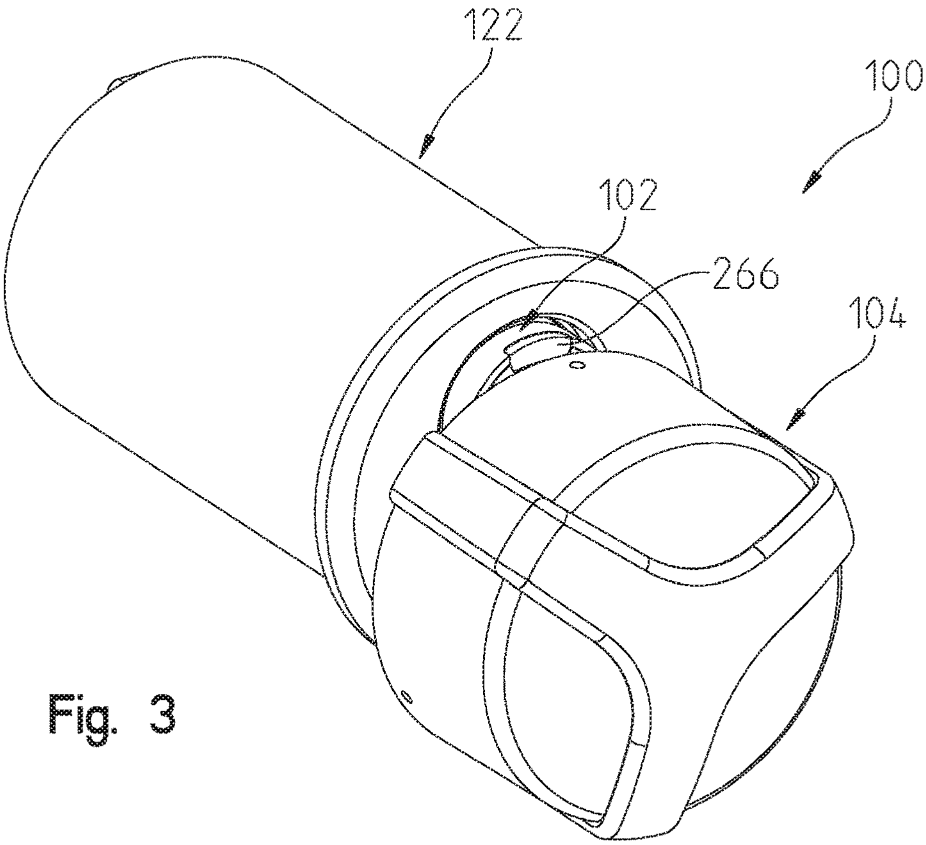
FIG. 3 illustrates a front, perspective view of the electro-mechanical lock core and lock cylinder of FIG. 1 wherein electro-mechanical lock core is assembled to lock cylinder.
Figure 4:
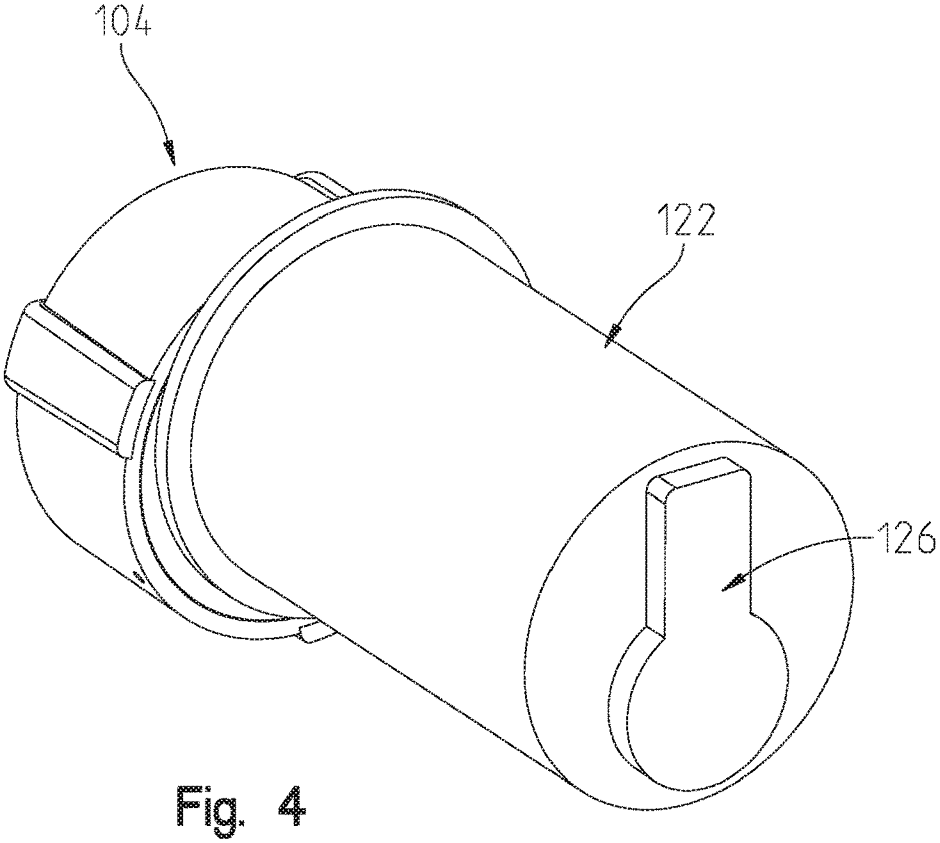
FIG. 4 illustrates a rear, perspective view of the electro-mechanical lock core and lock cylinder of FIG. 1 wherein electro-mechanical lock core is assembled to lock cylinder.

Referring to FIGS. 1-4, an electro-mechanical lock core 100 includes a core assembly 102 and an operator actuation assembly 104. As explained herein in more detail, in certain configurations operator actuation assembly 104 may be actuated to rotate a core plug assembly 106 (see FIG. 2) of core assembly 102 about its longitudinal axis 108 and in certain configurations operator actuation assembly 104 may be actuated to move a core keeper 110 of core assembly 102 relative to a core body 112 of core assembly 102. Core plug assembly 106 includes a lock interface in the form of a plurality of recesses 114, illustratively two, which receive lock pins 120 of a lock cylinder 122 when core assembly 102 is received in recess 124 of lock cylinder 122, as shown in FIG. 3. Lock pins 120 are in turn coupled to a cam member 126 of lock cylinder 122 which is rotatable. As is known in the art, cam member 126 may be in turn coupled to a lock system, such as a latch bolt of a door lock, a shank of a padlock or other suitable lock systems.

Figure 5:
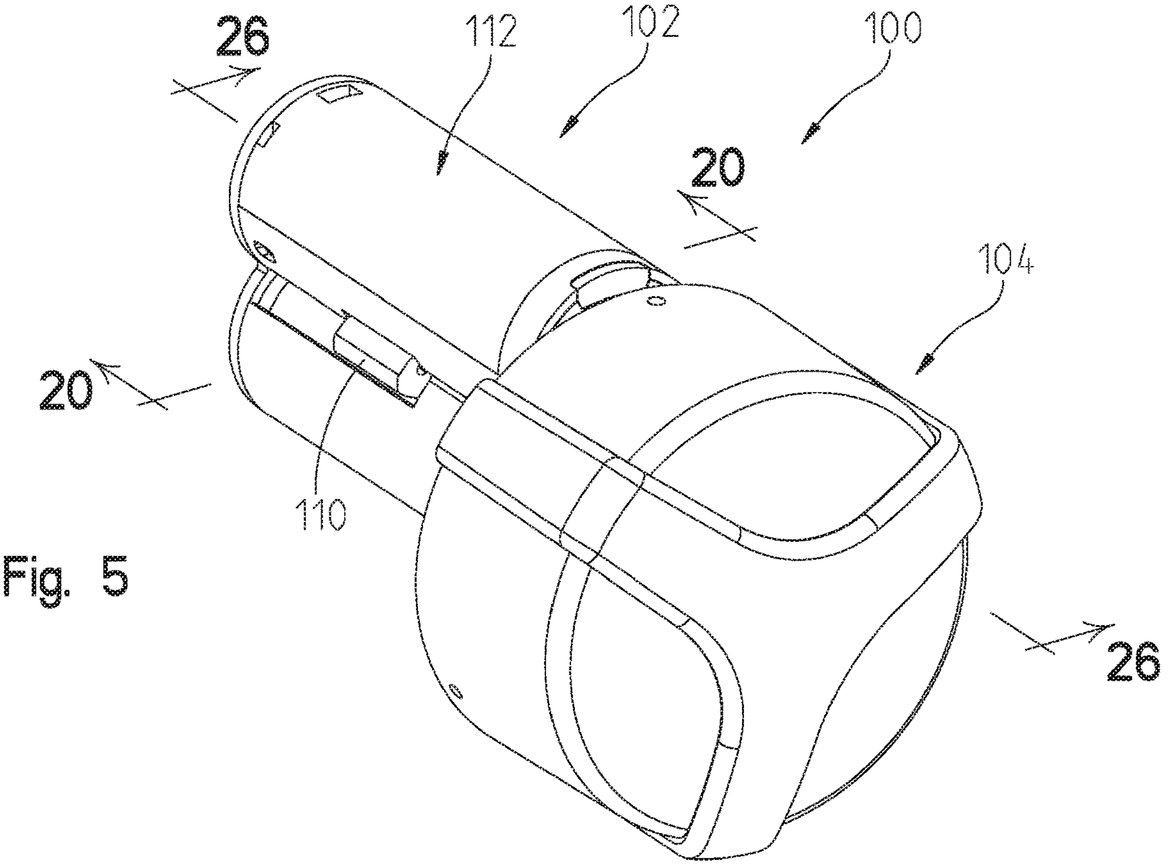
FIG. 5 illustrates a front, perspective view of the electro-mechanical lock core of FIG. 1.
Figure 6:
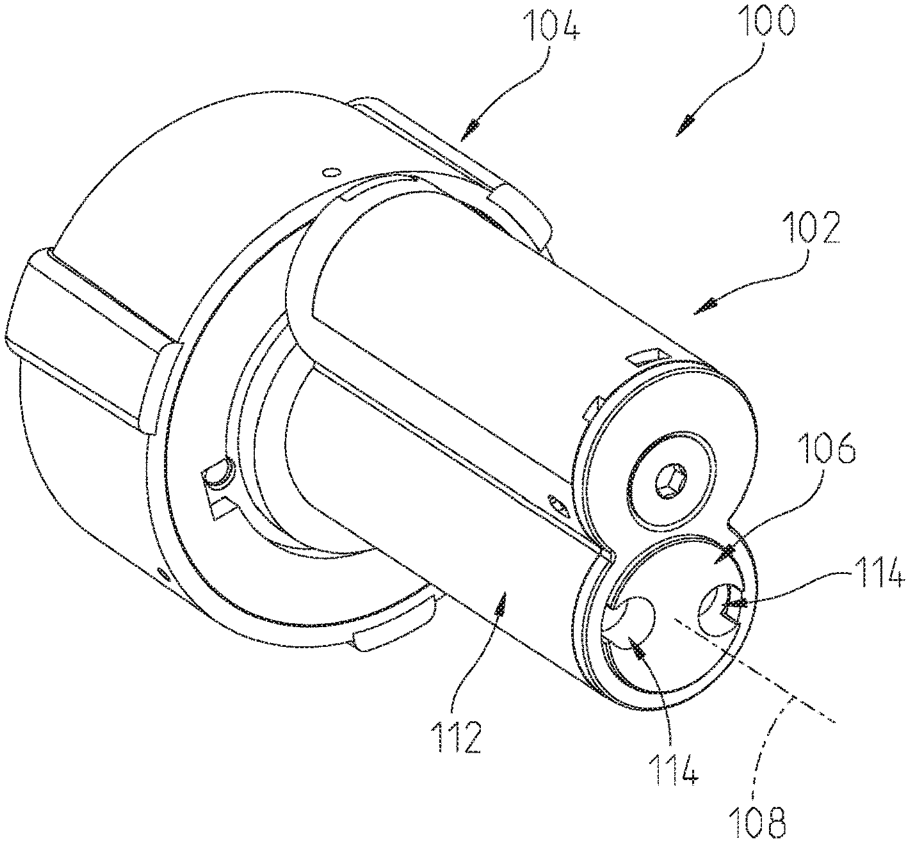
FIG. 6 illustrates a rear, perspective view of the electro-mechanical lock core of FIG. 1.

When core assembly 102 is received in recess 124 of lock cylinder 122, core keeper 110 is in a first position wherein it is received in a recess of lock cylinder 122 to hold or otherwise prevent the removal of core assembly 102 from lock cylinder 122 without the movement of core keeper 110 to a second position wherein the core keeper 110 is not received in the recess of lock cylinder 122. In the illustrated embodiment, core body 112 defines a figure eight profile (See FIGS. 5 and 6) which is received in a corresponding figure eight profile of lock cylinder 122 (See FIGS. 3 and 4). The figure eight profile is known as a small format interchangeable core ("SFIC"). Core body 112 may also be sized and shaped to be compatible with large format interchangeable cores ("LFIC") and other known cores.

Core body 112 may be translated relative to lock cylinder 122 along longitudinal axis 108 to remove core body 112 from lock cylinder 122 when core keeper 110 is received within the envelope of core body 112 such that core body 112 has a figure eight profile and may not be translated relative to lock cylinder 122 along longitudinal axis 108 to remove core body 112 from lock cylinder 122 when core keeper 110 is positioned at least partially outside of the envelope of core body 112.

Although electro-mechanical lock core 100 is illustrated in use with lock cylinder 122, electro-mechanical lock core 100 may be used with a plurality of lock systems to provide a locking device which restricts the operation of the coupled lock system. Exemplary lock systems include door handles, padlocks, and other suitable lock systems. Further, although operator actuation assembly 104 is illustrated as including a generally cylindrical knob, other user actuatable input devices may be used including handles, levers, and other suitable devices for interaction with an operator.

Figure 7:
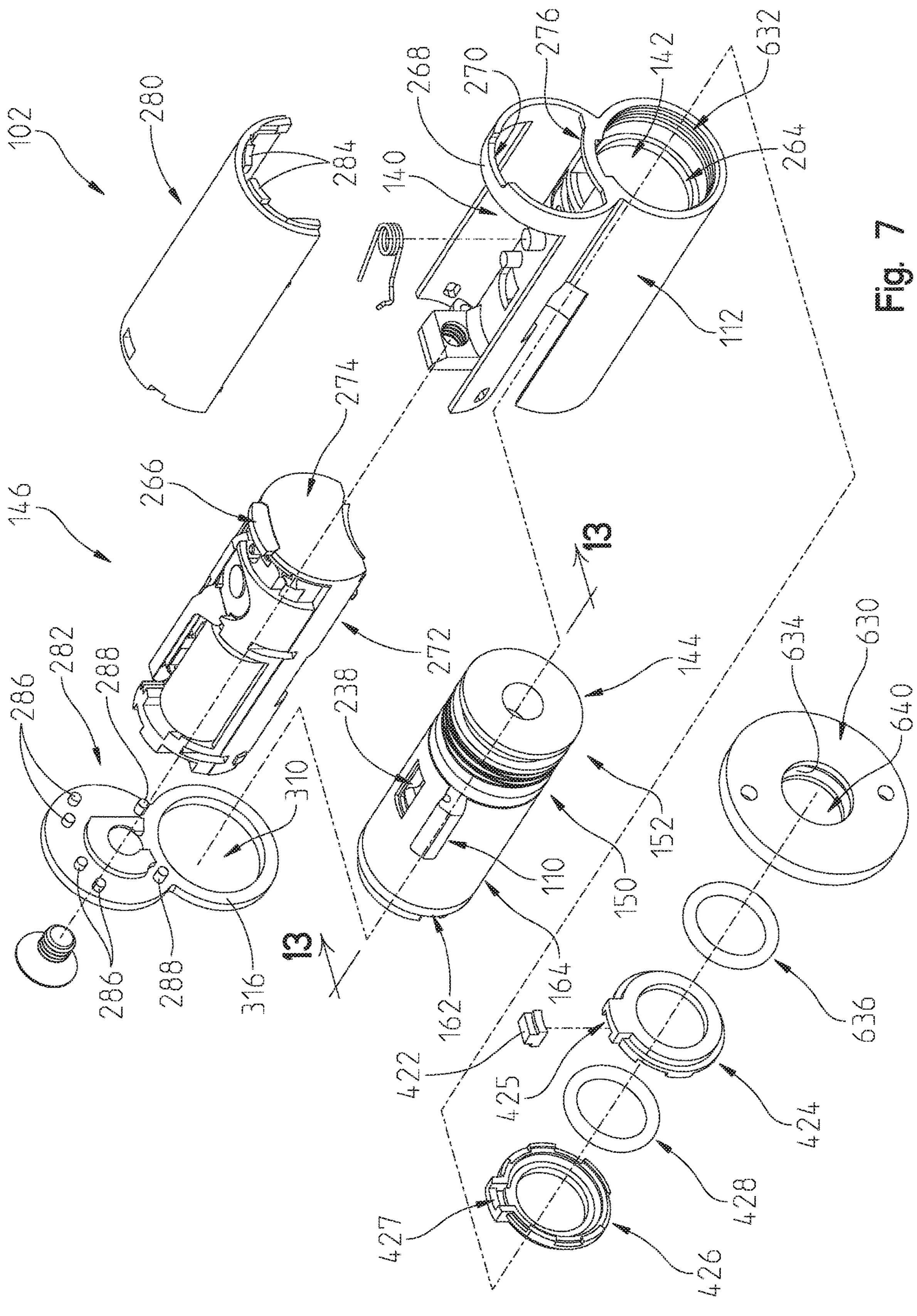
FIG. 7 illustrates an exploded, front, perspective view of lock cylinder, lock actuator assembly, control assembly, and a power transfer assembly of the electro-mechanical lock core of FIG. 5.
Figure 8:
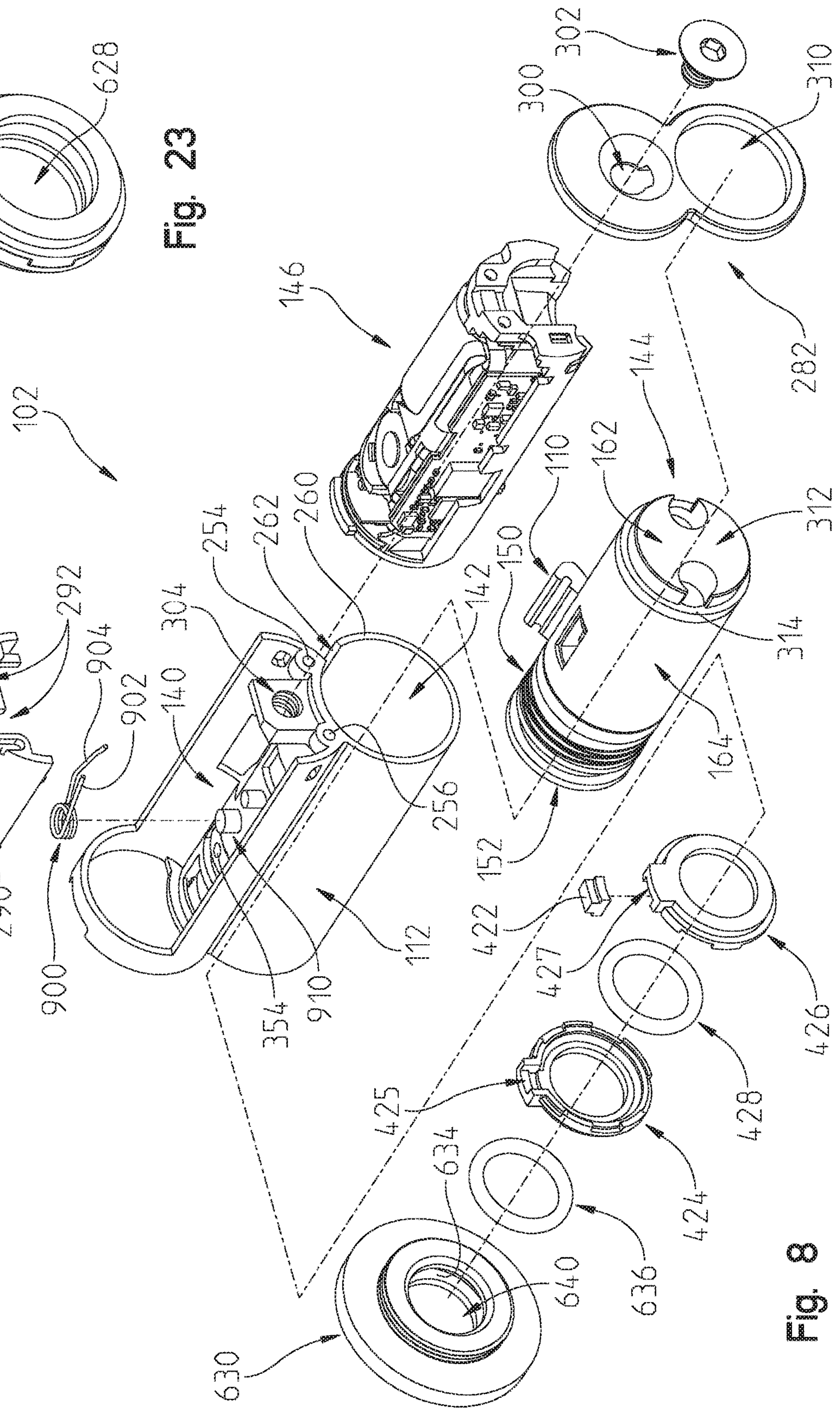
FIG. 8 illustrates an exploded, rear, perspective view of lock cylinder, lock actuator assembly, control assembly, and a power transfer assembly of the electro-mechanical lock core of FIG. 5.

Turning to FIGS. 7-13 the components of core assembly 102 are described in more detail. Referring to FIGS. 7 and 8, core body 112 of core assembly 102 includes an upper cavity 140 and a lower cavity 142. Lower cavity 142 includes a lock actuator assembly 144 (See FIGS. 7 and 8) and upper cavity 140 receives a control assembly 146 (See FIGS. 7 and 8). As explained in more detail herein, control assembly 146 restricts various movements of lock actuator assembly 144 to restrict the unauthorized actuation of cam member 126 and/or to restrict movement of core keeper 110.

Figure 28:
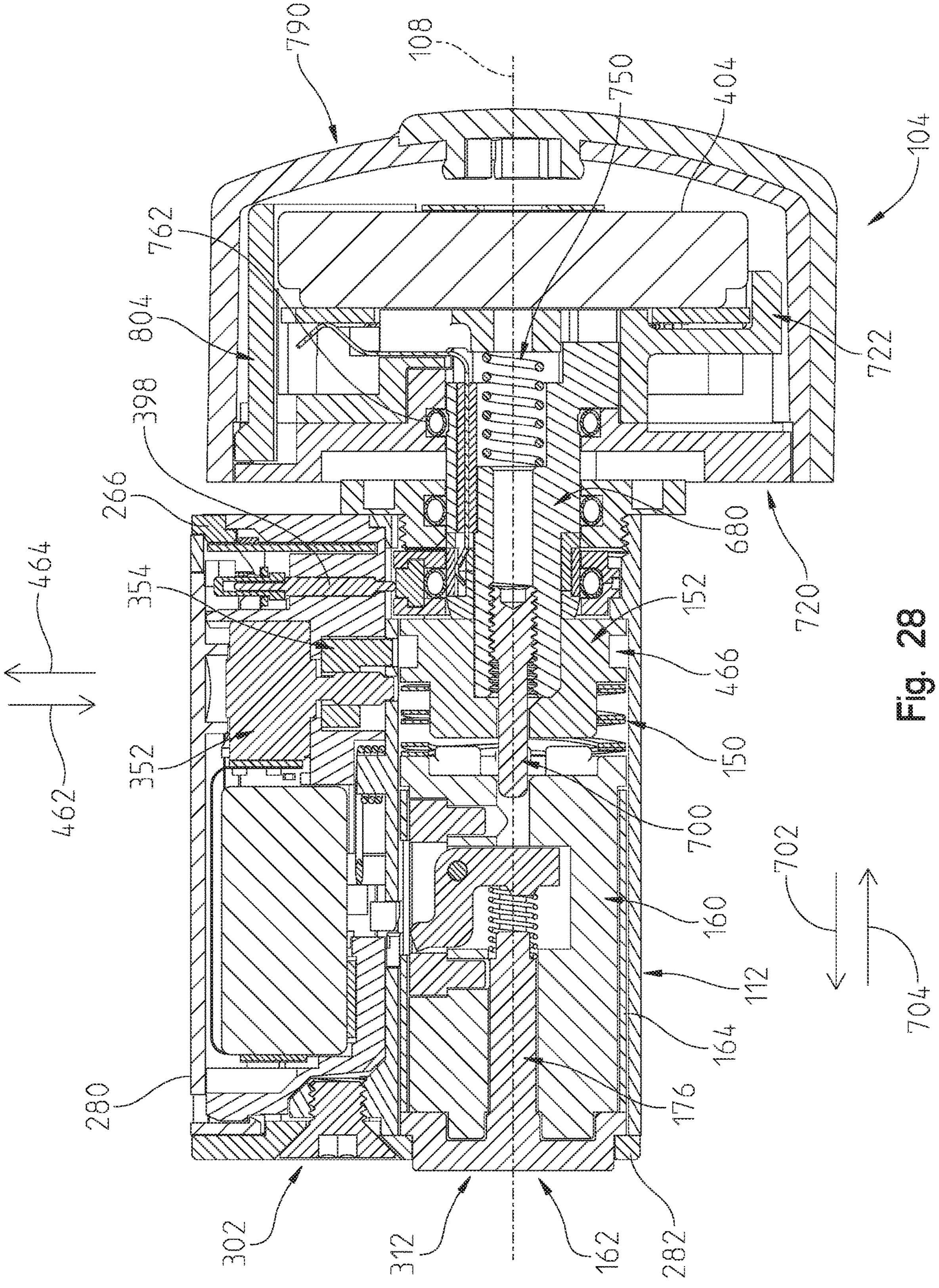
FIG. 28 illustrates the sectional view of FIG. 26 with the blocker of the control assembly in the second release position of FIG. 21 and the operator actuation assembly and clutch of the lock actuator assembly in a disengaged position relative to the core plug assembly of the lock actuator assembly.
Figure 29:
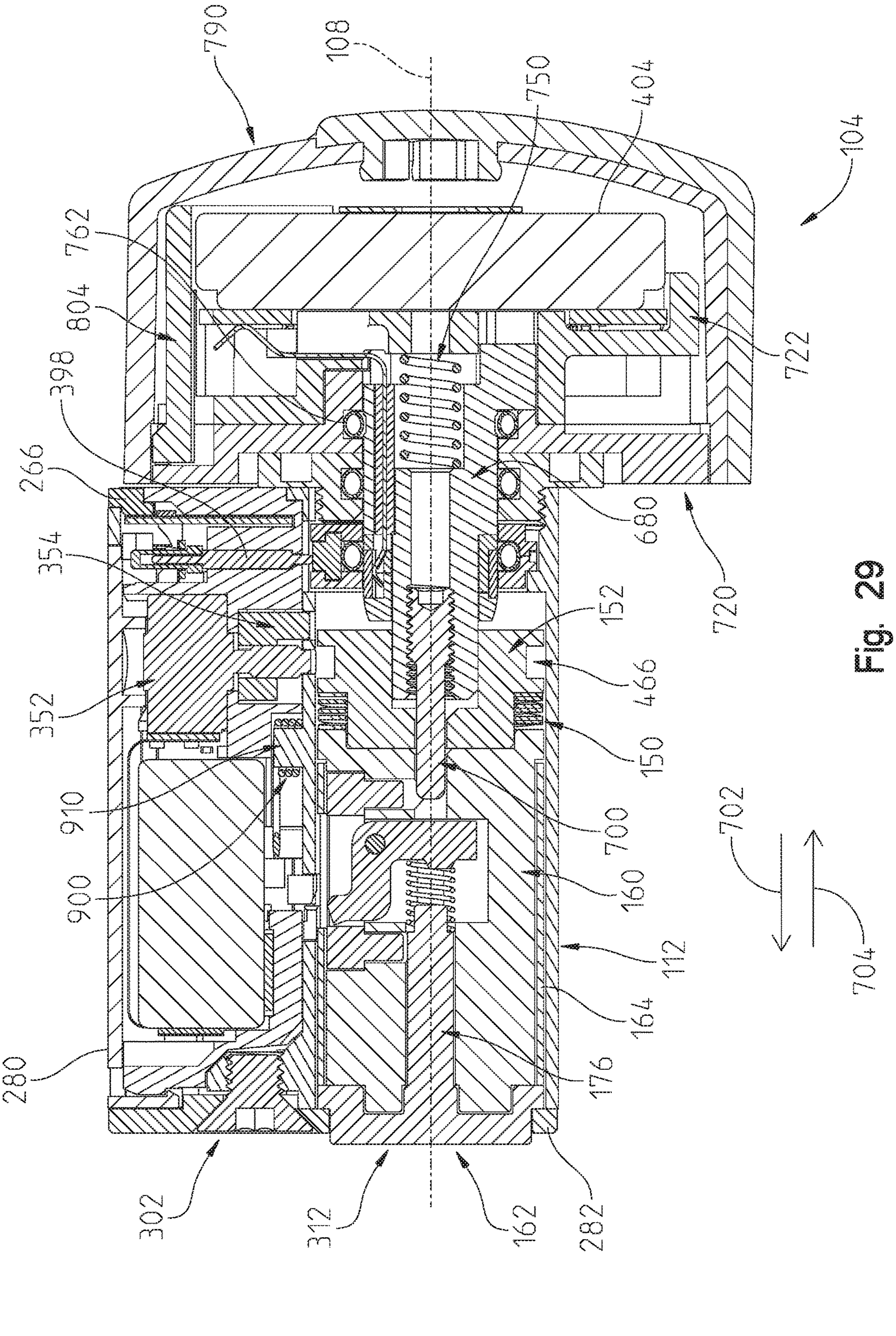
FIG. 29 illustrates the sectional view of FIG. 26 with the blocker of the control assembly in the second release position of FIG. 21 and the knob assembly and clutch of the lock actuator assembly in an engaged position of the lock actuator assembly.

Referring to FIGS. 9-12, lock actuator assembly 144 is illustrated in more detail. Lock actuator assembly 144 includes core plug assembly 106, a biasing member 150, and a clutch 152. As illustrated in FIG. 28, biasing member 150 biases clutch 152 in a spaced apart relationship relative to core plug assembly 106 and may be compressed, as illustrated in FIG. 29 to permit engagement features 154 of core plug assembly 106 to interact with engagement features 156 of clutch 152. In one example, biasing member 150 is a wave spring.

In the illustrated embodiment, engagement features 154 and engagement features 156 are a plurality of interlocking protrusions and recesses carries by each of core plug assembly 106 and clutch 152, respectively. In other embodiments, engagement features 154 may be one or more protrusions received by one or more recess of engagement features 156 or vice versa. Additionally, engagement features 154 and engagement features 156 may be generally planer frictional surfaces which when held in contact couple clutch 152 and core plug assembly 106 to rotate together. By including a plurality of interlocking protrusions and recesses, as shown in the illustrated embodiment, clutch 152 may have multiple rotational positions relative to core plug assembly 106 about longitudinal axis 108 wherein engagement features 156 of clutch 152 may engage engagement features 154 of core plug assembly 106.

Figure 49:
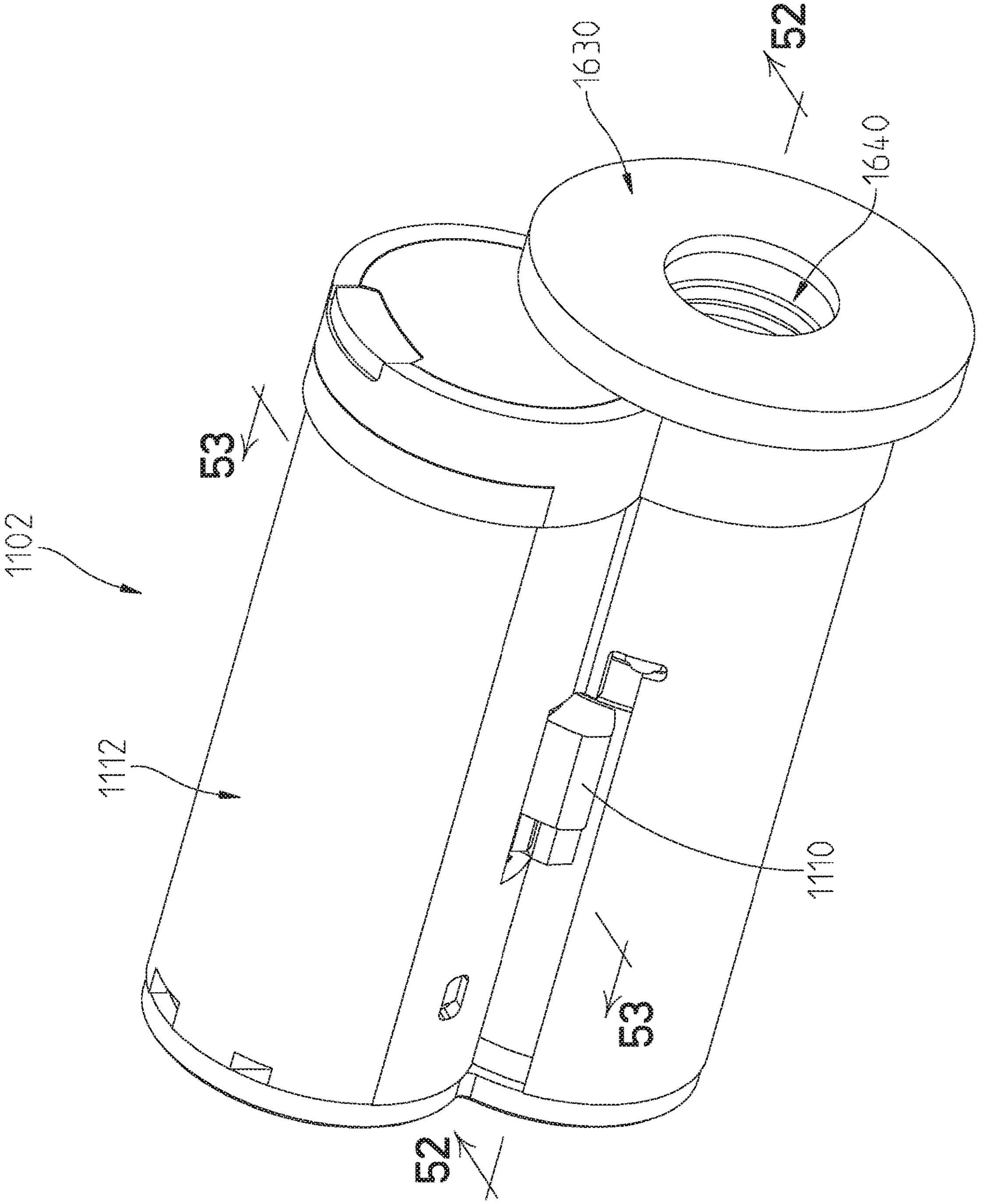
FIG. 49 illustrates a front, perspective view of a second exemplary electro-mechanical lock core assembly.

Turning to FIGS. 49-55, an exemplary core body 1112 of a second exemplary core assembly 1102 is illustrated. Core assembly 1102 is similar in form and function to core assembly 102. Accordingly, parts of core assembly 1102 will have reference characters corresponding to similar parts of core assembly 102. For example, core assembly 1102 includes a core keeper 1110 and a core body 1112, as illustrated in FIG. 49.

Figure 50A:
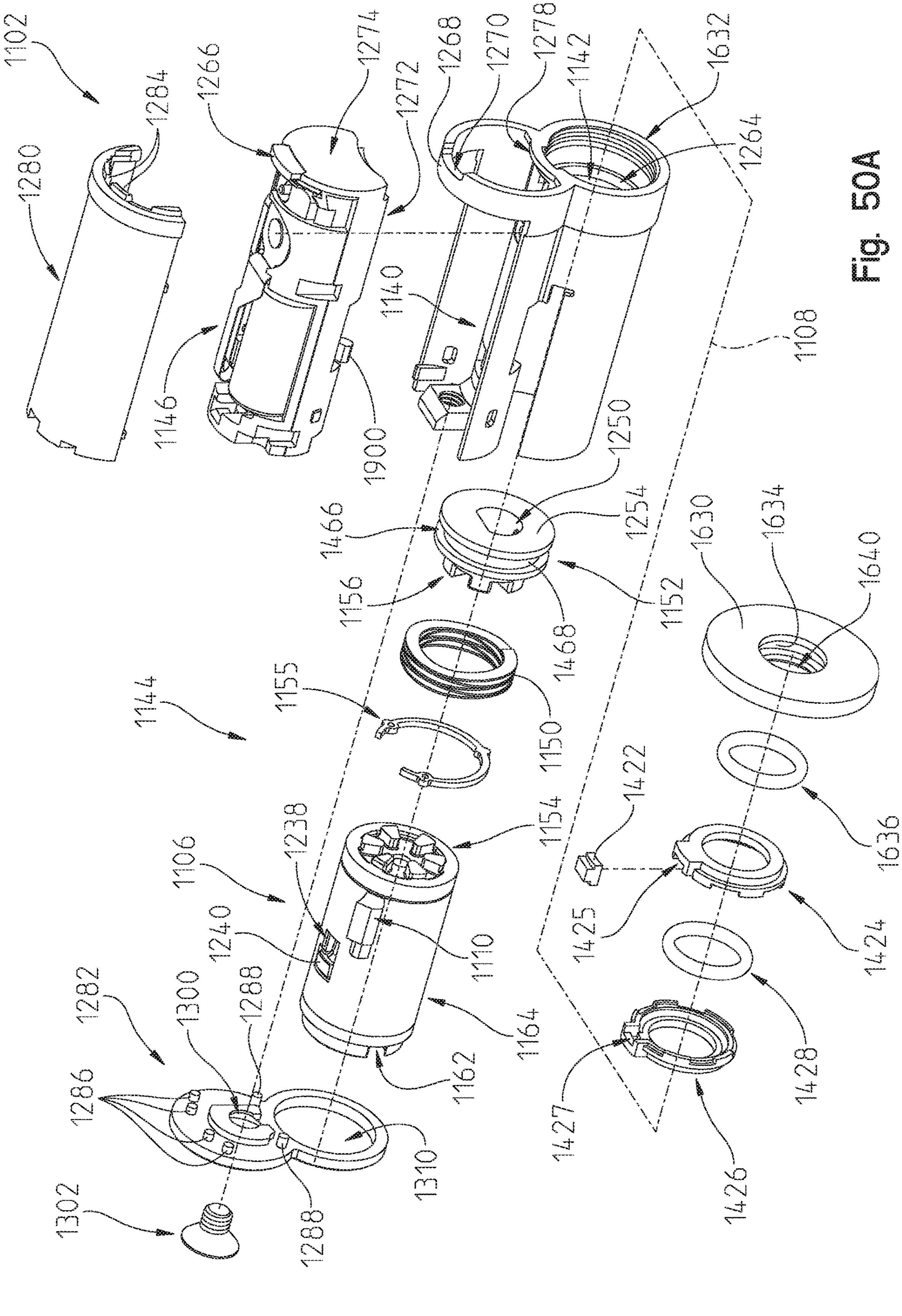
FIG. 50A illustrates an exploded, front, perspective view of the electro-mechanical lock core assembly of FIG. 49.
Figure 50B:
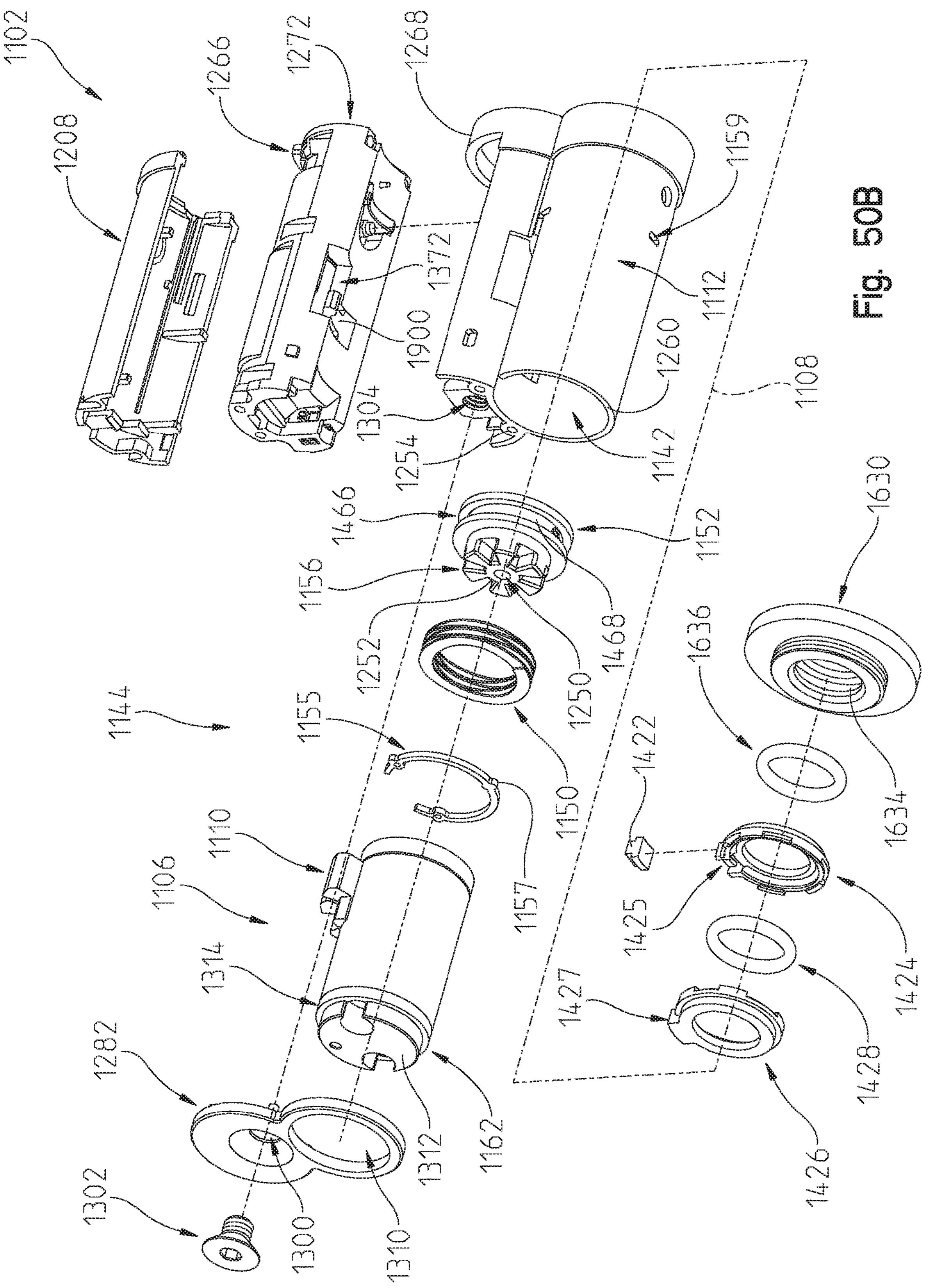
FIG. 50B illustrates an exploded, rear, bottom, perspective view of the electro-mechanical lock core assembly of FIG. 49.
Figure 5I:
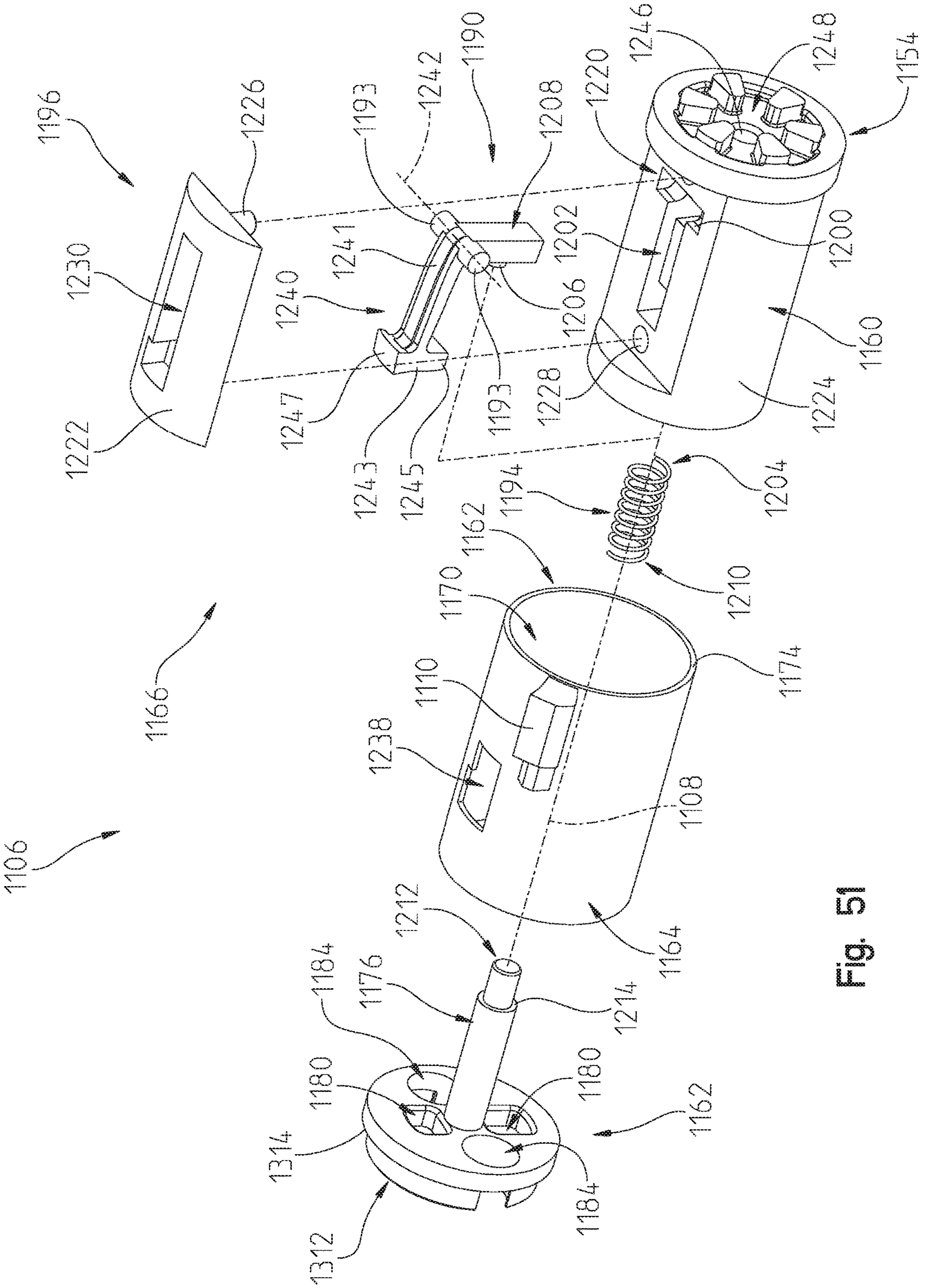
Figure 52:
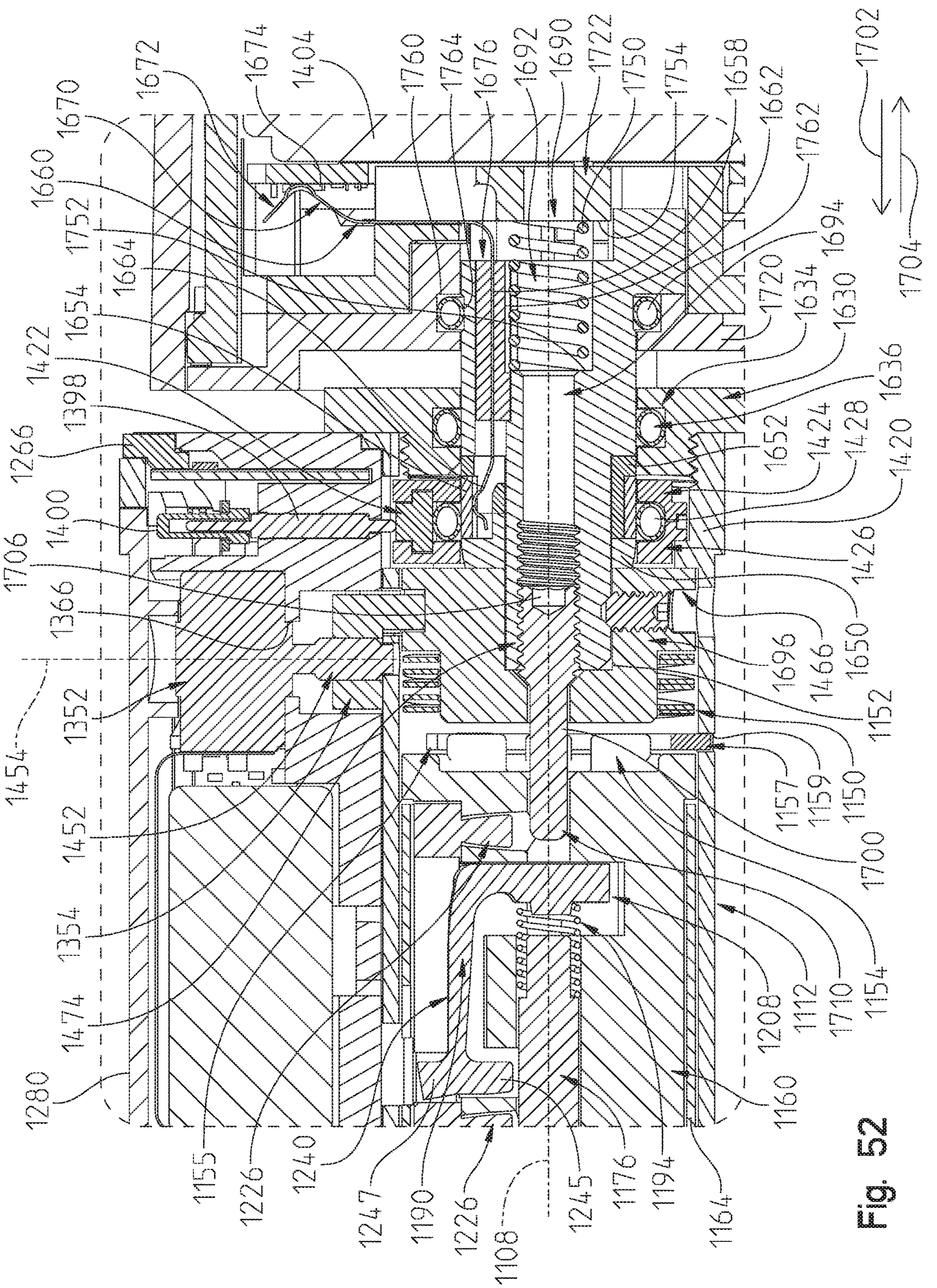
FIG. 52 illustrates a sectional view of the electro-mechanical lock core assembly of FIG. 49 along lines 52-52 of FIG. 49.
Figure 55:
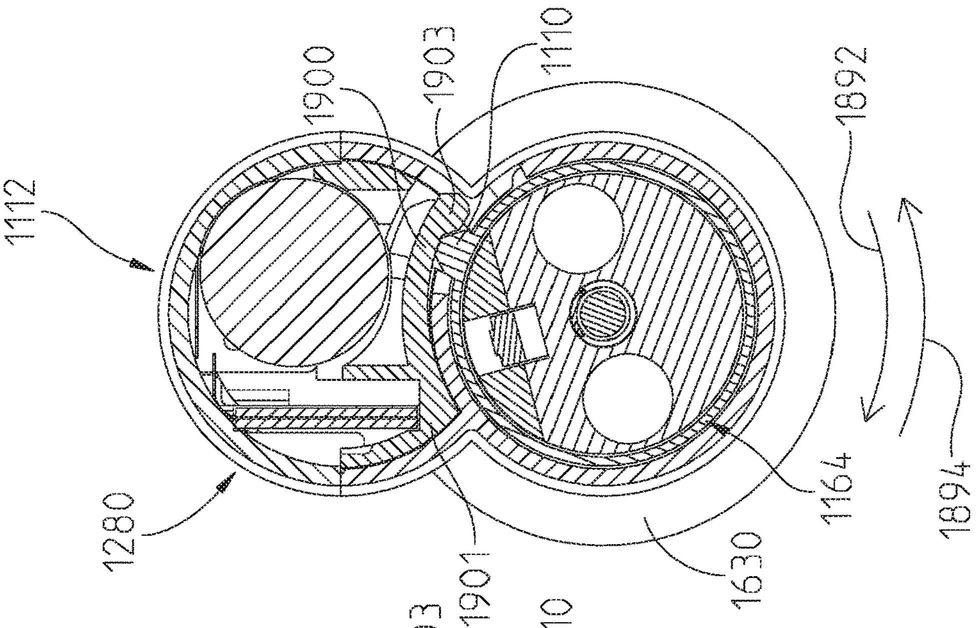
FIG. 55 illustrates a sectional view of the electro-mechanical lock core assembly along lines 53-53 of FIG. 49 with the core keeper in a third position within the envelope of the core body of the core assembly of FIG. 49 and no longer upwardly deflecting the biasing arm of the biasing member of the cradle of the control assembly of the electro-mechanical lock core assembly of FIG. 49.
Figure 54:
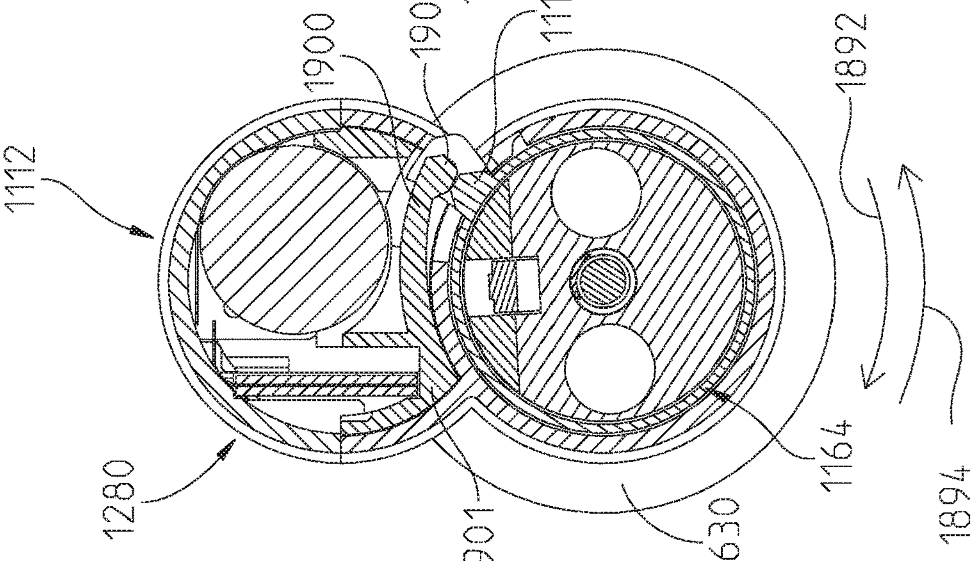
FIG. 54 illustrates a sectional view of the electro-mechanical lock core assembly along lines 53-53 of FIG. 49 with the core keeper in a second position at the envelope of the core body of the core assembly of FIG. 49 and upwardly deflecting the biasing arm of the biasing member of the cradle of the control assembly of the electro-mechanical lock core assembly of FIG. 49.

Referring to FIGS. 50A and 50B, core body 1112 of core assembly 1102 includes an upper cavity 1140 and a lower cavity 1142 configured to receive a lock actuator assembly 1144. Lock actuator assembly 1144 includes core plug assembly 1106, a retaining member 1155, a biasing member 1150, and a clutch 1152. As illustrated in FIG. 52, biasing member 1150 biases clutch 1152 in a spaced apart relationship relative to core plug assembly 1106 and may be compressed to permit engagement features 1154 of core plug assembly 1106 to interact with engagement features 1156 of clutch 1152. In one example, biasing member 1150 is a wave spring.

Retaining member 1155, illustratively a snap ring or circlip, axially retains core plug assembly 1106 within lower cavity 1142 of core body 1112 while permitting core plug assembly 1106 to rotate about longitudinal axis 1108. Retaining member 1155 includes an outwardly extending protrusion 1157 and core body 112 includes a recess 1159 configured to receive protrusion 1157. As shown in FIG. 52, retaining member 1155 is secured around engagement members 1154 of core plug assembly 1106 and protrusion 1157 is received in recess 1159. In this way, retaining member 1155 restrict axial movement of core plug assembly 1106 along longitudinal axis 1108 in either direction 1702 or direction 1704.

Referring back to FIGS. 11 and 12, core plug assembly 106 of lock actuator assembly 144 includes a core plug body 160, a core plug cover 162, a control sleeve 164, and a control keeper coupling assembly 166. Control sleeve 164 includes an interior 170 which receives core plug body 160. Core plug body 160 includes a flange 172 (see FIG. 12) that limits the ingress of core plug body 160 into interior 170 of control sleeve 164 along longitudinal axis 108.

Control sleeve 164 further supports core keeper 110. In the illustrated embodiment, core keeper 110 is integrally formed as part of control sleeve 164. In other embodiments, core keeper 110 may be a separate component which is coupled to control sleeve 164. Core keeper 110 is illustratively shown as being co-extensive with a front face 174 of control sleeve 164 (see FIG. 11), but may be spaced apart from front face 174 of control sleeve 164 along longitudinal axis 108.

A stem portion 176 of core plug cover 162 is also received within interior 170 of control sleeve 164 along longitudinal axis 108. Stem portion 176 is further received within a recess 178 of core plug body 160. Core plug cover 162 includes locators 180 which cooperate with locators 182 of core plug body 160 to orient core plug cover 162 relative to core plug body 160 such that openings 184 in core plug cover 162 align with recesses 186 of core plug body 160. Openings 184 and 186 receive lock pins 120 of lock cylinder 122 (see FIG. 1). The illustrated locators 180 and locators 182 are recesses in core plug cover 162 and protrusions on core plug body 160, respectively. In one embodiment, other arrangements and constructs of locators or fasteners may be used.

Control keeper coupling assembly 166 is coupled to core plug body 160. Control keeper coupling assembly 166 includes a bell crank 190, an axle 192, a biasing member 194, and a cover 196. Axle 192 is received in an opening 198 of bell crank 190. Axle 192 is further received in a recess 200 of core plug body 160. Axle 192 supports bell crank 190 which extends into a second recess 202 of core plug body 160. In one example, axle 192 is integrally formed with bell crank 190.

Figure 13:
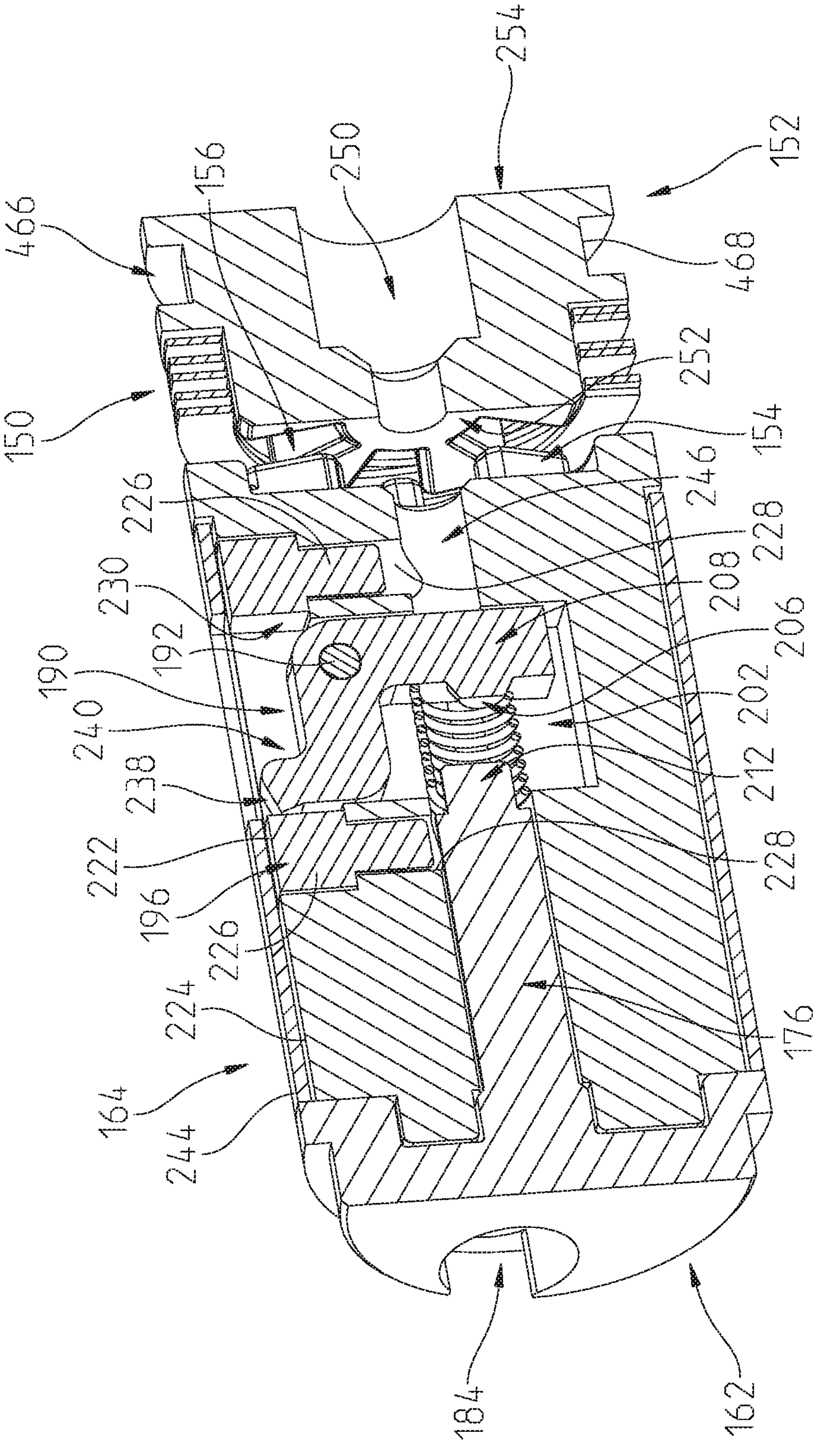
FIG. 13 illustrates a sectional view of lock actuator assembly along lines 13-13 in FIG. 7.
Figure 14:
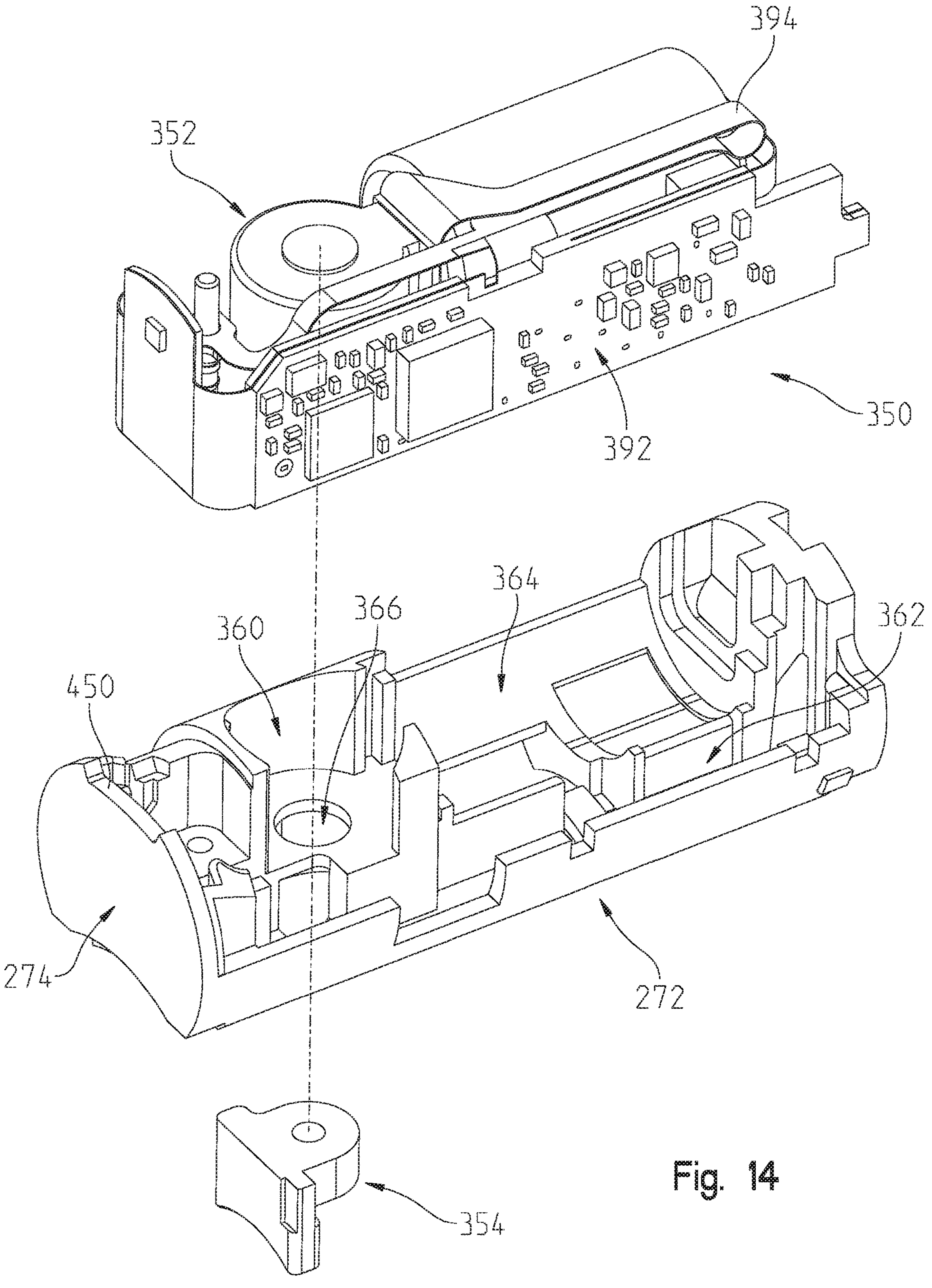
FIG. 14 illustrates an exploded, front, perspective, partial view of the control assembly of FIG. 7.
Figure 15:
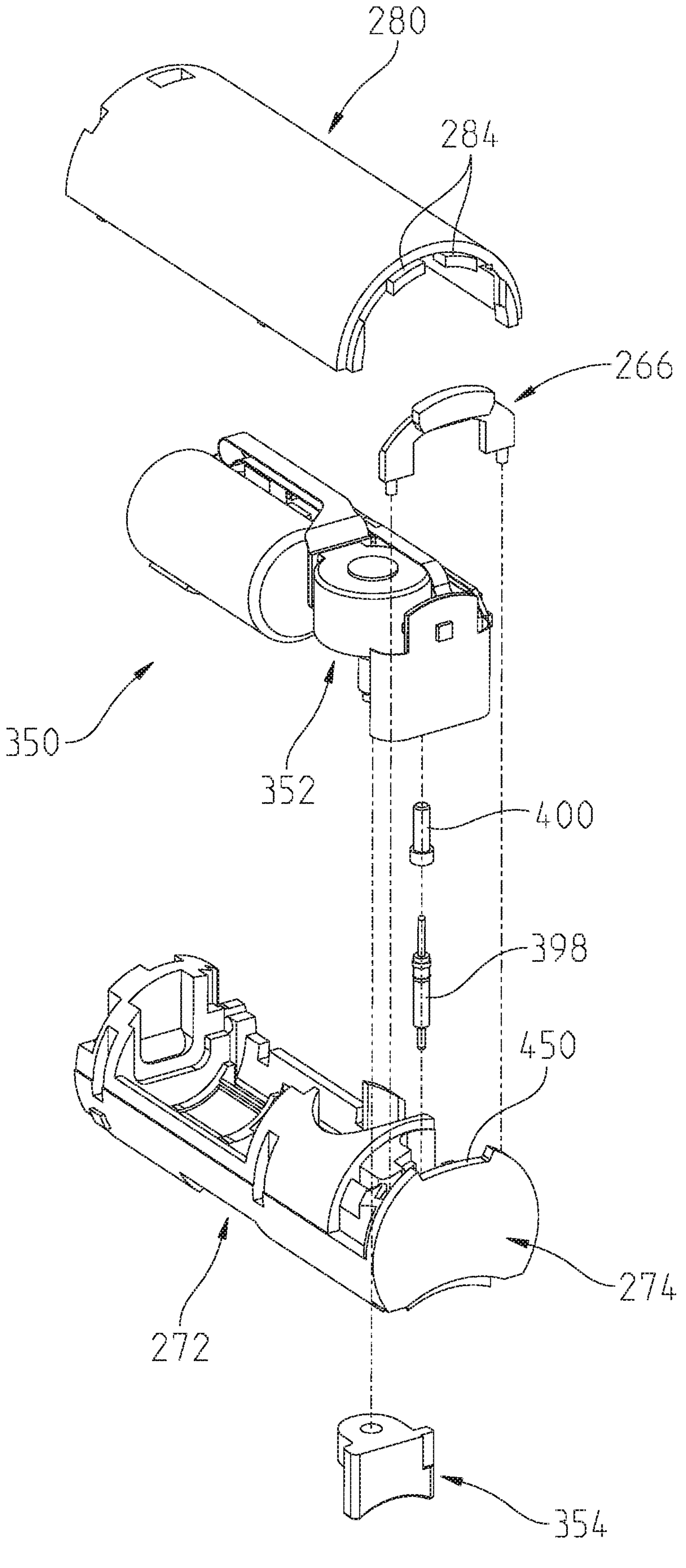
FIG. 15 illustrates another front, exploded, perspective view of the control assembly of FIG. 7.
Figure 16:
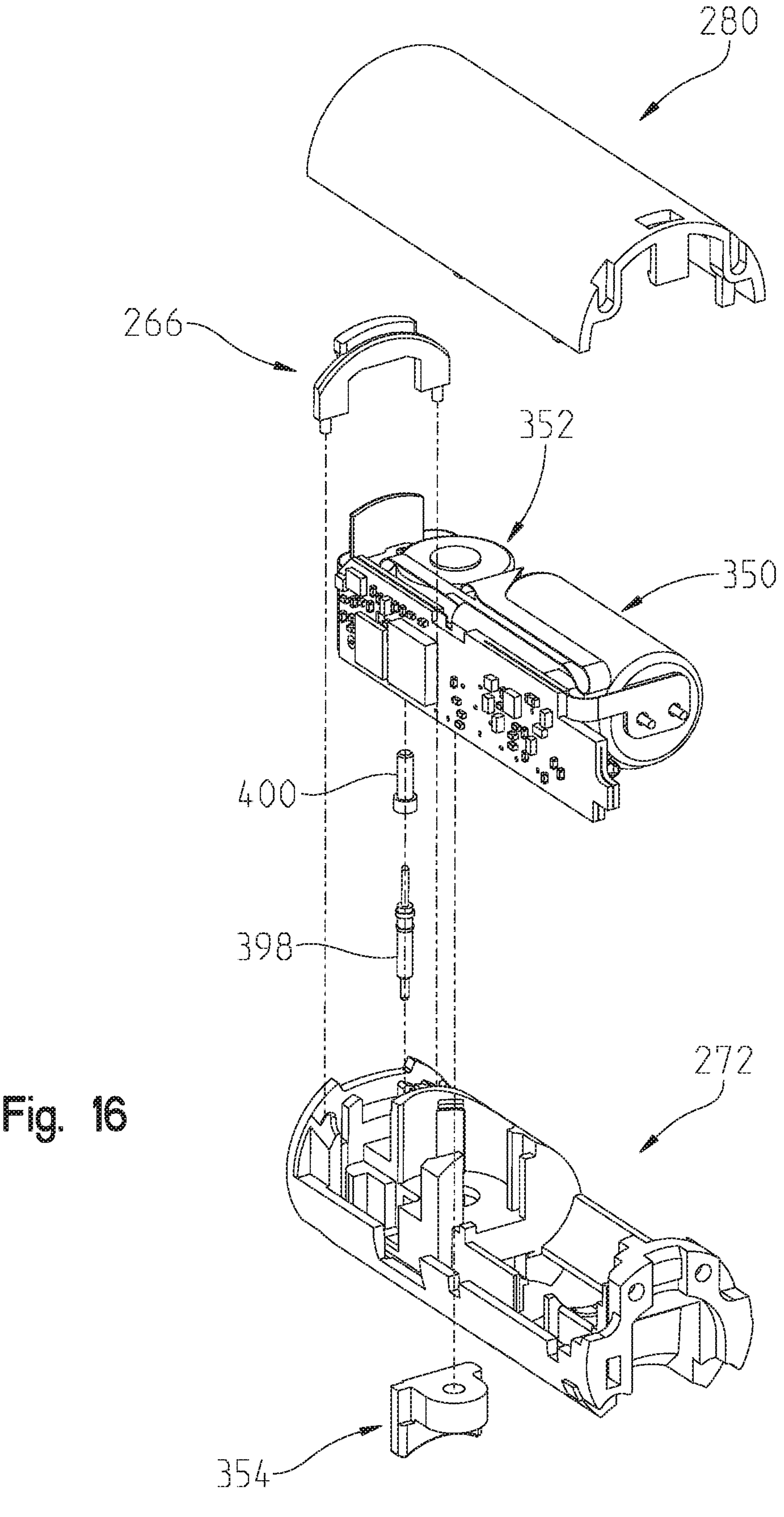
FIG. 16 illustrates a rear, exploded, perspective view of the control assembly of FIG. 7.

Biasing member 194 is compressed between stem 176 of core plug cover 162 and bell crank 190 of control keeper coupling assembly 166. Referring to FIG. 13, a first end 204 of biasing member 194 is received over a protrusion 206 of a first leg 208 of bell crank 190. A second end 210 of biasing member 194 is received over a protrusion 212 of stem 176 of core plug cover 162. A flange 214 of stem 176 (see FIG. 11) of core plug cover 162 provides a stop surface for second end 210 of biasing member 194.

Cover 196 of control keeper coupling assembly 166 is received in a recess 220 of core plug body 160. Recess 200 and recess 202 intersect with and extend into core plug body 160 from recess 220. An exterior surface 222 of cover 196 has a surface profile, in the illustrated embodiment, which matches a surface profile of an exterior surface 224 of core plug body 160. As such, cover 196 and core plug body 160 cooperate to form a cylindrical body. Cover 196 includes locators 226 which cooperate with locators 228 of core plug body 160 to orient cover 196 relative to core plug body 160 such that an opening 230 in cover 196 align with recess 202 of core plug body 160.

As bell crank 190 pivots about an axis 242 of axle 192, a second leg 240 of bell crank 190 may extend through opening 230 of cover 196 and extend above exterior surface 222 of cover 196. Opening 230 of cover 196 and recess 202 of core plug body 160 are sized to also permit second leg 240 of bell crank 190 to be positioned within the cylindrical body formed by core plug body 160 and cover 196 (see FIGS. 9, 10, and 13). When cover 196 is coupled to core plug body 160 to hold bell crank 190 within core plug body 160 and cover 196, the cylindrical body formed by core plug body 160 and cover 196 is received within interior 170 of control sleeve 164 and oriented such that an opening 238 of control sleeve 164 is aligned with opening 230 of cover 196. In this arrangement second leg 240 of bell crank 190 may extend through opening 238 of control sleeve 164 and above an exterior surface 244 of control sleeve 164. By extending second leg 240 of bell crank 190 into opening 238 of control sleeve 164, second leg 240 of bell crank 190 rotationally couples control sleeve 164 to core plug body 160 such that a rotation of core plug body 160 about longitudinal axis 108 results in a rotation of control sleeve 164 about longitudinal axis 108 in the same direction as core plug body 160. By retracting second leg 240 of bell crank 190 from opening 238 of control sleeve 164 to a position below exterior surface 222 of cover 196, control sleeve 164 is not rotationally coupled to core plug body 160 and a rotation of core plug body 160 about longitudinal axis 108 does not result in a rotation of control sleeve 164 about longitudinal axis 108.

FIG. 13 illustrates bell crank 190 with second leg 240 retracted within recess 202 of core plug body 160. Biasing member 194 biases bell crank 190 to the position shown in FIG. 13. Core plug body 160 includes a channel 246 which intersects with a front face 248 of core plug body 160 and with recess 202 of core plug body 160. As explained herein, channel 240 permits an actuator, control pin 700 (see FIG. 32), to be inserted into core plug body 160 to move bell crank 190 to a position wherein second leg 240 of bell crank 190 extends into opening 238 of control sleeve 164 to couple control sleeve 164 to core plug body 160. As further illustrated in FIG. 13, clutch 152 includes a channel 250 which extends from a front face 254 of clutch 152 to a rear face 252 of clutch 152. Channel 250 of clutch 152 is aligned with channel 246 of core plug body 160. Thus, an actuator, control pin 700 (see FIG. 32), received in channel 250 may extend beyond rear face 252 of clutch 152 and enter channel 246 of core plug body 160.

Referring again to FIG. 51, a control keeper coupling assembly 1166 is coupled to core plug body 1160. Control keeper coupling assembly 1166 includes bell crank 1190, a biasing member 1194, and a cover 1196. Bell crank 1190 illustratively includes a first leg 1208 and a second leg 1240 coupled at an axle 1193. Axle 1193 is received in a recess 1200 of core plug body 1160 and rotationally supports bell crank 1190 which extends into a second recess 1202 of core plug body 1160. In the exemplary embodiment shown in FIG. 51, first leg 1208, second leg 1240, and axle 1193 are integrally formed. It is contemplated, however, that first leg 1208, second leg 1240, and axle 1193 could comprise one or more independent components supported by core plug body 1160. In another exemplary embodiment, axle 1193 comprises one or more components supported for rotation within a recess of bell crank 1190.

First leg 1208 of bell crank 1190 extends in a first direction while second leg 1240 of bell crank 1190 extends in a second direction angularly offset from the first direction. In the exemplary embodiment shown in FIG. 51, the second direction is generally orthogonal relative to the first direction. In another exemplary embodiment, the second direction is generally acute relative to the first direction. In yet another exemplary embodiment, the second direction is generally relative obtuse to first direction. Second leg 1240 couples to axle 1193 at a first end 1241 of second leg 1240. Opposite first end 1241 is a second end 1243 of second leg 1240. Second end 1243 includes an upper portion 1247 and a lower portion 1245. In the exemplary embodiment shown in FIG. 51, upper portion 1247 extends generally upwardly and lower portion 1245 extends generally downwardly such that a longitudinal profile of second leg 1240 of bell crank 1190 is generally T-shaped. Second leg 1240 cantilevers from axle 1193 such that second end 1243 may deflect relative to first end 1241 and axle 1193 if a sufficient force is applied to upper portion 1147, lower portion 1145, or a point proximate second end 1243.

Biasing member 1194 is compressed between a stem 1176 of core plug cover 1162 and bell crank 1190 of control keeper coupling assembly 1166. Referring to FIGS. 51 and 52, a first end 1204 of biasing member 1194 is received over a protrusion 1206 of first leg 1208 of bell crank 1190. A second end 1210 of biasing member 1194 is received over a protrusion 1212 of stem 1176 of core plug cover 1162. A flange 1214 of stem 1176 of core plug cover 1162 provides a stop surface for second end 1210 of biasing member 1194.

As bell crank 1190 pivots about an axis 1242 of axle 1193, second leg 1240 of bell crank 1190 may extend through an opening 1230 of cover 1196 and upper portion 1247 of second leg 1240 may extend above an exterior surface 1222 of cover 1196. Opening 1230 of cover 1196 and recess 1202 of core plug body 1160 are sized to also permit second leg 1240 of bell crank 1190 to be positioned within the cylindrical body formed by core plug body 1160 and cover 1196 (see FIGS. 51 and 52). When cover 1196 is coupled to core plug body 1160 to hold bell crank 1190 within core plug body 1160 and cover 1196, the cylindrical body formed by core plug body 1160 and cover 1196 is received within an interior 1170 of control sleeve 1164 and oriented such that an opening 1238 of control sleeve 1164 is aligned with opening 1230 of cover 1196. In this arrangement, upper portion 1247 of second leg 1240 of bell crank 1190 may extend through opening 1238 of control sleeve 1164 and above an exterior surface 1244 of control sleeve 1164. By extending upper portion 1247 of second leg 1240 into opening 1238 of control sleeve 1164, upper portion 1247 of second leg 1240 of bell crank 1190 rotationally couples control sleeve 1164 to core plug body 1160 such that a rotation of core plug body 1160 about longitudinal axis 1108 results in a rotation of control sleeve 1164 about longitudinal axis 1108 in the same direction as core plug body 1160. By retracting upper portion 1247 of second leg 1240 from opening 1238 of control sleeve 1164 to a position below exterior surface 1222 of cover 1196, control sleeve 1164 is not rotationally coupled to core plug body 1160 and a rotation of core plug body 1160 about longitudinal axis 1108 does not result in a rotation of control sleeve 1164 about longitudinal axis 1108.

FIGS. 50A and 52 illustrate bell crank 1190 with upper portion 1247 of second leg 1240 retracted within recess 1202 of core plug body 1160. Biasing member 1194 biases bell crank 1190 to the position shown in FIGS. 50A and 52. Core plug body 1160 includes a channel 1246 which intersects with a front face 1248 of core plug body 1160 and with recess 1202 of core plug body 1160. Channel 1246 permits an actuator, control pin 1700 (see FIG. 52), to be inserted into core plug body 1160 in direction 1702 to move bell crank 1190 to a position wherein upper portion 1247 of second leg 1240 extends into opening 1238 of control sleeve 1164 to couple control sleeve 1164 to core plug body 1160. As further illustrated in FIGS. 50A and 50B, clutch 1152 includes a channel 1250 which extends from a front face 1254 of clutch 1152 to a rear face 1252 of clutch 1152. Channel 1250 of clutch 1152 is aligned with channel 1246 of core plug body 1160. Thus, an actuator, control pin 1700 (see FIG. 52), received in channel 1250 in direction 1702 may extend beyond rear face 1252 of clutch 1152 and enter channel 1246 of core plug body 160.

In certain installations, core plug body 1160 may be rotationally offset relative to control sleeve 1164 about longitudinal axis 1108 such that opening 1238 of control sleeve 1164 is not aligned with opening 1230 of cover 1196. Accordingly, upper portion 1247 of second end 1243 of second leg 1240 of bell crank 1190 may not extend into opening 1238 of control sleeve 1164 when an actuator, control pin 1700 (see FIG. 52), is inserted into channel 1246 of core plug body 1160 in direction 1702 to move bell crank 1190. Instead, upper portion 1247 of second leg 1240 may impinge on an inner surface of control sleeve 1164 and second end 1243 may flex relative to first end 1241 of second leg 1240 and axle 1193. Rotation of core plug body 1160 about longitudinal axis 1108 with an actuator, control pin 1700 (see FIG. 52), continuously inserted into channel 1246 in direction 1702 will eventually result in opening 1230 of cover 1196 aligning with opening 1238 of control sleeve 1162. Once opening 1230 aligns with opening 1238, second end 1243 of second leg 1240 of bell crank 1190 will quickly reform to its original shape and upper portion 1247 of second leg 1240 will extend into opening 1238 of control sleeve 1164 to rotationally couple control sleeve 1164 to core plug body 1160. Because upper portion 1247 of second leg 1240 snaps into opening 1238 of control sleeve 1162 once opening 1230 is aligned with opening 1238, a user is provided with near instantaneous feedback that control sleeve 1164 is rotationally coupled to core plug body 1160.

Referring back to FIGS. 7 and 8, lock actuator assembly 144 which includes biasing member 150, clutch 152, core plug body 160 and control sleeve 164 are received in lower cavity 142 of core body 112 through a rear face 260 of core body 112. Core body 112 includes a recess 262 to receive core keeper 110 of control sleeve 164 (see FIG. 1). As shown in FIG. 7, core body 112 includes a stop 264 which limits the axial movement of clutch 152 towards the front of core body 112 (see FIG. 26).

Control assembly 146 is received in upper cavity 140 of core body 112. The components of control assembly 146 are described in more detail herein in relation to FIGS. 14-21. One of the components of control assembly 146, a light guide 266, is positioned forward of an upper wall 268 of core body 112 in a recess 270 of upper wall 268 (see FIG. 7). Light guide 266 is supported by a cradle 272 of control assembly 146. A front wall 274 of cradle 272 is positioned against a front wall 276 of core body 112.

Control assembly 146 is held in place relative to core body 112 with a top cover 280 and a rear cover 282. Top cover 280 includes a plurality of tabs 284 which are positioned under upper wall 268 of core body 112 to hold a front portion of top cover 280 relative to core body 112. Rear cover 282 includes a plurality of locators 286, illustratively protrusions, and locators 288, illustratively protrusions. Outer locators 286 are received in external recesses 290 of top cover 280, respectively, while inner locators 286 are received in voids 292; thereby each pair of outer and inner locators 286 captures a wall 294 of top cover 280. Locators 288 are received in respective recesses 296 of core body 112. Thus, locators 286 are coupled to top cover 280 and locators 288 are coupled to core body 112 to hold the rear end of top cover 280 relative to core body 112. Rear cover 282 is held relative to core body 112 with a fastener 302. Fastener 302 is received in an opening 300 in rear cover 282 and is secured to core body 112 through a threaded aperture 304.

In addition to holding control assembly 146 relative to core body 112, rear cover 282 also holds lock actuator assembly 144 relative to core body 112. Rear cover 282 includes an opening 310 sized to receive a head 312 of core plug cover 162. A stop 314 is provided on core plug cover 162. Stop 314 is positioned to rest against surface 316 of rear cover 282 to prevent the rearward axial movement of core plug cover 162. As shown in FIG. 2, head 312 of core plug cover 162 extends outward from rear cover 282. Although head 312 with openings 184 are illustrated for interfacing with lock pins 120 of lock cylinder 122, different configurations of head 312 are contemplated including recesses and/or protrusions to couple tailpieces or other cam members to lock actuator assembly 144. Electro-mechanical lock core 100 may be configured for use with other types of lock cylinder 122, padlocks, rim cylinders, key in knob/lever cylinders, and other locking devices.

Figure 17:
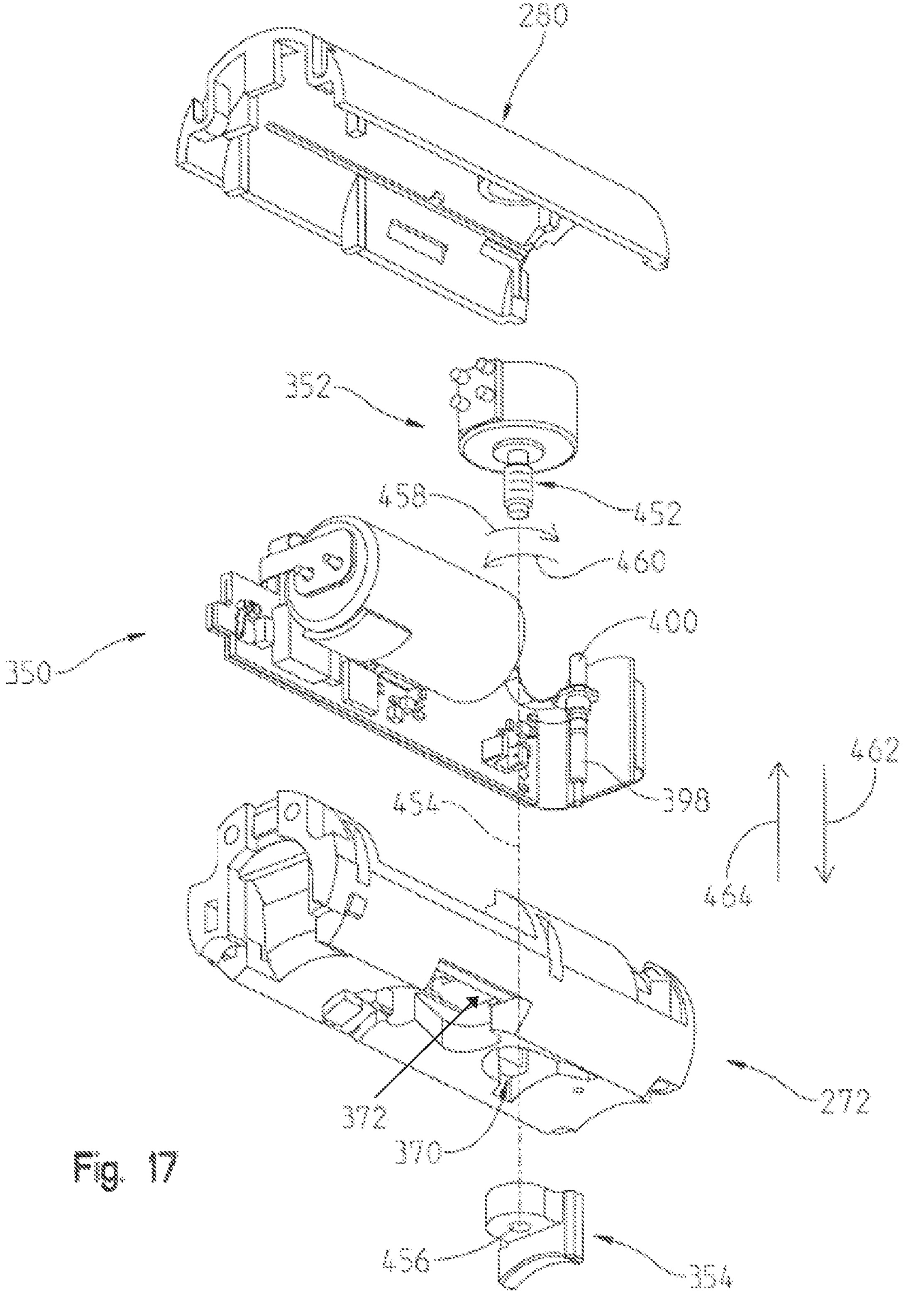
FIG. 17 illustrates another rear, exploded, partial, perspective view of the control assembly of FIG. 7.

Referring to FIGS. 14-22, control assembly 146 is illustrated in more detail. Control assembly 146 includes cradle 272, an electrical assembly 350, a motor 352 controlled by the electrical assembly 350, light guide 266, a blocker 354, and top cover 280. Cradle 272 includes various features, walls, recesses, and other geometries to position and hold electrical assembly 350, motor 352, light guide 266, and blocker 354 (see FIG. 8 for an assembled view). Cradle 272 on an upper side includes a holder 360 to hold motor 352 and an elongated channel 362 and cradle 364 to hold portions of electrical assembly 350. Holder 360 includes a central aperture 366 through which an output shaft 452 of motor 352 extends (see FIG. 27). In one example, motor 352 is a stepper motor. Referring to FIG. 17, cradle 272 on a bottom side includes a recess 370 into which blocker 354 may be positioned. Recess 370 intersects with central aperture 366. Cradle 272, on a bottom side, further includes a recess 372 to accommodate core keeper 110 when core keeper 110 is positioned within core body 112, as explained in more detail herein.

Figure 45:
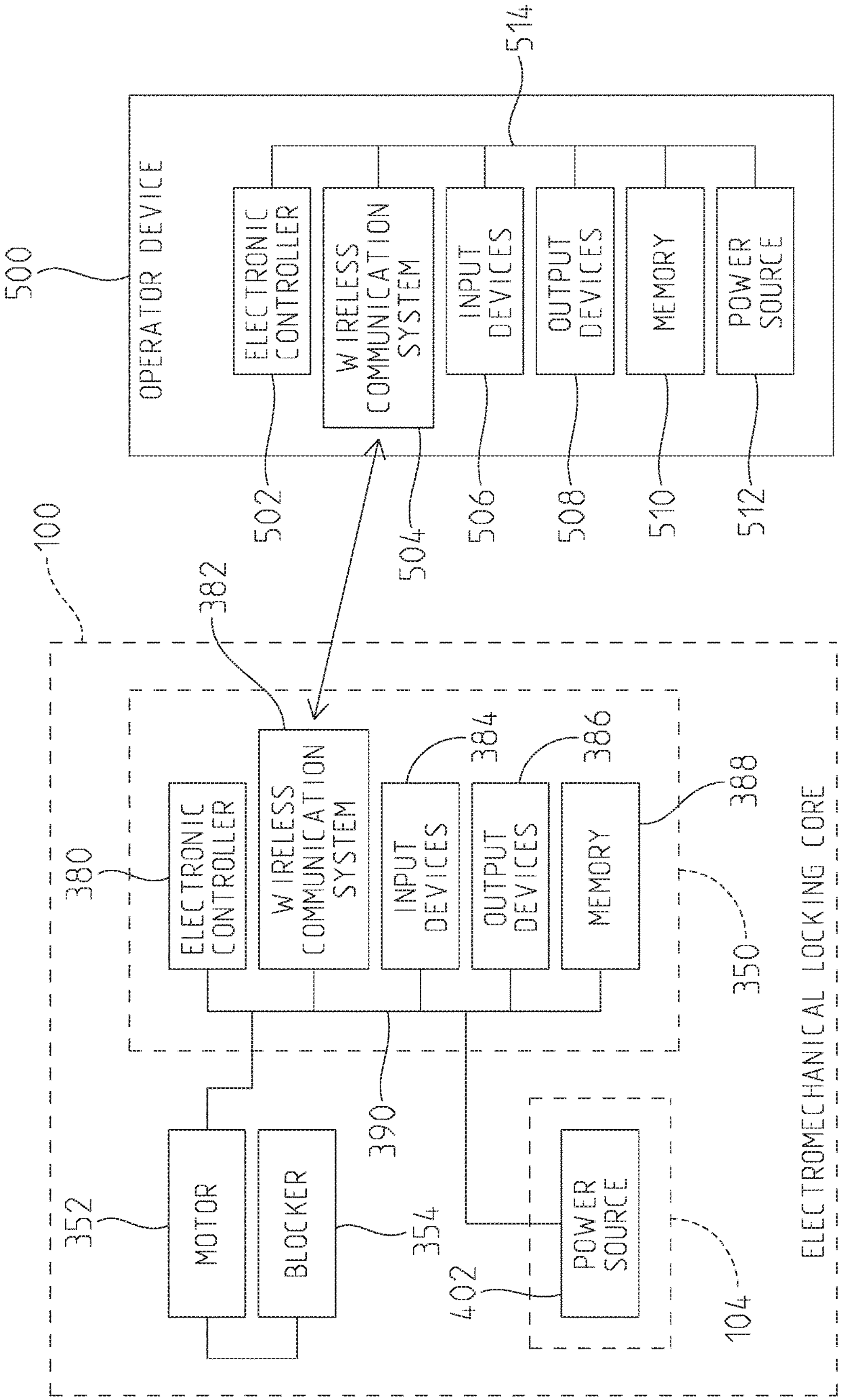
FIG. 45 is a representative view of an exemplary electro-mechanical locking core and an operator device.
Figure 46:
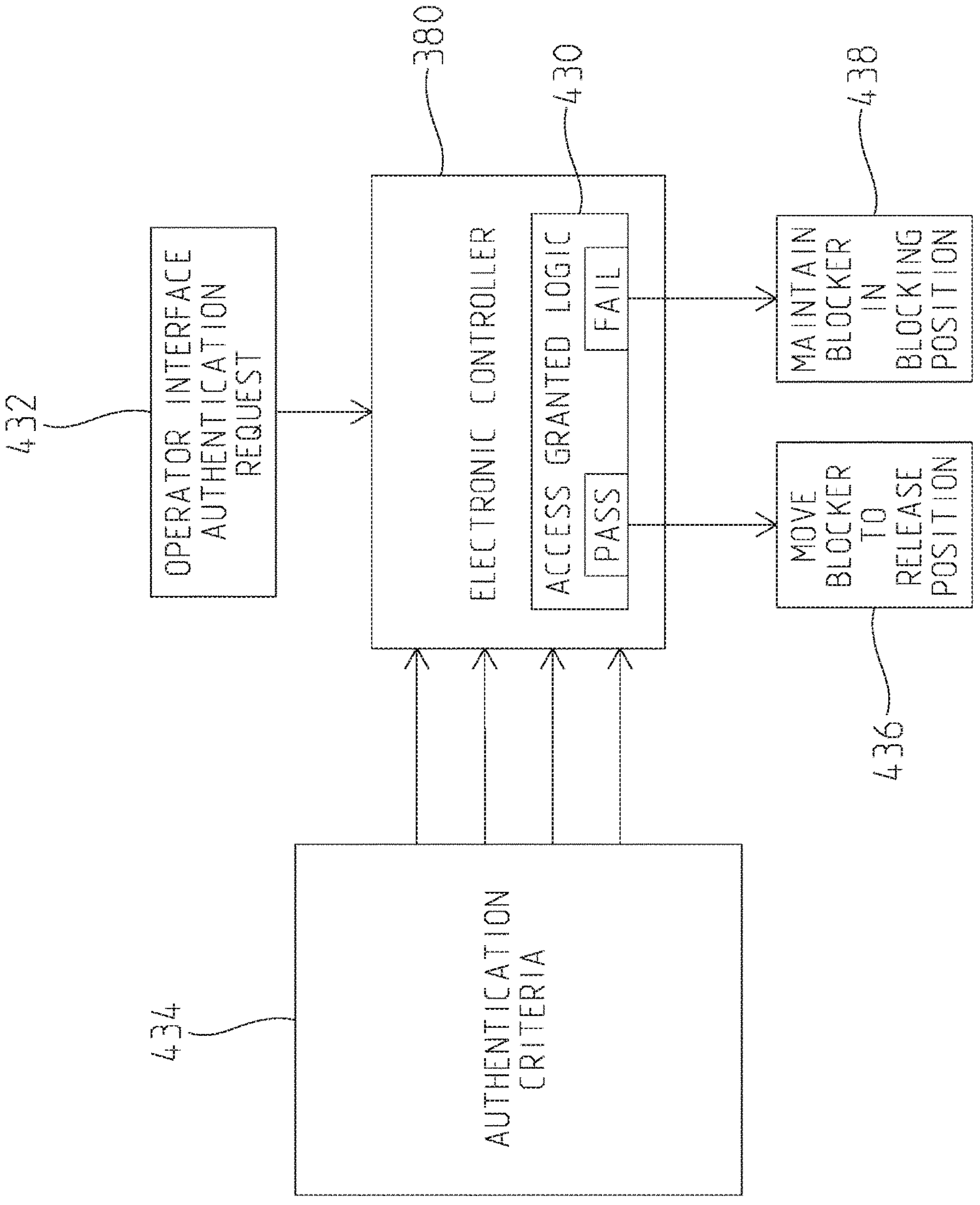
FIG. 46 is a representative view of a control sequence of the electro-mechanical locking core.

Referring to FIGS. 45 and 46, an exemplary representation of electrical assembly 350 and an operator device 500 is shown. Electrical assembly 350 includes an electronic controller 380, a wireless communication system 382, one or more input devices 384, one or more output devices 386, and a memory 388 all electrically interconnected through circuitry 390. In the illustrated embodiment, electronic controller 380 is microprocessor-based and memory 388 is a non-transitory computer readable medium which includes processing instructions stored therein that are executable by the microprocessor of electronic controller 380 to control operation of electro-mechanical lock core 100 including positioning blocker 354 in one of a blocking position (see FIG. 20) and a release position (see FIG. 21). Exemplary non-transitory computer-readable mediums include random access memory (RAM), read-only memory (ROM), erasable programmable read-only memory (e.g., EPROM, EEPROM, or Flash memory), or any other tangible medium capable of storing information.

Figure 18:
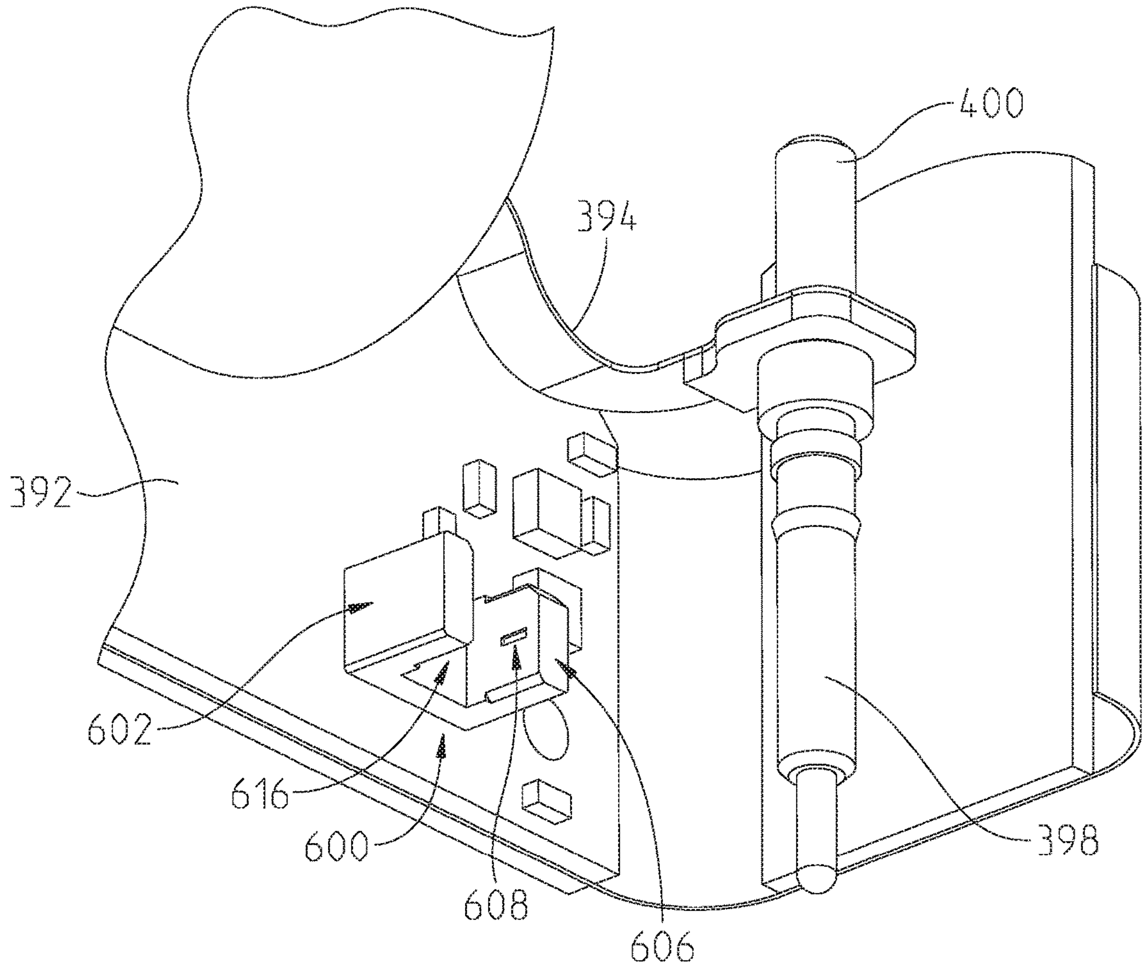
FIG. 18 illustrates a partial view of the control assembly of FIG. 7 illustrating an electrical contact and position sensing assembly.
Figure 19:
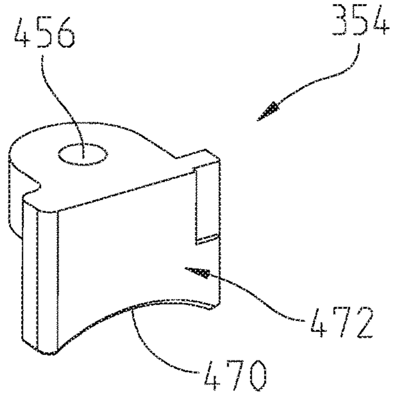
FIG. 19 illustrates a front, perspective view of a blocker of the control assembly of FIG. 7.

Motor 352 is operatively coupled to electronic controller 380 and circuitry 390. Circuitry 390 includes circuitry on one or more circuit boards 392 (see FIG. 14) and a power bus 394 (see FIG. 14). As shown in FIG. 18, power bus 394 is operatively coupled to a first electrical contact, illustratively as pogo pin 398 received in a holder 400. Pogo pin 398 is operatively coupled to a contact 422 of a power assembly 420 (see FIGS. 23 and 27) to receive electrical power from a power source 402 (see FIG. 45). In one example, electrical contact 422 is made of brass. Power bus 394 is further electrically coupled to additional components of electrical assembly 350 to provide power to electrical assembly 350. Electrical assembly 350 is grounded through core body 112.

Figure 24:
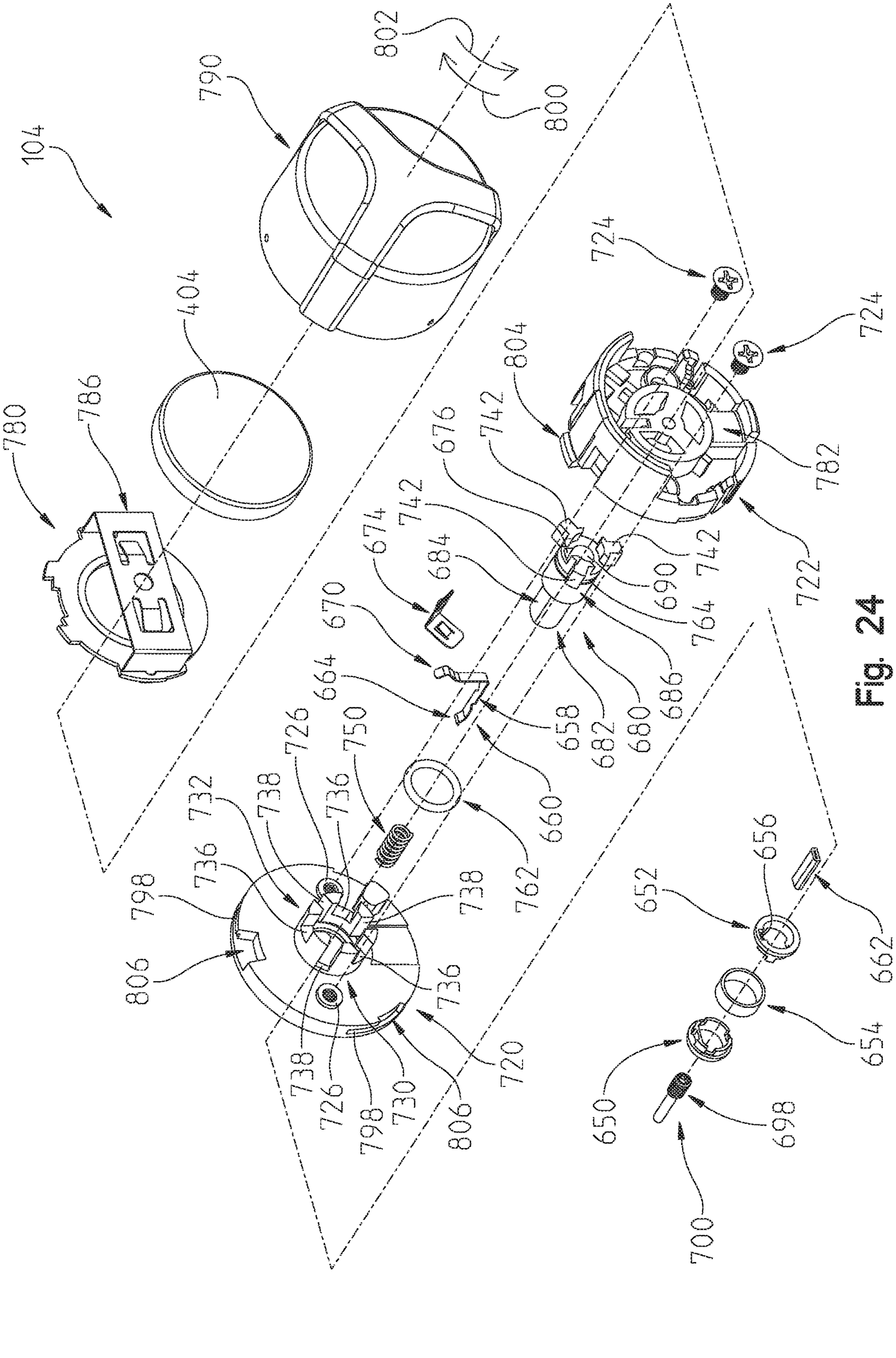
FIG. 24 illustrates an exploded, front, perspective view of an operator actuation assembly of the electro-mechanical lock core of FIG. 5, the operator actuation assembly including a knob.

In the example illustrated in FIG. 45, power source 402 is positioned within operator actuation assembly 104 of electro-mechanical lock core 100. In other embodiments, power source 402 may be positioned in core assembly 102 of electro-mechanical lock core 100. Advantages, among others, for incorporating power source 402 in operator actuation assembly 104 is the ease of replacement of power source 402 and the ability to incorporate a battery as the power source with an increased capacity compared to the space constraints of core assembly 102 of electro-mechanical lock core 100. Referring to FIG. 24, power source 402 is illustrated as a battery 404 incorporated as part of operator actuation assembly 104. Additional details regarding operator actuation assembly 104 are provided herein.

Returning to FIG. 45, wireless communication system 382 includes a transceiver and other circuitry needed to receive and send communication signals to other wireless devices, such as an operator device 500. In one embodiment, wireless communication system 382 includes a radio frequency antenna and communicates with other wireless devices over a wireless radio frequency network, such as a BLUETOOTH network or a WIFI network.

In one embodiment, electro-mechanical lock core 100 communicates with operator device 500 without the need to communicate with other electro-mechanical lock core 100. Thus, electro-mechanical lock core 100 does not need to maintain an existing connection with other electro-mechanical locking cores 100 to operate. One advantage, among others, is that electro-mechanical lock core 100 does not need to maintain network communications with other electro-mechanical lock core 100 thereby increasing the battery life of battery 404. In one embodiment, electro-mechanical lock core 100 does maintain communication with other electro-mechanical locking cores 100 and is part of a network of electro-mechanical locking cores 100. Exemplary networks include a local area network and a mesh network.

Exemplary input devices 384 include buttons, switches, levers, a touch display, keys, and other operator actuatable devices which may be actuated by an operator to provide an input to electronic controller 380. Once communication has been established with operator device 500, various input devices 506 of operator device 500 may be actuated by an operator to provide an input to electronic controller 380. In one embodiment, electro-mechanical lock core 100 requires an actuation of an input device 384 of electro-mechanical lock core 100 prior to taking action based on communications from operator device 500. An advantage, among others, for requiring an actuation of an input device 384 of electro-mechanical lock core 100 prior to taking action based on communications from operator device 500 is that electro-mechanical lock core 100 does not need to evaluate every wireless device that comes into proximity with electro-mechanical lock core 100. Rather, electro-mechanical lock core 100 may use the actuation of input devices 384 to start listening to communications from operator device 500. As explained in more detail herein, in one embodiment, operator actuation assembly 104 functions as an input device 384. Operator actuation assembly 104 capacitively senses an operator tap on operator actuation assembly 104 or in close proximity to operator actuation assembly 104.

Exemplary output devices 386 include visual output devices, audio output device, and/or tactile output devices. Exemplary visual output devices include lights, segmented displays, touch displays, and other suitable devices for providing a visual cue or message to an operator of operator device 500. Exemplary audio output devices include speakers, buzzers, bells and other suitable devices for providing an audio cue or message to an operator of operator device 500. Exemplary tactile output devices include vibration devices and other suitable devices for providing a tactile cue to an operator of operator device 500. In one embodiment, electro-mechanical lock core 100 sends one or more output signals from wireless communication system 382 to operator device 500 for display on operator device 500.

Operator device 500 is carried by an operator, Exemplary operator device 500 include cellular phones, tablets, personal computing devices, watches, badges, and other suitable devices associated with an operator that are capable of communicating with electro-mechanical lock core 100 over a wireless network. Exemplary cellular phones, include the IPHONE brand cellular phone sold by Apple Inc., located at 1 Infinite Loop, Cupertino, CA 95014 and the GALAXY brand cellular phone sold by Samsung Electronics Co., Ltd.

Operator device 500 includes an electronic controller 502, a wireless communication system 504, one or more input devices 506, one or more output devices 508, a memory 510, and a power source 512 all electrically interconnected through circuitry 514. In one embodiment, electronic controller 502 is microprocessor-based and memory 510 is a non-transitory computer readable medium which includes processing instructions stored therein that are executable by the microprocessor of operator device 500 to control operation of operator device 500 including communicating with electro-mechanical lock core 100. Exemplary non-transitory computer-readable mediums include random access memory (RAM), read-only memory (ROM), erasable programmable read-only memory (e.g., EPROM, EEPROM, or Flash memory), or any other tangible medium capable of storing information.

Figure 21:
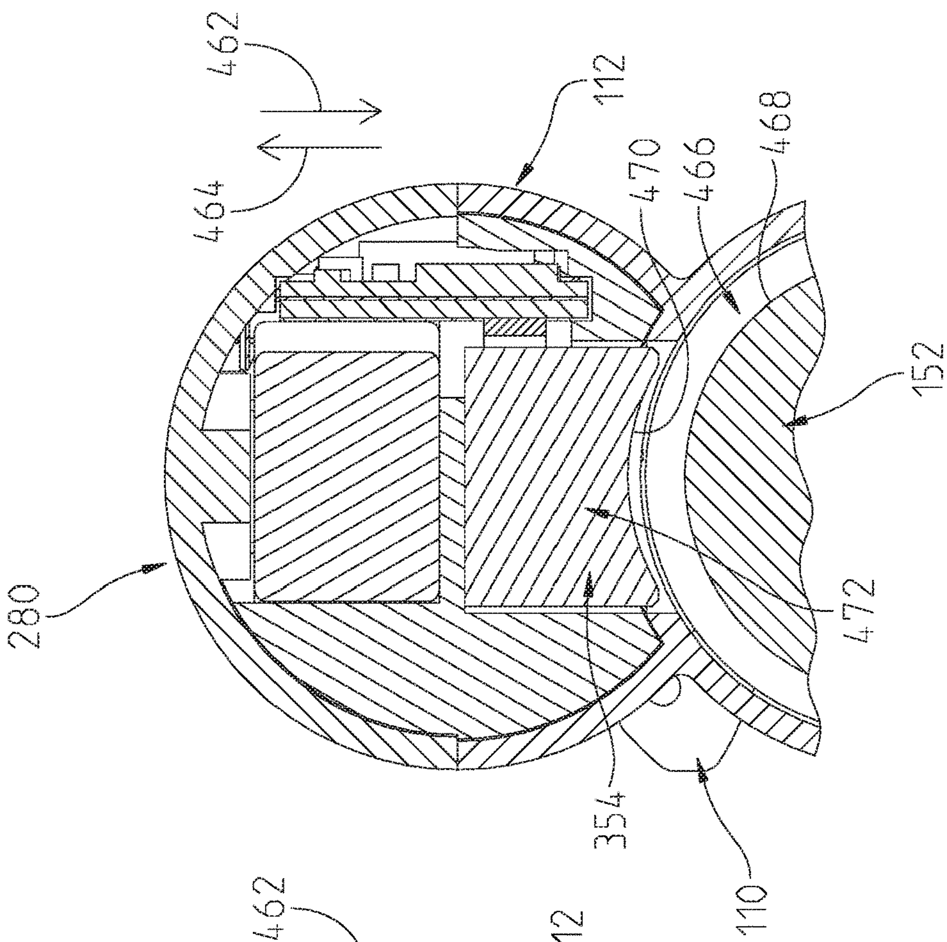
FIG. 21 illustrates the sectional view of FIG. 20 illustrating the blocker in a second release position wherein the blocker is disengaged relative to the clutch of the core plug assembly of FIG. 11.

Referring to FIG. 46, electronic controller 380 executes an access granted logic 430 which controls the position of blocker 354 in either a blocking position (see FIG. 20) and a release position (see FIG. 21). The term “logic” as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium 388 comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 380 is not microprocessor-based, but rather is configured to control operation of blocker 354 and/or other components of electro-mechanical lock core 100 based on one or more sets of hardwired instructions. Further, electronic controller 380 may be contained within a single device or be a plurality of devices networked together or otherwise electrically connected to provide the functionality described herein.

Electronic controller 380 receives an operator interface authentication request, as represented by block 432. In one embodiment, operator interface authentication request 432 is a message received over the wireless network from operator device 500. In one embodiment, operator interface authentication request 432 is an actuation of one or more of input devices 384. As explained in more detail herein, in one embodiment, operator actuation assembly 104 functions as an input device 384. Operator actuation assembly 104 capacitively senses an operator tap on operator actuation assembly 104 or in close proximity to operator actuation assembly 104.

Electronic controller 380 further receives authentication criteria 434 which relate to the identity and/or access level of the operator of operator device 500. In one embodiment, the authentication criteria is received from operator device 500 or communicated between electronic controller 380 and operator device 500.

Access granted logic 430 based on operator interface authentication request 432 and authentication criteria 434 determines whether the operator of operator device 500 is granted access to actuate core plug assembly 106 which in turn actuates cam member 126 in the illustrated embodiment or is denied access to actuate core plug assembly 106. If the operator of operator device 500 is granted access to actuate core plug assembly 106, access granted logic 430 powers motor 352 to move blocker 354 to the release position, as represented by block 436. If the operator of operator device 500 is denied access to actuate core plug assembly 106, access granted logic 430 maintains blocker 354 in the blocking position, as represented by block 438.

Figure 47:
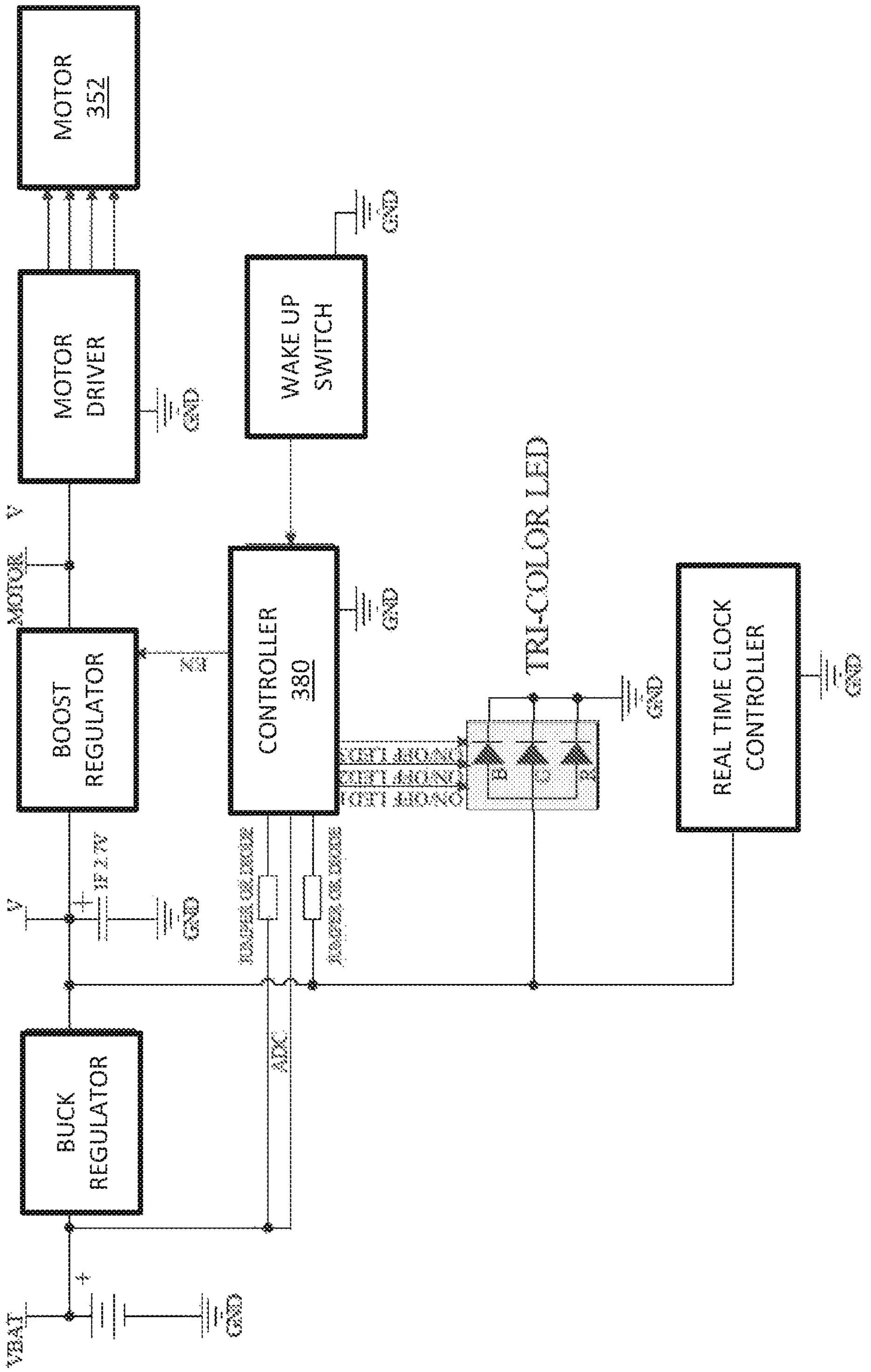
FIG. 47 is a first exemplary control system for the electro-mechanical locking core.

A first exemplary embodiment 530 of electrical assembly 350 is illustrated in FIG. 47.

Figure 48:
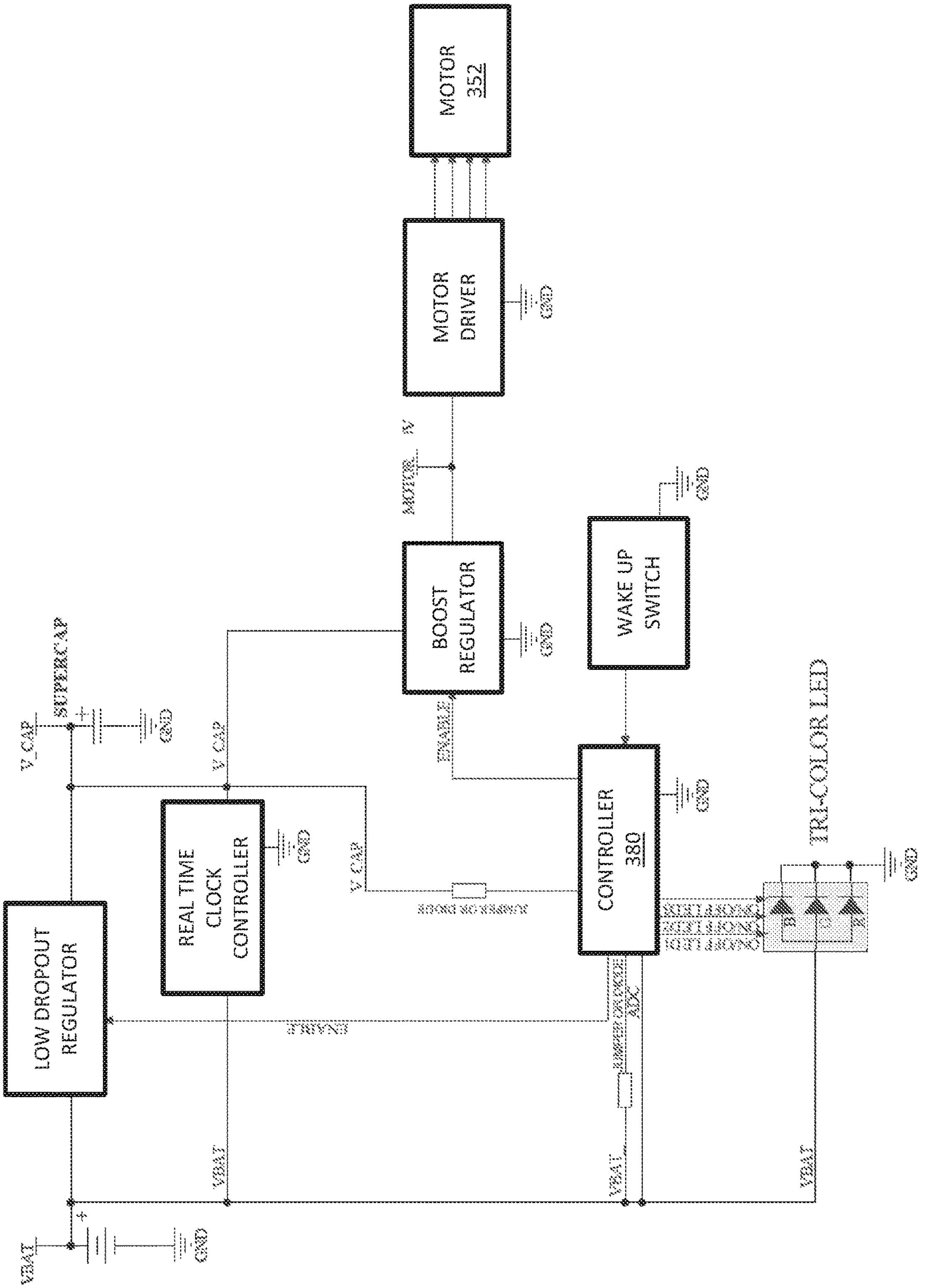
FIG. 48 is a second exemplary control system for the electro-mechanical locking core.

A second exemplary embodiment 570 of electrical assembly 350 is illustrated in FIG. 48.

Light guide 266 communicates the output of diodes (see FIGS. 47 and 48), an exemplary output device, to an operator external to electro-mechanical lock core 100. Returning to FIG. 15, light guide 266 is positioned at the front of cradle 272. Cradle 272 includes a recess 450 in front wall 274 which receives a central portion of light guide 266. As shown in FIG. 1, the central portion of light guide 266 is visible above operator actuation assembly 104 when electro-mechanical lock core 100 is assembled.

Referring to FIG. 17, motor 352 includes a threaded output shaft 452 which is rotational about axis 454 and is received in a threaded aperture 456 of blocker 354. The orientation of blocker 354 is maintained by the shape and size of recess 370 in cradle 272. As such, due to a rotation of threaded output shaft 452 in a first direction 458, blocker 354 is moved downwardly in direction 462 and due to a rotation of threaded output shaft 452 in a second direction 460, blocker 354 is moved upwardly in direction 464.

Figure 9:
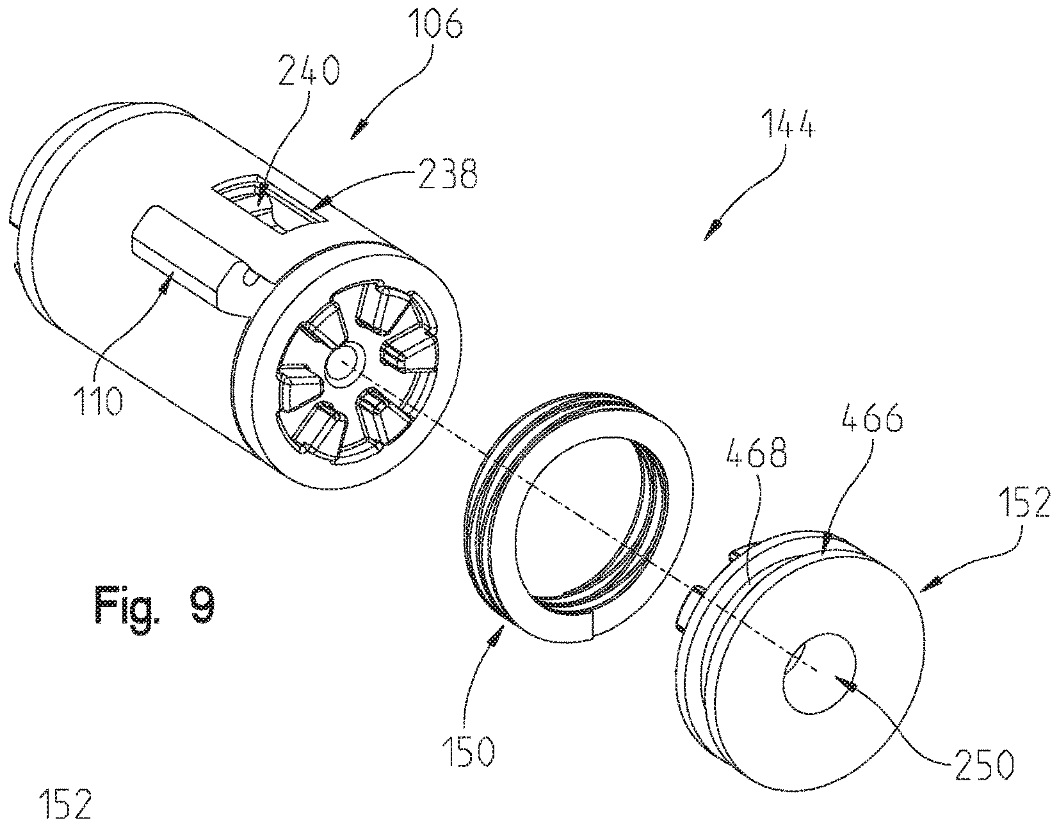
FIG. 9 illustrates an exploded, front, perspective view of lock actuator assembly of the electro-mechanical lock core of FIG. 5.
Figure 10:
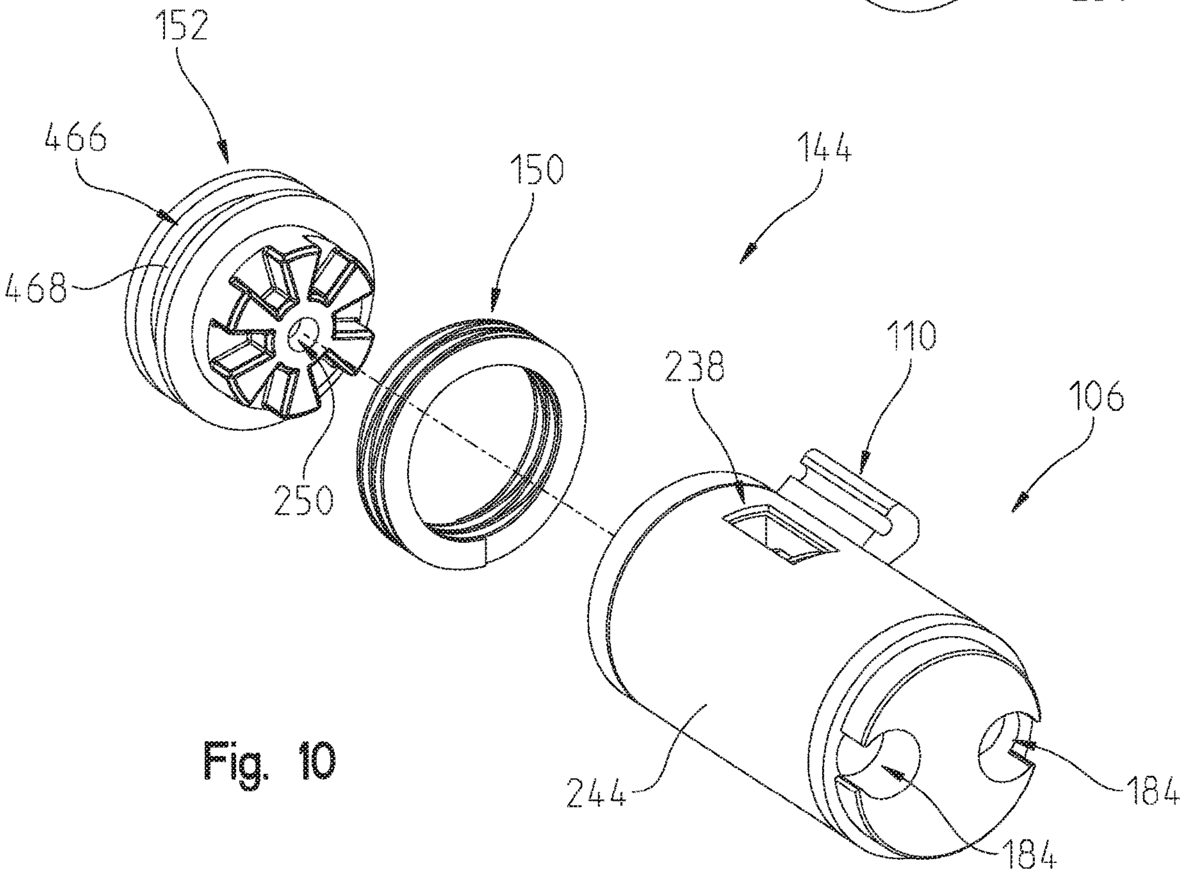
FIG. 10 illustrates an exploded, rear, perspective view of lock actuator assembly of the electro-mechanical lock core of FIG. 5.
Figure 11:
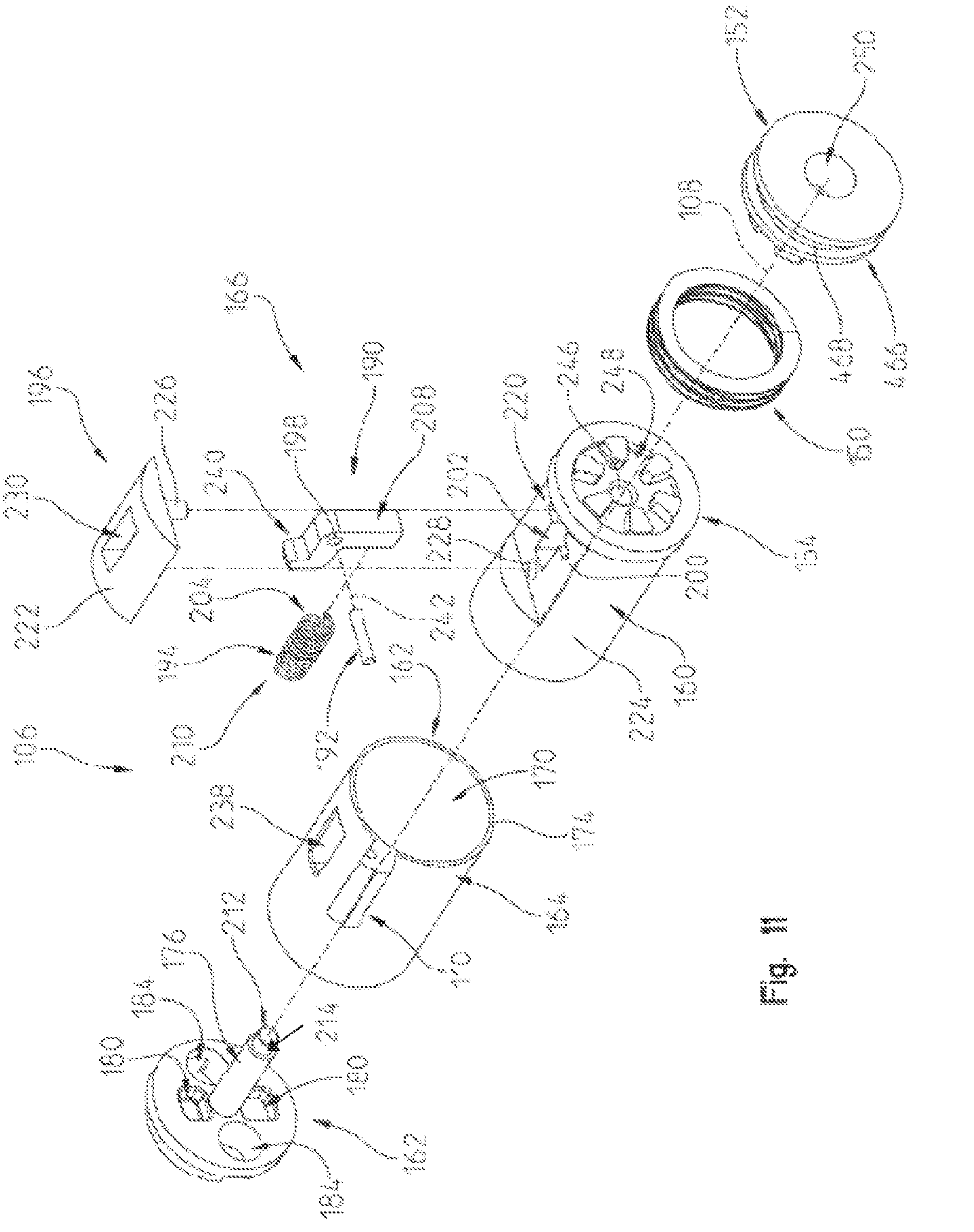
FIG. 11 illustrates an exploded, front, perspective view of a core plug assembly of lock actuator assembly of FIG. 9.
Figure 12:
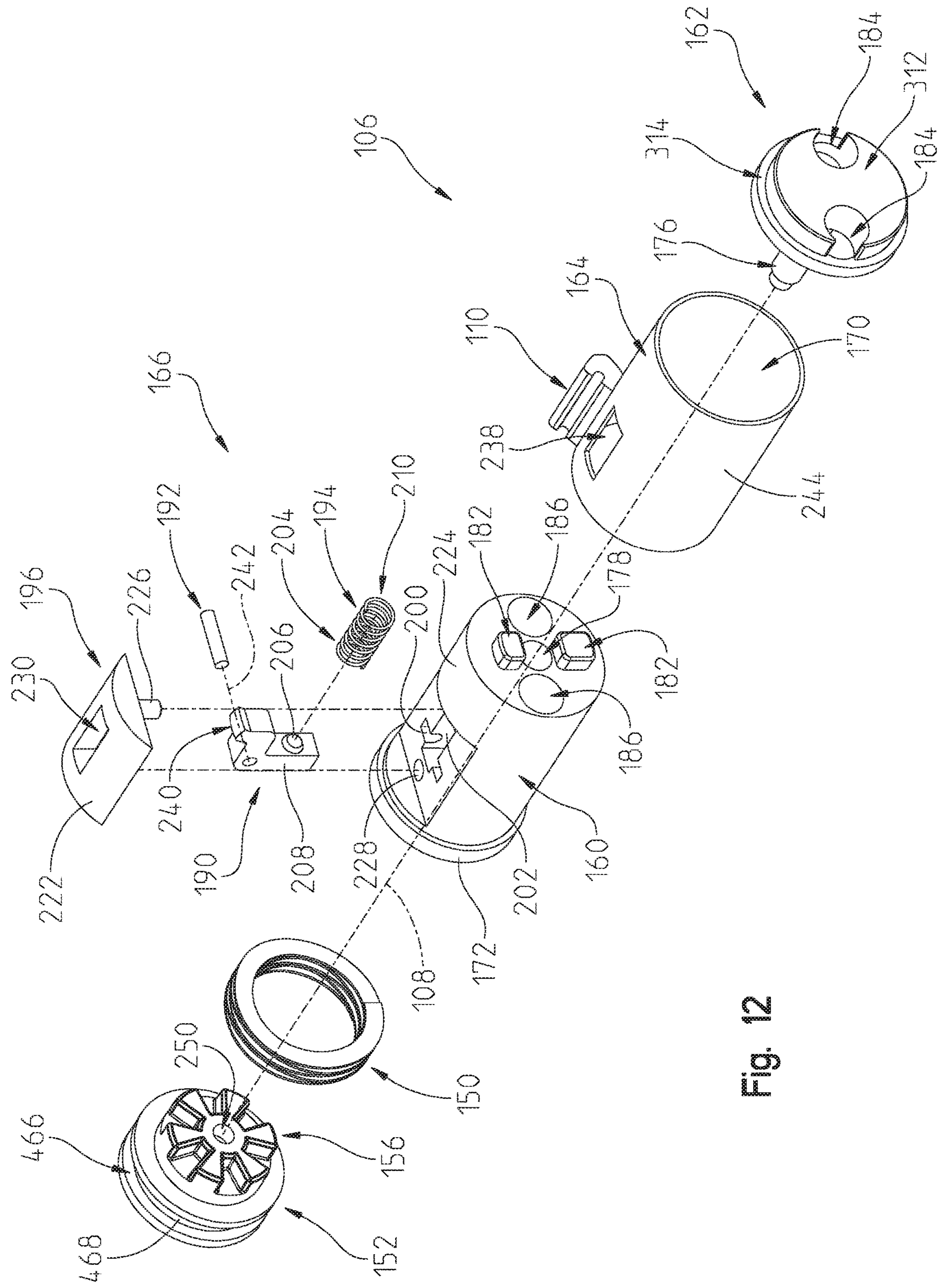
FIG. 12 illustrates an exploded, rear, perspective view of a core plug assembly of lock actuator assembly of FIG. 9.
Figure 20:
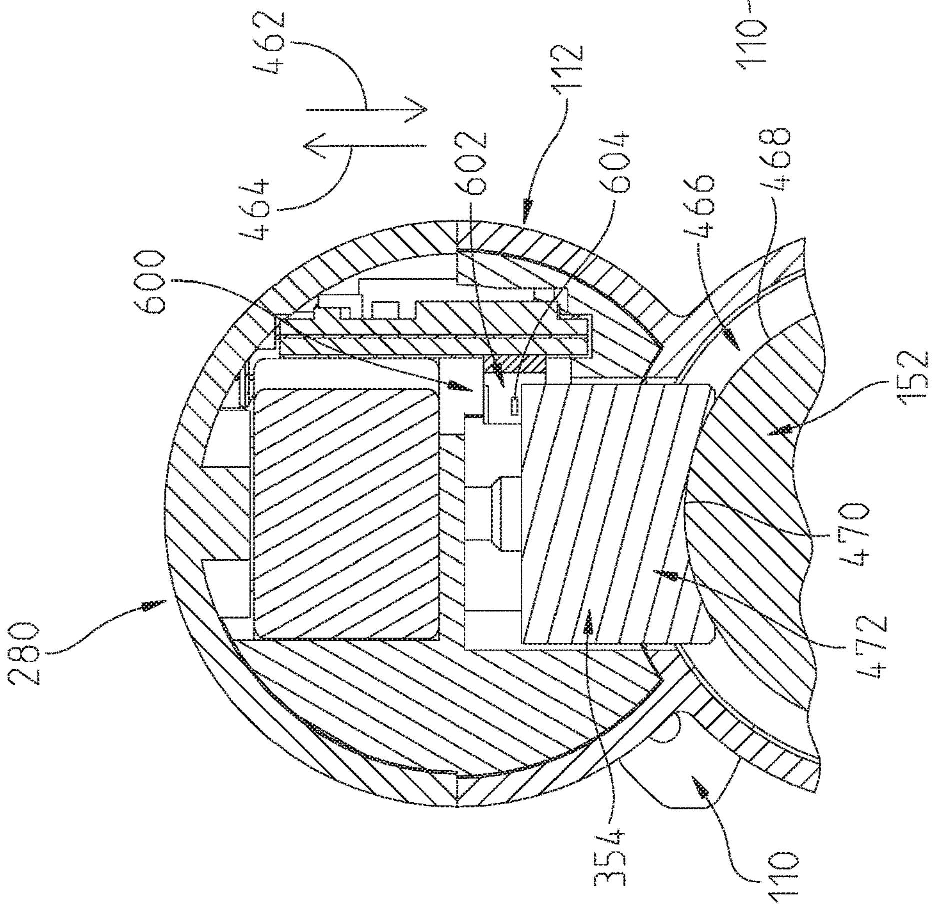
FIG. 20 illustrates a partial sectional view of the electro-mechanical lock core along lines 20-20 in FIG. 5 illustrating the blocker in a first blocking position wherein the blocker is engaged with a clutch of the core plug assembly of FIG. 11.

Blocker 354 cooperates with clutch 152 to deny or grant access to core plug assembly 106. Referring to FIGS. 9 and 10, clutch 152 includes a circumferential groove 466 having a cylindrical lower surface 468. Blocker 354 includes a cylindrical lower profile 470 which generally matches cylindrical lower surface 468 of clutch 152. When a lower portion 472 of blocker 354 is received in circumferential groove 466 of clutch 152 (see FIG. 20), clutch 152 is restricted in axial movement along longitudinal axis 108 relative to blocker 354. The relationship shown in FIG. 20 is referred to as a blocked position of blocker 354 due to the restricted axial movement of clutch 152 relative to blocker 354 along longitudinal axis 108. When lower portion 472 of blocker 354 is removed from circumferential groove 466, clutch 152 may move to a greater degree axially along longitudinal axis 108 relative to blocker 354. The relationship shown in FIG. 21 is referred to as a release position of blocker 354 due to the less restricted axial movement of clutch 152 relative to blocker 354 along longitudinal axis 108. In other embodiments a protrusion of clutch 152 is received in a groove of blocker 354 or is otherwise blocked in axial movement towards core plug assembly 106 when blocker 354 is in the blocked position.

One advantage, among others for having blocker 354 received in circumferential groove 466 is that clutch 152 is able to freely rotate about longitudinal axis 108 while blocker 354 is in the blocked position (FIG. 20) and while blocker 354 is in the released position (FIG. 21). The interaction of blocker 354 and clutch 152 is explained in more detail herein.

Figure 18A:
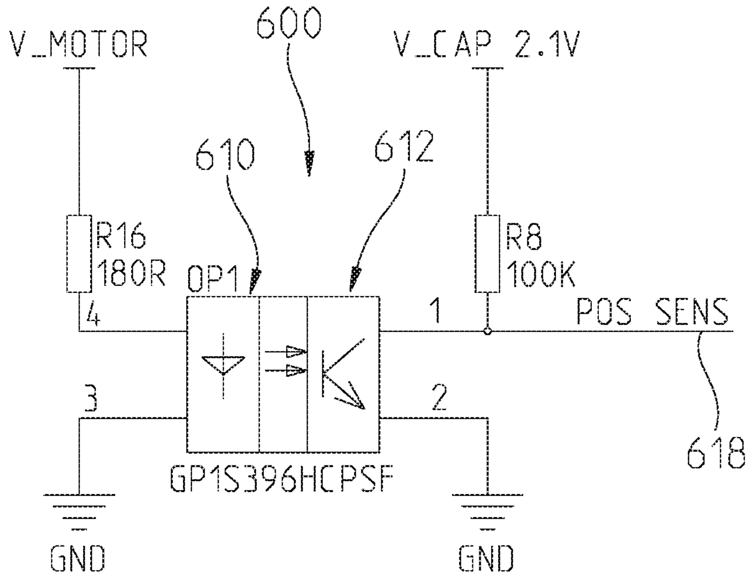
FIG. 18A illustrates an exemplary position sensor.

Referring to FIG. 18, electro-mechanical lock core 100 includes a position sensor 600 supported by circuit board 392. Position sensor 600 determines a position of blocker 354 to provide a feedback to electronic controller 380 when blocker 354 is in the blocked position. Position sensor 600 includes a first leg 602 having a first aperture 604 (see FIG. 20) and a second leg 606 having a second aperture 608 (see FIG. 18). One of first leg 602 and second leg 606 includes a light source 610 (see FIG. 18A), such as a light emitting diode, and the other of first leg 602 and second leg 606 includes a detector 612 which detects the light emitted by light source 610. As shown in FIG. 18A, light source 610 is powered to emit light when motor 352 is operating.

Returning to FIG. 18, a vertical channel 616 is formed between first leg 602 and second leg 606. The vertical channel 616 is sized to receive blocker 354. When blocker 354 is in the release position (see FIG. 21), blocker 354 is positioned in channel 616 at a height blocking the light from light source 610 reaching detector 612 and a voltage on a position sense line 618 monitored by electronic controller 380 is high. When blocker 354 is in the blocking position (see FIG. 20), blocker 354 is in channel 616 at a height permitting the light from light source 610 to reach detector 612, thereby activating a switch of detector 612 so that the voltage on the position sense line 618 monitored by electronic controller 380 is low.

Figure 22:
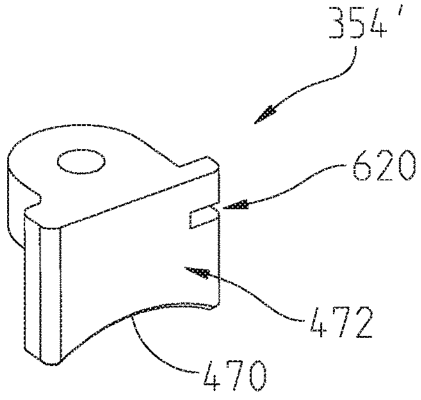
FIG. 22 illustrates a front, perspective view of an alternative blocker of the control assembly of FIG. 7.

Referring to FIG. 22, an alternative blocker 354' is shown. Blocker 354' includes a window 620. With blocker 354' and position sensor 600 positioned lower, the light from light source 610 is detected by detector 612 when blocker 354' is in the release position and the light from light source 610 is blocked from detector 612 when blocker 354' is in the blocked position. Although a line-of-sight optical position sensor 600 is shown, other position sensors may be used to sense a position of blocker 354 relative to clutch 152. Exemplary alternative position sensors include hall effect sensors, current monitoring sensors, switched activated sensors, and other suitable sensing devices for sensing a position of a mechanical device.

Figure 23:
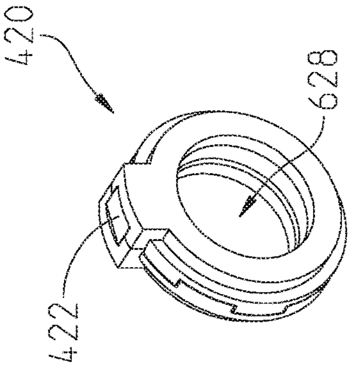
FIG. 23 illustrates a front, perspective view of an assembled power transfer assembly of FIG. 7.
Figure 26:
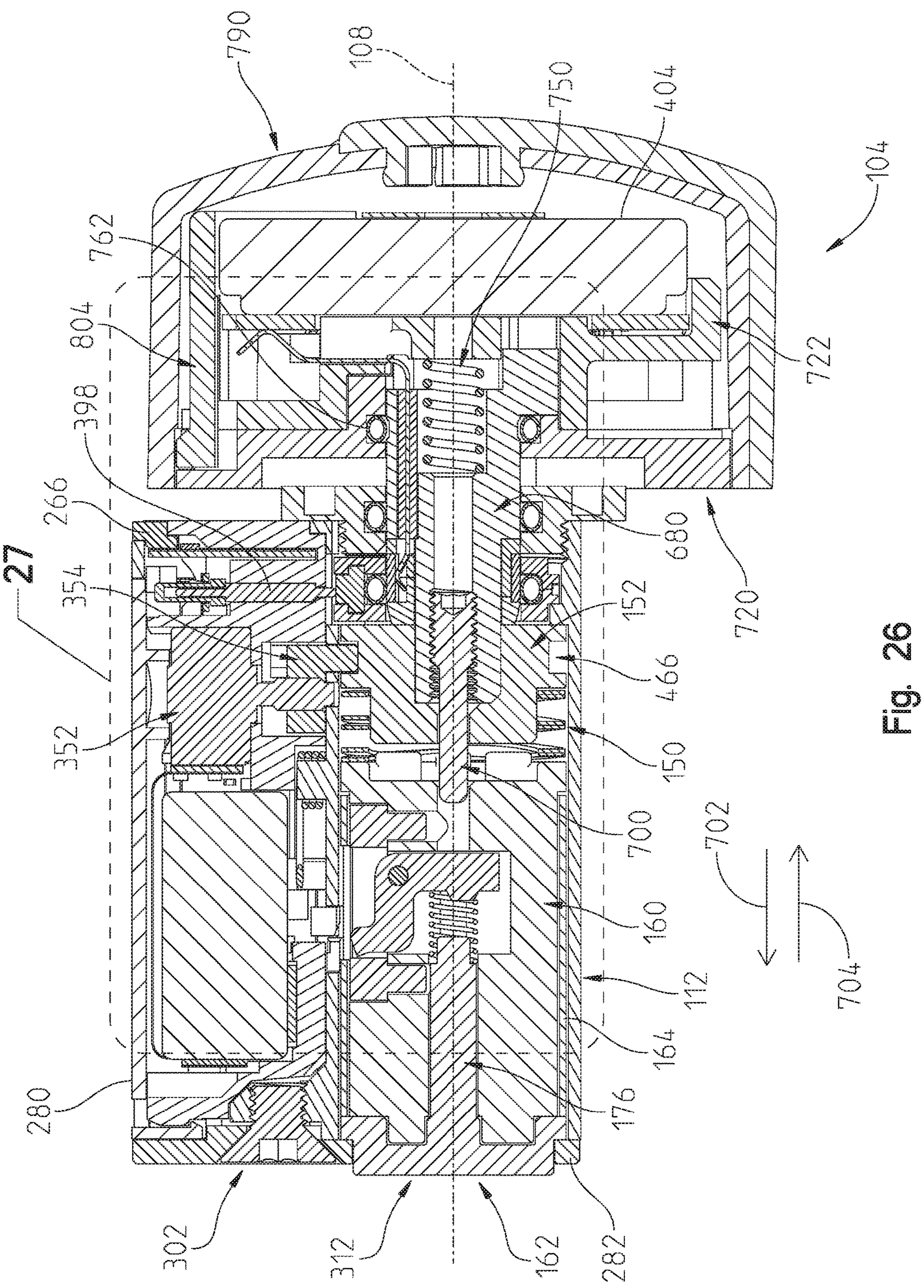
FIG. 26 illustrates a sectional view of the electro-mechanical lock core of FIG. 5 along lines 26-26 of FIG. 5 with the blocker of the control assembly in the first blocking position of FIG. 20.

Referring to FIGS. 8 and 23, a power assembly 420 is illustrated. Power assembly 420 is received in lower cavity 142 of core body 112 as illustrated in FIG. 26. Power assembly 420 includes a first insulator housing 424 and a second insulator housing 426 which capture contact 422 and a conductor 428. In one embodiment, conductor 428 is a beryllium copper canted coil spring or other suitable conductive devices. Conductor 428 is in electrical contact with operator actuation assembly 104 to receive power from battery 404 while permitting a free rotation of operator actuation assembly 104 about axis 108. Contact 422 is in electrical contact with conductor 428 to receive electrical power from conductor 428 and pass the electrical power on to pogo pin 398. Power assembly 420 includes a central opening 628 to receive operator actuation assembly 104.

Power assembly 420 is held in place in core body 112 by a stop 264 of core body 112 and a cover 630 threaded into a front portion 632 of core body 112. Cover 630 includes a recess 634 which carries a conductor 636. Cover 630 is electrically coupled to core body 112 through the threaded engagement and conductor 636 is electrically coupled to cover 630. As mentioned herein, core body 112 is grounded and conductor 636 is in electrical contact with operator actuation assembly 104 to ground operator actuation assembly 104. In one embodiment, conductor 636 is a beryllium canted coil spring. Cover 630 includes a central opening 640 to receive operator actuation assembly 104.

Figure 25:
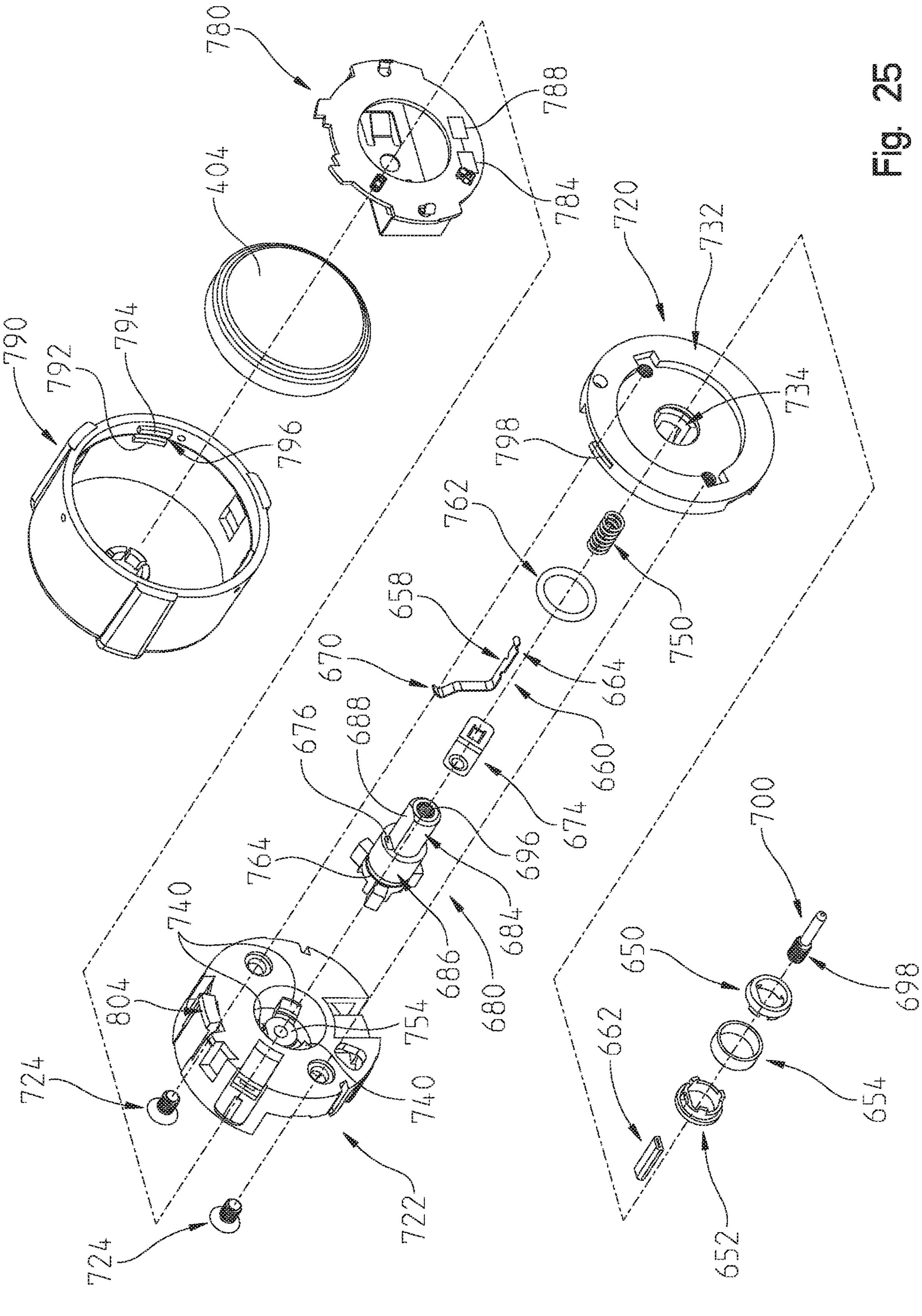
FIG. 25 illustrates an exploded, rear, perspective view of the operator actuation assembly of the electro-mechanical lock core of FIG. 5.
Figure 27:
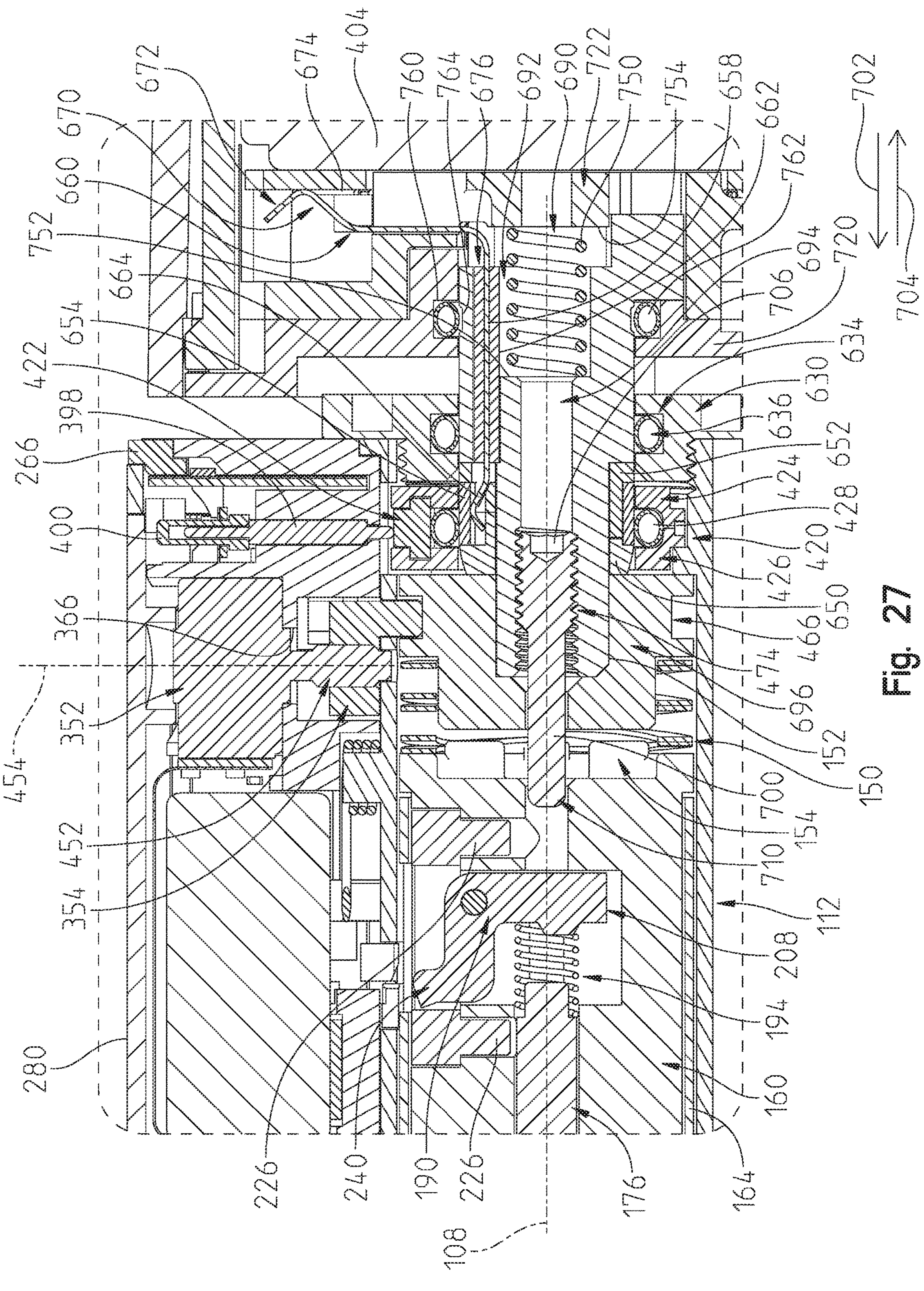
FIG. 27 illustrates a detail view of the sectional view of FIG. 26.

Referring to FIGS. 24 and 25, operator actuation assembly 104 is illustrated. All of the components of operator actuation assembly 104 rotate about longitudinal axis 108 as a unit. Operator actuation assembly 104 includes a power transfer ring 654 captured between a first insulator ring 650 and a second insulator ring 652. Referring to FIG. 27, conductor ring 654 is in electrical contact with conductor 428 of power assembly 420 to transfer power to conductor 428 throughout a movement of operator actuation assembly 104 along axis 108 in direction 702 and direction 704. In one embodiment, conductor ring 654 is a brass power transfer ring. Second insulator ring 652 includes a recess to receive a first leg 658 of a power transfer conductor 660. A first end 664 of first leg 658 of conductor 660 is in electrical contact with conductor ring 654. As shown in FIG. 27, first end 664 has a bent profile which biases first leg 658 of power transfer conductor 660 into contact with conductor ring 654.

At least a portion of first leg 658 of power transfer conductor 660 is covered by an insulator sleeve 662. A second end 672 of second leg 670 of power transfer conductor 660 is held in electrical contact with a conductor clip 674 which is in turn in electrical contact with a terminal portion of battery 404.

First leg 658 of conductor 660 and insulator sleeve 662 also pass through a channel 676 of a knob base shaft 680. As shown in FIG. 27, a stem 682 of knob base shaft 680 has an end portion 684 with a first diameter sized to be received within and generally match the diameter of channel 250 of clutch 152 and a central opening 628 of power assembly 420. Stem 682 of knob base shaft 680 has an intermediate portion 686 with a second diameter, larger than the first diameter of end portion 684, sized to be received within and generally match the diameter of central opening 640 of cover 630.

Knob base shaft 680 further includes a central opening 690 having a front portion 692 and a rear portion 694. Front portion 692 has a larger diameter than rear portion 694. Rear portion 694 of central opening 690 includes a threaded portion 696 which is threadably engaged by a threaded head 698 of a control pin 700. As shown in FIG. 27, control pin 700 is threaded into knob base shaft 680 from the rear. As explained herein, an operator may engage control pin 700 with a tool (not shown) which is configured to engage tool engagement end 706 of control pin 700. Illustratively, tool engagement end 706 of control pin 700 is a socket configured to receive a hex head tool. The operator may advance control pin 700 in direction 702 (see FIG. 27) along longitudinal axis 108 and then subsequently retract control pin 700 in direction 704 along axis 108. As explained in more detail herein, an end 710 of control pin 700 may be used to actuate bell crank 190.

Returning to FIGS. 24 and 25, operator actuation assembly 104 further includes a knob base 720 and a battery support 722. Battery support 722 is coupled to knob base 720 with a plurality of fasteners 724 threaded into apertures 726 of knob base 720. Knob base 720 includes a central sleeve 730 and a base 732. A central opening 734 passes through both central sleeve 730 and base 732.

Sleeve 730 includes a first plurality of recesses 736 spaced around central opening 734 and a second plurality of recesses 738 spaced around central opening 734. First plurality of recesses 736 receives protrusions 740 (see FIG. 25) of battery support 722. Second plurality of recesses 738 receives protrusions 742 of knob base shaft 680. A longitudinal length of second plurality of recesses 738 along longitudinal axis 108 is greater than a longitudinal length of protrusions 742 of knob base shaft 680. As such, knob base 720 and battery support 722 function to capture knob base shaft 680, but permit relative movement between knob base shaft 680 and the assembly of knob base 720 and battery support 722 along axis 108 in direction 702 and direction 704. As shown in FIG. 27, a biasing member 750 is placed between a stop surface 752 in central opening 690 of knob base shaft 680 and a stop surface 754 of battery support 722. Biasing member 750 biases the assembly of knob base 720 and battery support 722 in direction 704 relative to knob base shaft 680 which as explained in more detail herein is fixably coupled to clutch 152.

Figure 27A:
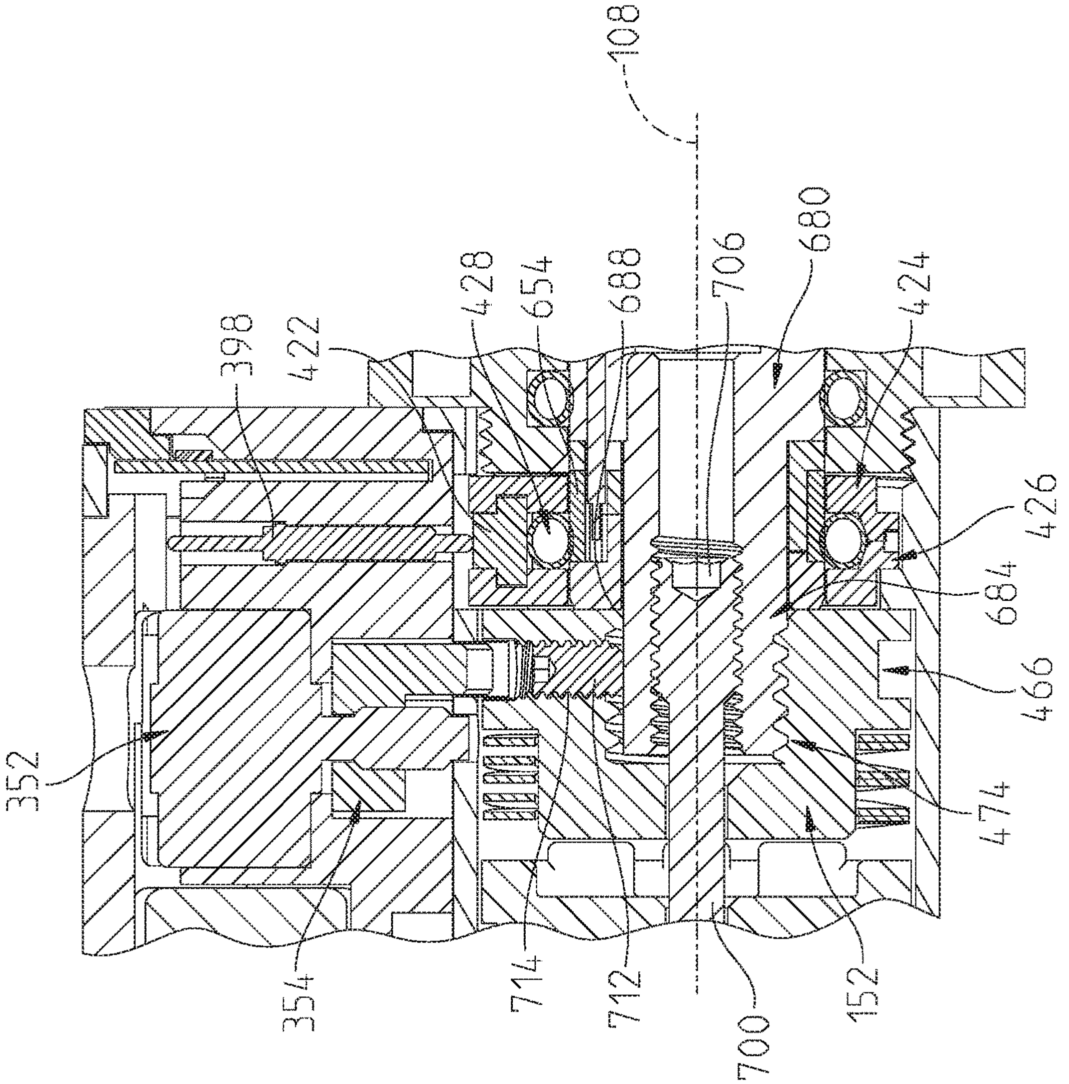
FIG. 27A illustrates a sectional view of an exemplary coupling arrangement between the operator actuation assembly of the electro-mechanical lock core and the clutch of the lock actuator assembly of the electro-mechanical locking core.

Referring to FIG. 27A, knob base shaft 680 is secured to clutch 152 with a fastener, illustratively a set screw 712 which is threaded into a threaded bore 714 in clutch 152. Set screw 712 presses against a flat 688 of knob base shaft 680 to prevent a rotation of knob base shaft 680 relative to clutch 152. As shown in FIG. 27A, knob base shaft 680 is threaded into clutch 152 prior to set screw 712 being advanced in bore 714 into engagement with the flat 688 of knob base shaft 680.

Figure 30:
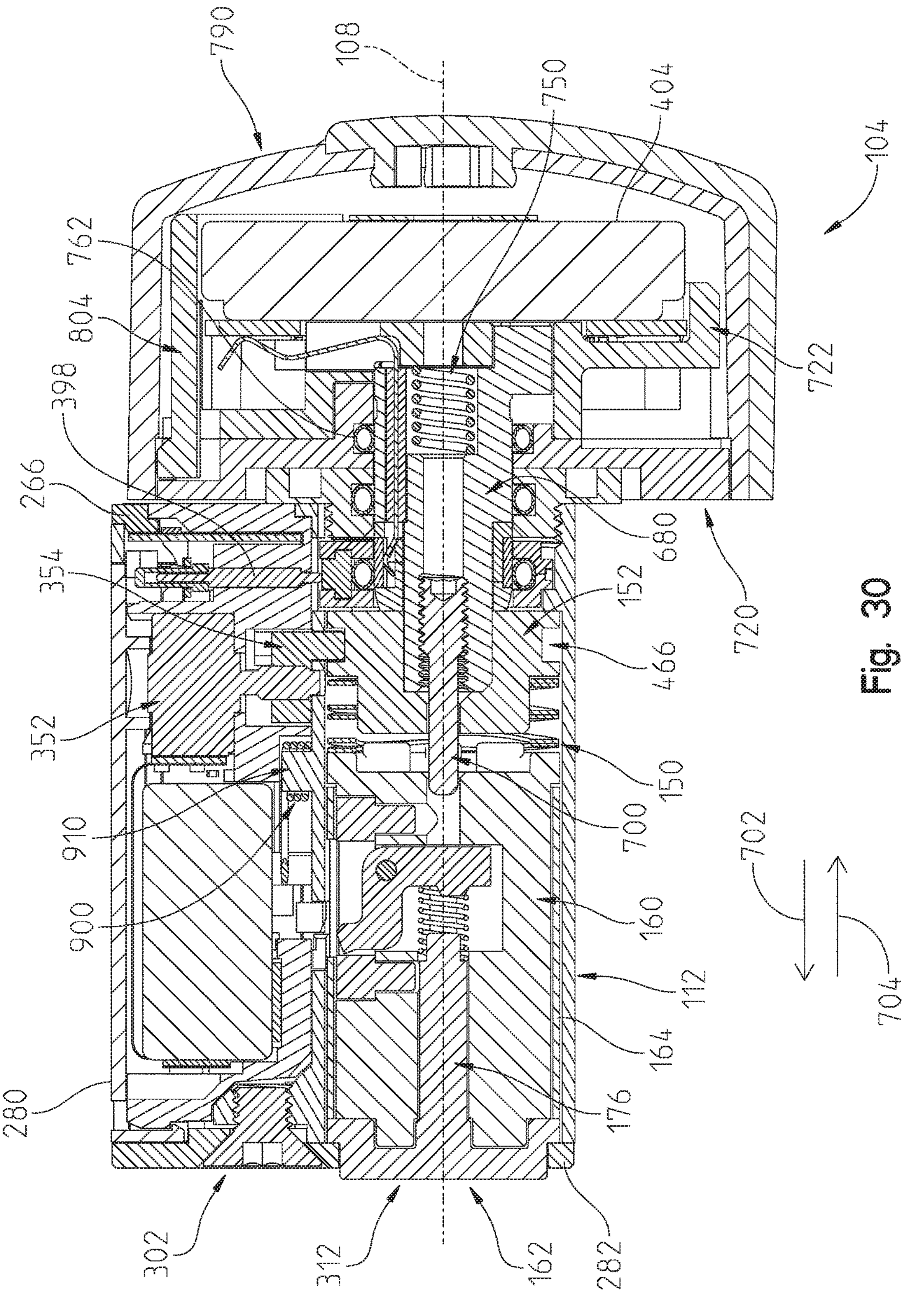
FIG. 30 illustrates the sectional view of FIG. 26 with the blocker of the control assembly in the first blocking position of FIG. 21 and the operator actuation assembly moved axially due to an external force.

Returning to FIG. 27, knob base 720 has a recess 760 into which a ring 762 is placed. Ring 762 extends into a recess 764 in knob base shaft 680 to couple knob base shaft 680 to knob base 720 such that under a first level of force in direction 702, knob base shaft 680 and knob base 720 move together. Under a second level of force in direction 702, greater than the first level of force, ring 762 is displaced from recess 764 of knob base shaft 680 and knob base 720 may move in direction 702 relative to knob base shaft 680 as shown in FIG. 30.

An advantage, among others, for the release of ring 762 from recess 764 is that the operator actuation assembly 104 as opposed to clutch 152 and blocker 354 will absorb the excess force (which is passed on to core body 112 when operator actuation assembly 104 contacts the core body 112) thereby increasing the durability of lock core 100 from being damaged. In one embodiment, ring 762 is a steel canted coil spring. Spring 750 also absorbs an initial large spike of the external force and assists in returning operator actuation assembly 104 to the position shown in FIG. 26.

Referring to FIGS. 24 and 25, operator actuation assembly 104 further includes a battery holder board 780 which is received in recess 782 of battery support 722. Battery holder board 780 includes the contacts which align with the terminals of battery 404 and a clip 786 which holds battery 404 against battery holder board 780. Battery holder board 780 further includes a capacitive sensing circuit 784 and a power interrupt circuit 788.

Capacitive sensing circuit 784 detects when an operator is in proximity of a knob cover 790 of operator actuation assembly 104 or touches knob cover 790 of operator actuation assembly 104. Power interrupt circuit 788 interrupts the power provided by battery 404 to electrical assembly 350 for a short period of time when capacitive sensing circuit 784 detects an operator is in proximity of a knob cover 790 of operator actuation assembly 104 or touches knob cover 790 of operator actuation assembly 104. This interruption of power signals electronic controller 380 that a potential operator is in close proximity to electro-mechanical lock core 100. An advantage, among others, of including capacitive sensing circuit 784 and power interrupt circuit 788 in operator actuation assembly 104 is that the components of electrical assembly 350 may be in a low power mode until the interruption of power is sensed and thus extend the life of battery 404. In one embodiment, power interrupt circuit 788 is replaced with a signal transmission unit that in response to a detection by capacitive sensing circuit 784 will send a wake-up signal to electrical assembly 350.

Knob cover 790 is removably coupled to knob base 720. Referring to FIG. 25, knob cover 790 includes three spaced apart groupings (one grouping shown) of a front rib 792 and a rear rib 794 which define a channel 796. The channels 796 receive a rib 798 (two instances shown) of knob base 720 to hold knob cover 790 against axial movement in direction 702 or direction 704 relative to knob base 720. As explained herein, an assembly including knob base 720 and knob cover 790 is capable of moving in direction 702 and direction 704. Knob cover 790 is held against rotational movement in direction 802 (see FIG. 24) relative to knob base 720 due to arm 804 of battery support 722 which is received in one of recesses 806 of knob base 720 and against rotational movement in direction 800 relative to knob base 720 due to a wall of knob base 720.

Figure 33:
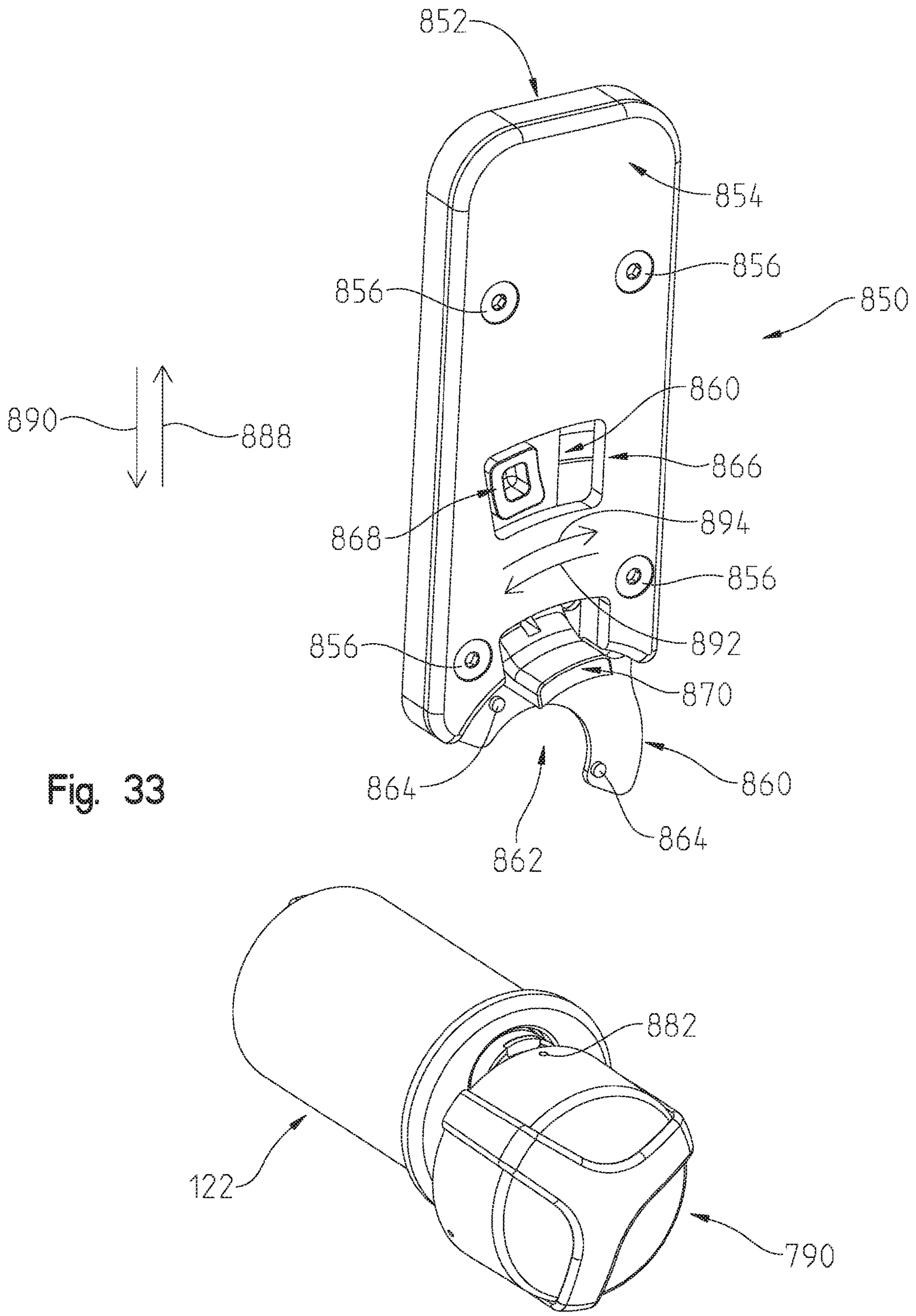
FIG. 33 illustrates the front, perspective view of the electro-mechanical lock core and lock cylinder of FIG. 3 and a knob cover removal tool spaced apart from the electro-mechanical lock core and lock cylinder.
Figure 34:
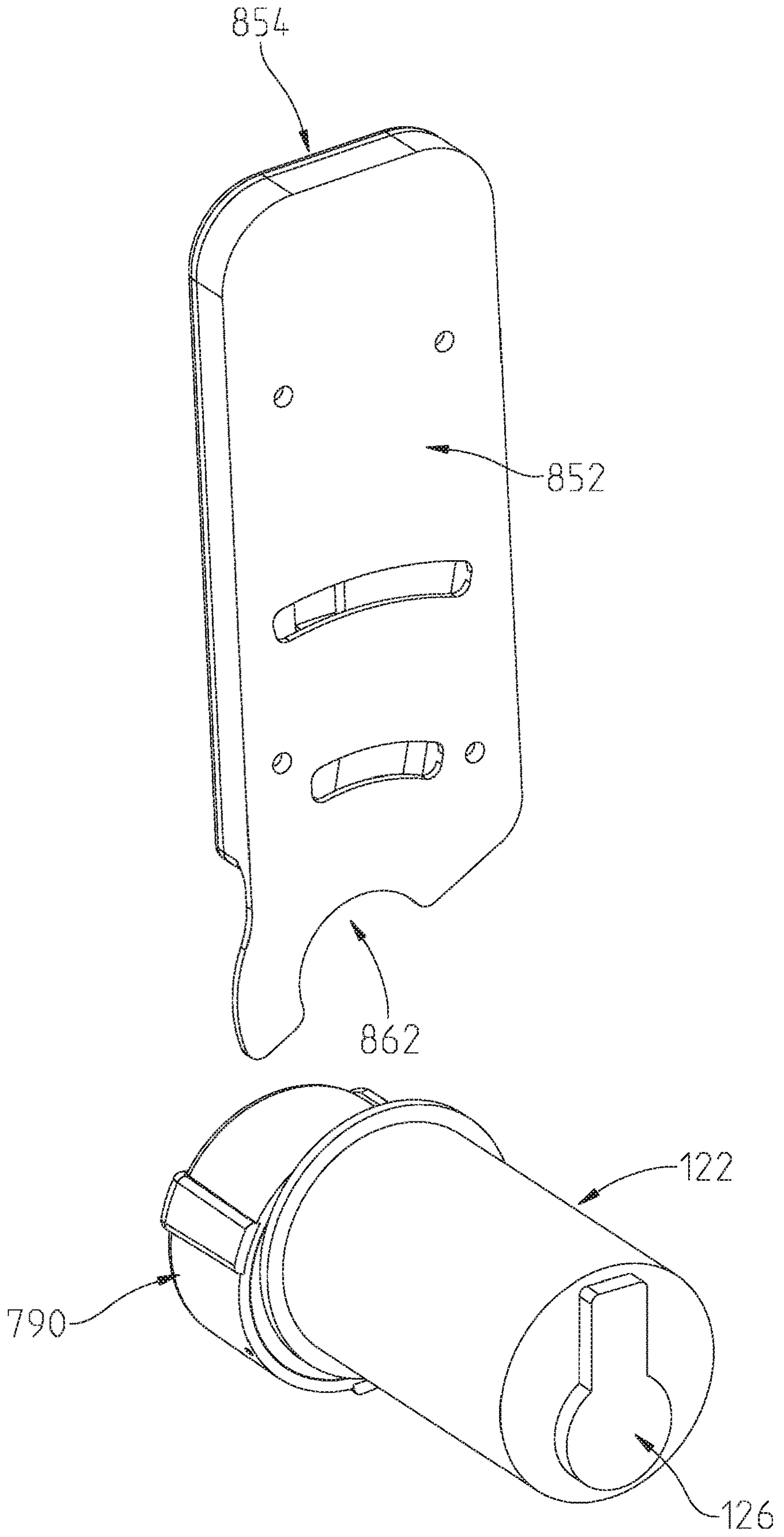
FIG. 34 illustrates the rear, perspective view of the electro-mechanical lock core and lock cylinder of FIG. 4 and the knob cover removal tool spaced apart from the electro-mechanical lock core and lock cylinder.

At various times, an operator will need to replace battery 404. In order to replace battery 404, knob cover 790 needs to be removed from the remainder of operator actuation assembly 104. Referring to FIG. 33, a knob cover removal tool 850 for removing knob cover 790 is shown. Tool 850 includes a back housing 852 and a front housing 854 secured together with fasteners 856.

A movable coupler 860 is captured between back housing 852 and front housing 854. A first operator actuatable portion 868 of movable coupler 860 extends through a window 866 of front housing 854. A second operator actuatable portion 870 of movable coupler 860 extends from a lower portion of front housing 854. Movable coupler 860 is moveable in direction 888, direction 890, direction 892, and direction 894 relative to front housing 854.

Figure 35:
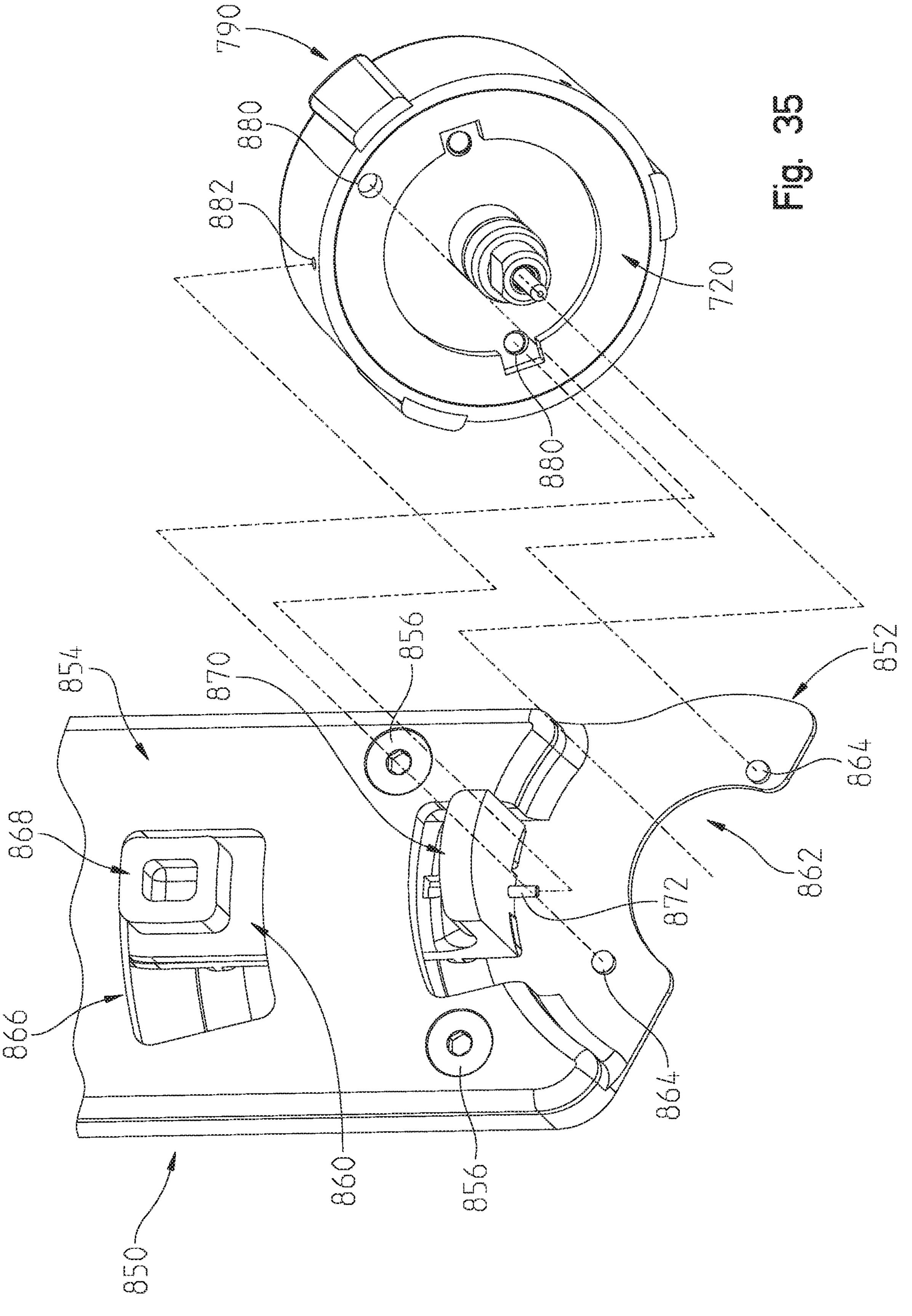
FIG. 35 illustrates the engagement members of the operator actuation assembly and the knob cover removal tool.

Referring to FIG. 35, back housing 852 includes a lower portion having a scalloped profile 862. The lower portion of back housing 852 includes a plurality of locators 864 which are spaced to be received in corresponding locators 880 of knob base 720. Movable coupler 860 includes a locator 872 which is received in a corresponding locator 882 of knob cover 790. As such, tool 850 is coupled to operator actuation assembly 104 through a mating of locators 864 and 880 along a first direction generally parallel with axis 108 and through a mating of locators 872 and 882 along a second direction generally perpendicular to the first direction of locators 864 and 880.

Figure 37:
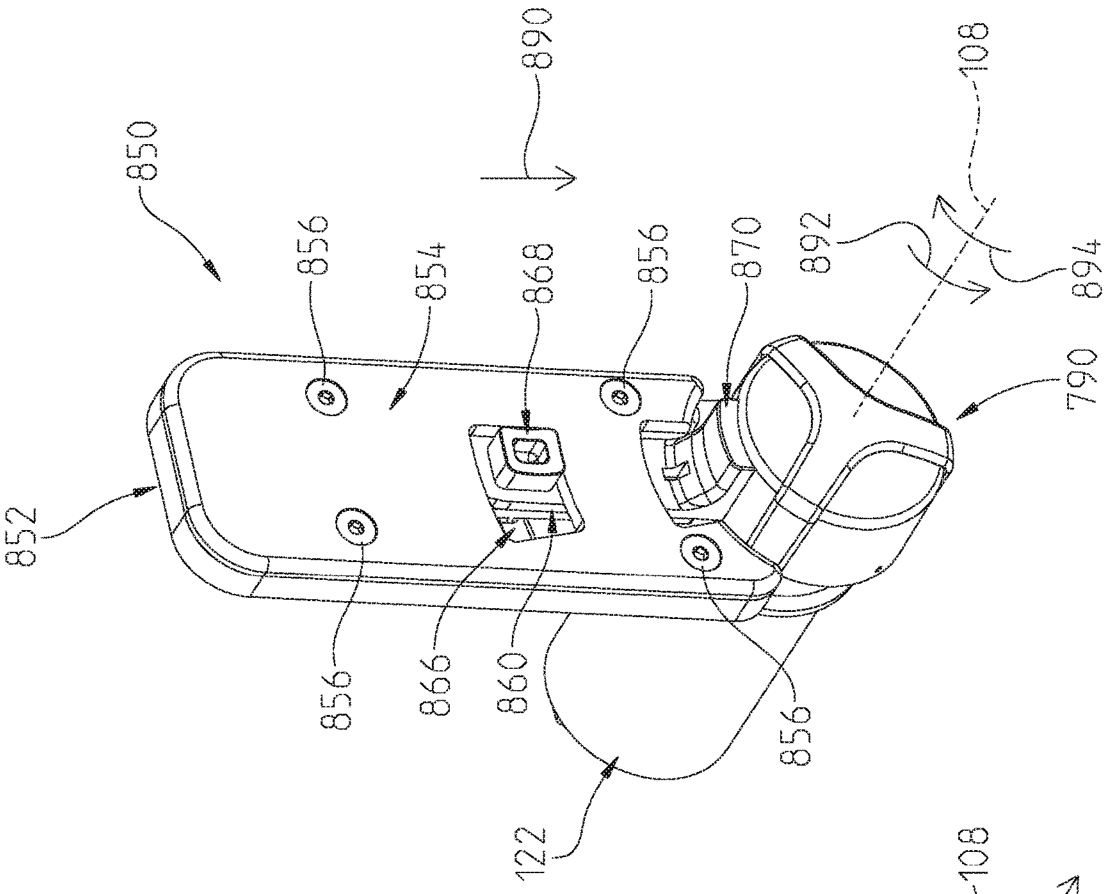
FIG. 37 illustrates the knob cover removal tool having the first set of engagement members and a second set of engagement members both illustrated in FIG. 35 coupled to the first set of engagement members and a second set of engagement members of the operator actuation assembly both illustrated in FIG. 35.
Figure 36:
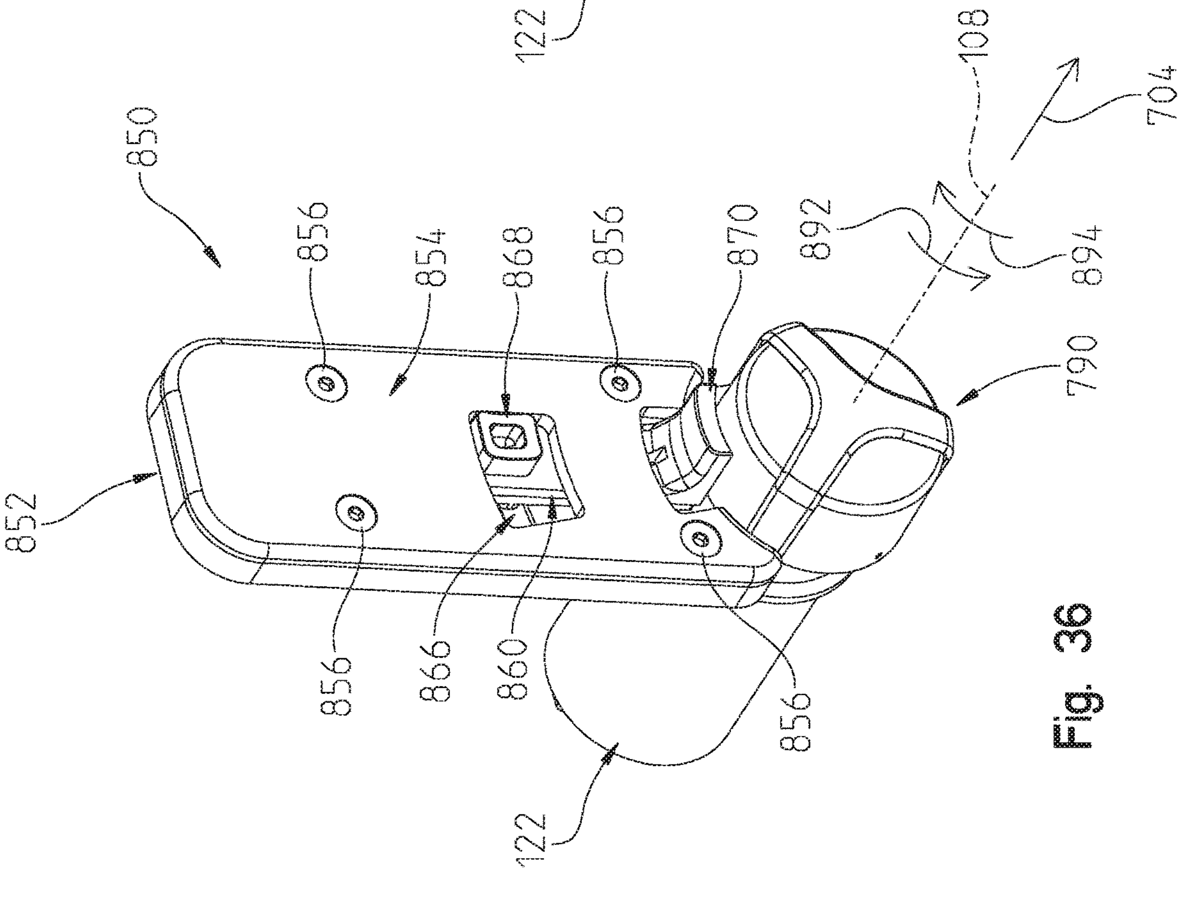
FIG. 36 illustrates the knob cover removal tool having a first set of engagement members illustrated in FIG. 35 coupled to a first set of engagement members of the operator actuation assembly illustrated in FIG. 35.
Figure 38:
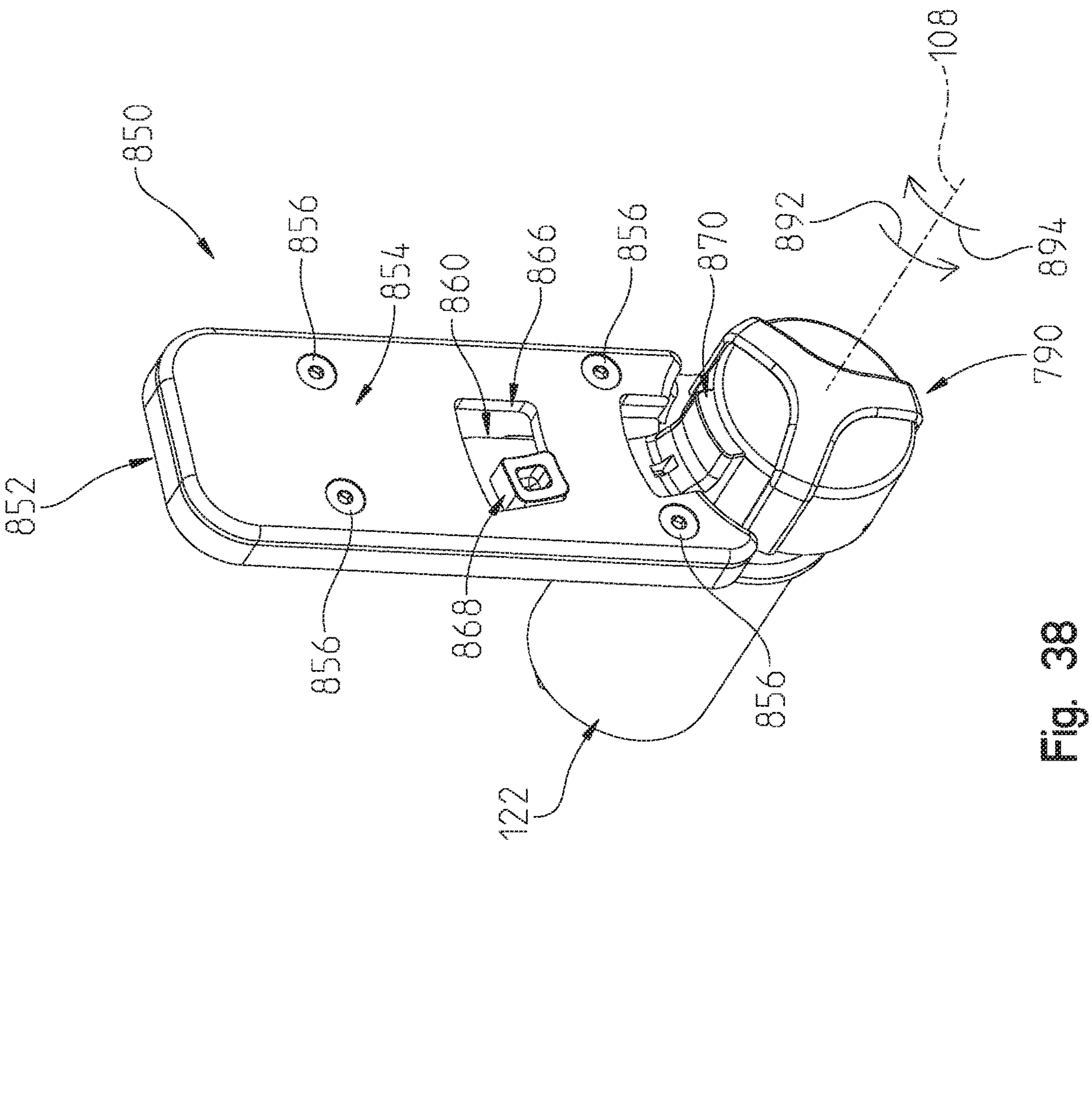
FIG. 38 illustrates a rotation of a knob cover of the operator actuation assembly relative to the knob cover removal tool about a rotational axis of the knob cover.

Referring to FIGS. 36-38, a process for removing knob cover 790 from knob base 720 is illustrated. Referring to FIG. 36, tool 850 is positioned so that back housing 852 is between knob base 720 and lock cylinder 122 and the assembly knob base 720 and knob cover 790 is rotated in directions 892, 894 to align locators 880 of knob base 720 with locators 864 of tool 850. Tool 850 is then moved in direction 704 to position locators 864 of tool 850 in locators 880 of knob base 720.

Figure 39:
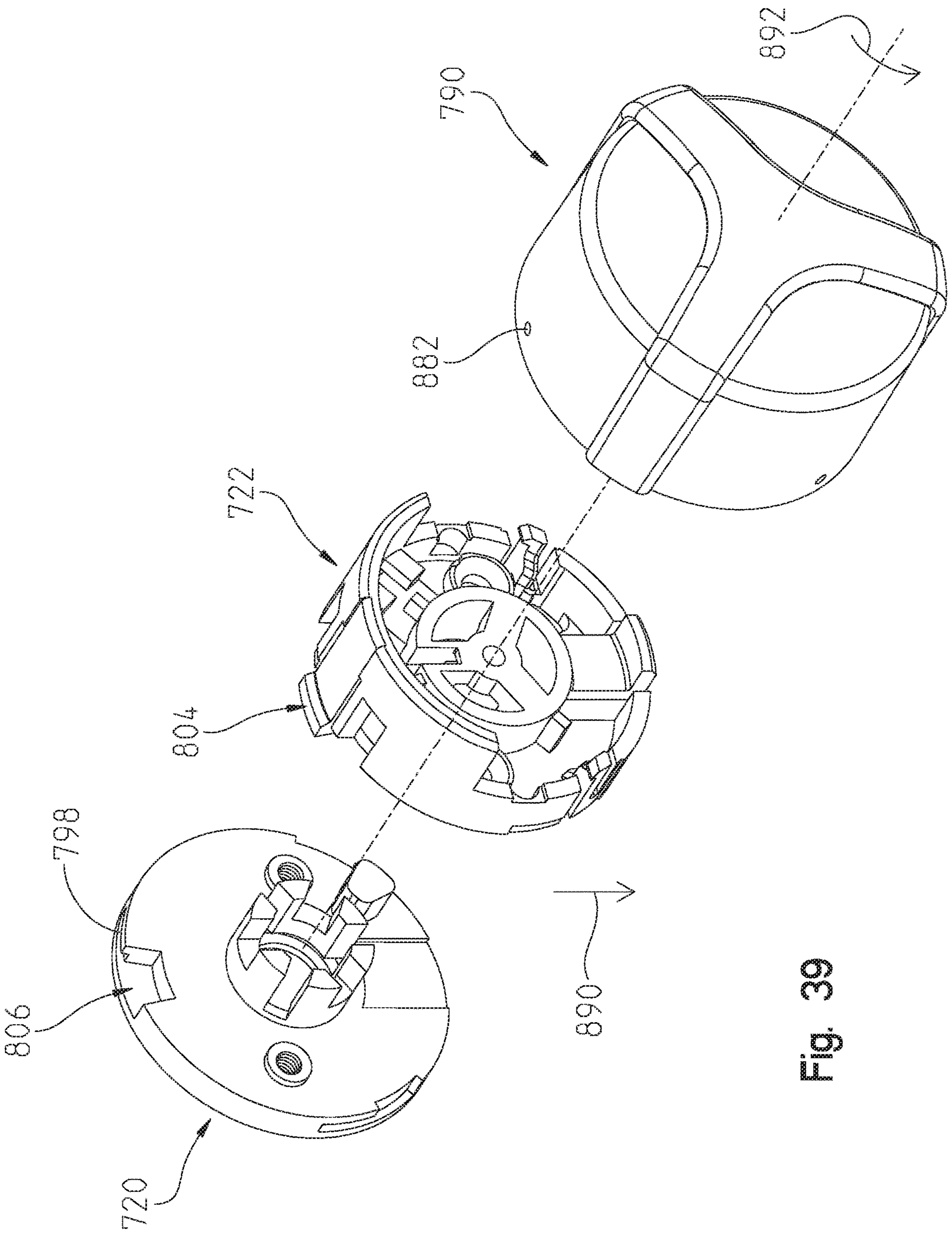
FIG. 39 illustrates a front, exploded, perspective view of the knob cover, a knob base, and an intermediate battery holder of the operator actuation assembly of the electro-mechanical locking core.
Figure 40:
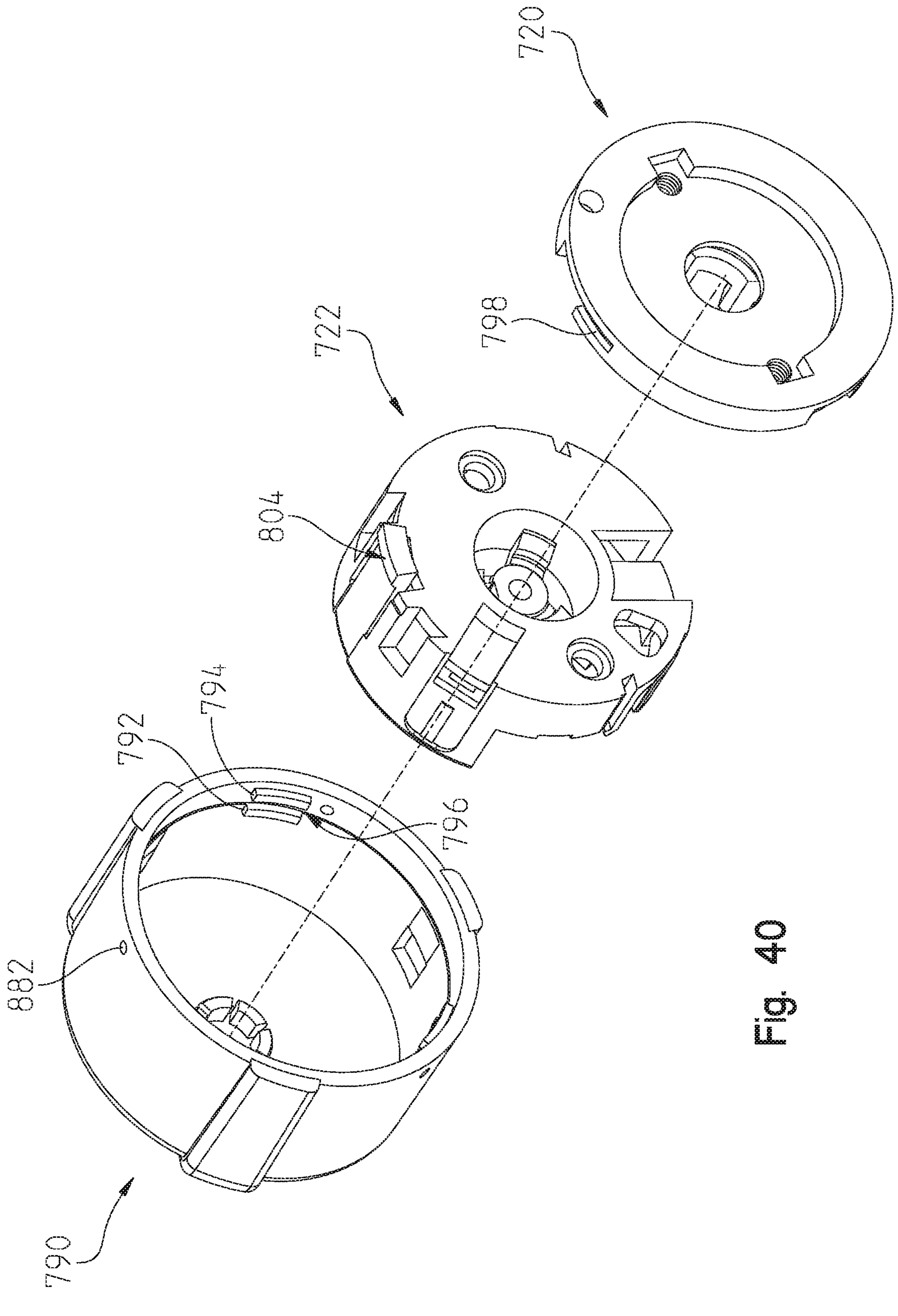
FIG. 40 illustrates a rear, exploded, perspective view of the knob cover, a knob base, and an intermediate battery holder of the operator actuation assembly of the electro-mechanical locking core.
Figure 41:
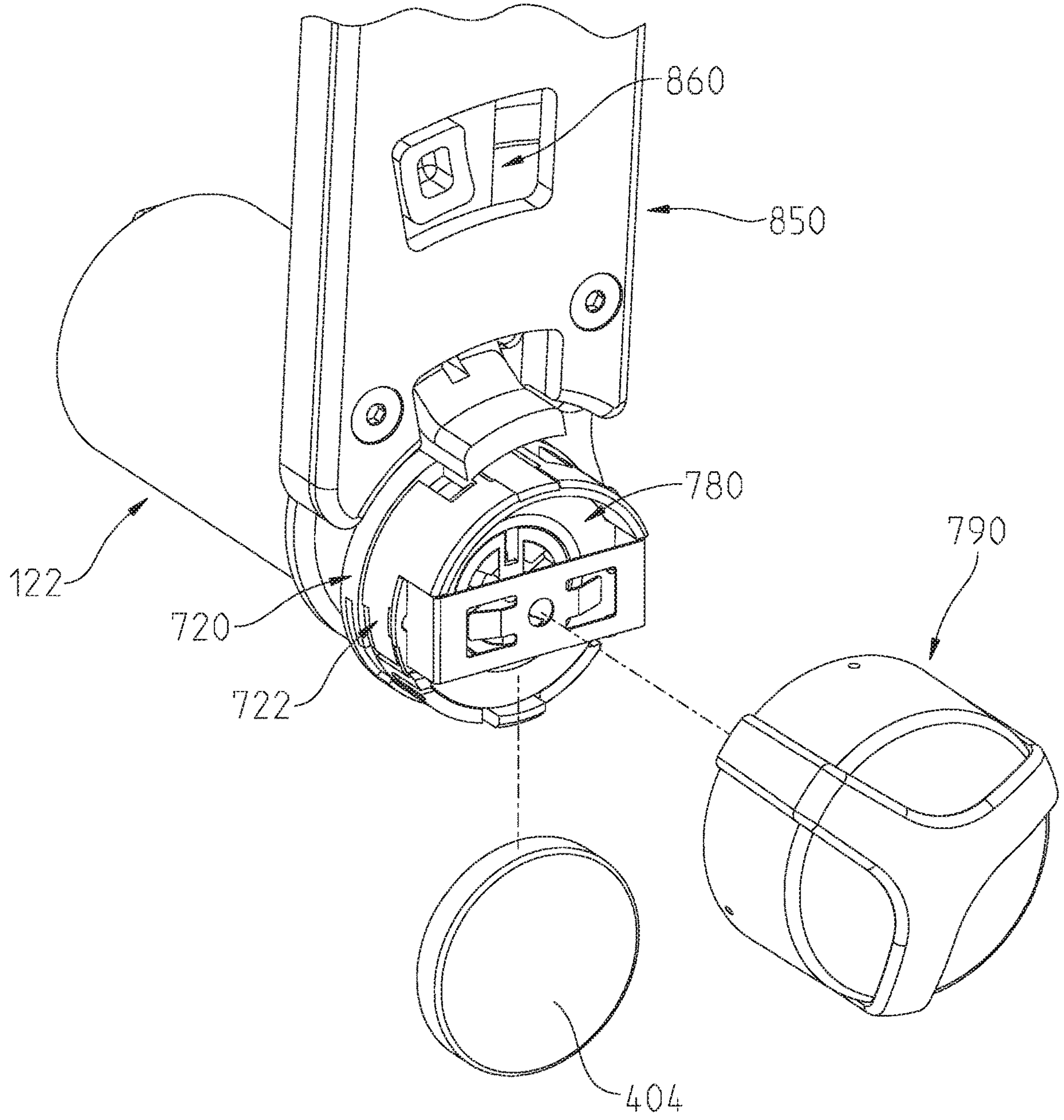
FIG. 41 illustrates the disengagement of the second set of engagement members between the knob cover removal tool and the knob cover of the operator actuation assembly with the knob cover of the operator actuation assembly spaced apart from the remainder of the electro-mechanical lock core and a battery removed from the battery holder of the operator actuation assembly.

Movable coupler 860 is then moved downward in direction 890 to position locator 872 of tool 850 in locator 882 of knob cover 790 as shown in FIG. 37. Referring to FIGS. 39 and 40, locator 872 of tool 850 presses against arm 804 of battery support 722. Arm 804 of battery support 722 moves in direction 890 within recesses 806 of knob base 720. This movement of arm 804 downward permits front rib 792 and rear rib 794 of knob cover 790 to rotate in direction 892 such that rib 798 of knob base 720 is no longer positioned in channel 796 of knob cover 790. Referring to FIG. 38, this movement may be accomplished by moving movable coupler 860 and knob cover 790 in direction 892 relative to front housing 854 and back housing 852 which is held firm or by holding movable coupler 860 and knob cover 790 firm and moving front housing 854 and back housing 852 in direction 894. Once rib 798 of knob base 720 is no longer positioned in channel 796 of knob cover 790, movable coupler 860 may be moved up in direction 888 and knob cover 790 may be removed from knob base 720 in direction 704, as illustrated in FIG. 41. Then, battery 404 may be removed from battery holder board 780.

Figure 42:
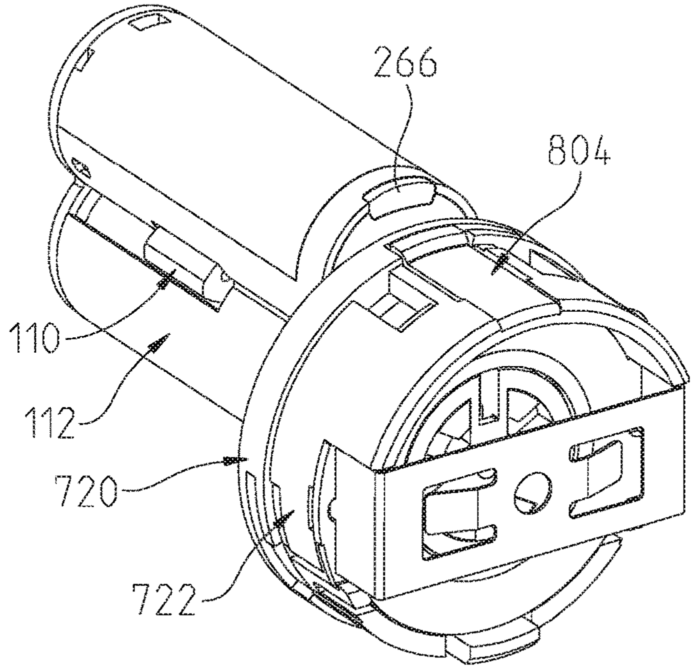
FIG. 42 illustrates the electro-mechanical lock core with the knob cover and the battery removed and the core keeper in a use or locked position wherein the core keeper is positioned to cooperate with a corresponding feature of the locking cylinder to hold the electro-mechanical lock core relative to the locking cylinder.
Figure 43:
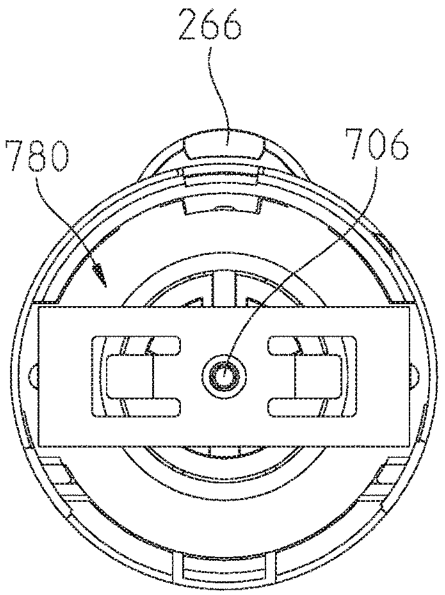
FIG. 43 is a front view of the assembly of FIG. 42.
Figure 44:
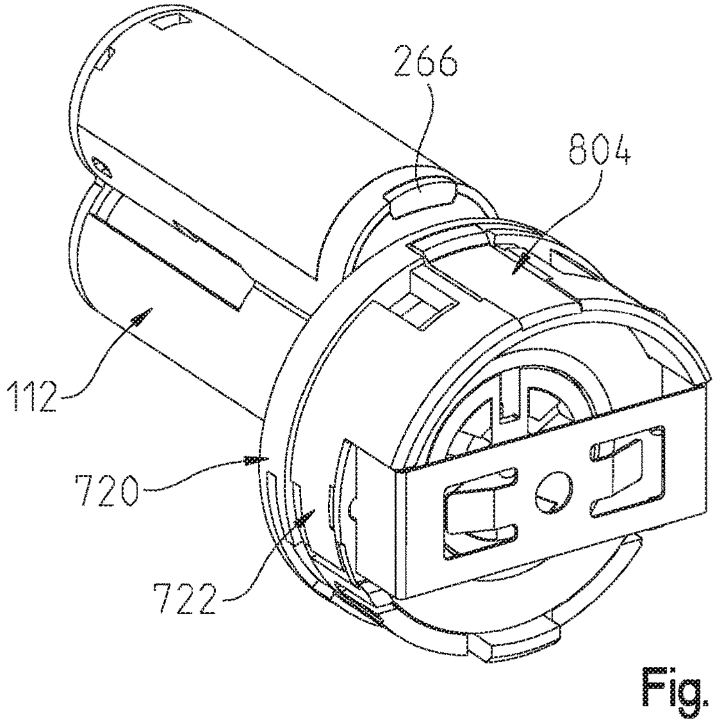
FIG. 44 illustrates the electro-mechanical lock core with the knob cover and the battery removed and the core keeper in a control position wherein the core keeper is positioned relative to the corresponding feature of the locking cylinder to permit a removal of the electro-mechanical lock core relative to the locking cylinder.

Referring to FIG. 43, with battery 404 removed an operator may access tool engagement end 706 of control pin 700 to move control pin 700 in one or directions 702 and 704. As explained in more detail herein, the position of control pin 700 is important to a movement of core keeper 110 from outside of core body 112 (see FIG. 42) to inside of core body 112 (see FIG. 44).

Various operations of electro-mechanical lock core 100 are explained with reference to FIGS. 26-32. FIG. 26 illustrates a sectional view of electro-mechanical lock core 100 with blocker 354 in the first blocking position of FIG. 20 wherein a lower portion of blocker 354 is received in circumferential groove 466 of clutch 152. FIG. 26 is the rest position of electro-mechanical lock core 100. In the rest position, operator actuation assembly 104 and clutch 152 are freely rotatable about longitudinal axis 108 and blocker 354 prevents the axial movement of clutch 152 in direction 702. Thus, clutch 152 remains spaced apart from core plug body 160 and core plug body 160 cannot be rotated about longitudinal axis 108 to rotate core plug cover 162 and the locking device coupled to core plug cover 162.

Referring to FIG. 28, blocker 354 has been moved in direction 464 by motor 352 to the second release position of FIG. 21 wherein a lower portion of blocker 354 is positioned outside of circumferential groove 466. This is an access position for electro-mechanical lock core 100. With blocker 354 removed from circumferential groove 466 of clutch 152, an operator may move operator actuation assembly 104 and clutch 152 in direction 702 to bring engagement features 156 of clutch 152 into engagement with engagement features 154 of core plug body 160, as illustrated in FIG. 29. With engagement features 156 of clutch 152 engaged with engagement features 154 of core plug body 160, an operator may rotate operator actuation assembly 104 to effect a rotation of core plug cover 162 and an actuation of the locking device coupled to core plug cover 162.

As shown in FIG. 29, even though engagement features 156 of clutch 152 are engaged with engagement features 154 of core plug body 160, control pin 700 remains spaced apart from bell crank 190. As such, second leg 240 of bell crank 190 remains below opening 238 of control sleeve 164 (see FIG. 13) and control sleeve 164 does not rotate with core plug body 160. Therefore, core keeper 110 remains positioned external to core body 112 as shown in FIG. 42. To assist in maintaining core keeper 110 external to core body 112 when control sleeve 164 is not locked to core plug body 160 through bell crank 190, a biasing member 900, illustratively a torsion spring, is coupled to a protrusion 910 of core body 112 with a first leg 902 that presses against core keeper 110 and a second leg that presses against core body 112. Torsion spring 900 biases core keeper 110 to be positioned external to core body 112.

An exemplary biasing member 1900 of second exemplary core assembly 1102 is illustrated in FIGS. 50A, 50B, and 53-55. Turning to FIGS. 50A and 50B, upper cavity 1140 of core body 1112 receives a control assembly 1146. Similar to control assembly 146 of core assembly 102, control assembly 1146 restricts various movements of lock actuator assembly 1144 to restrict unauthorized actuation of a cam member 1126 and/or to restrict movement of core keeper 1110.

Control assembly 1146 is held in place relative to core body 1112 with a top cover 1280 and a rear cover 1282 and includes a cradle 1272, a light guide 1266, and a blocker 1354 (see FIG. 52). In the exemplary embodiment of FIGS. 50A, 50B, and 53-55, a bottom side of cradle 1272 is defined by a generally arcuate surface. Turning to FIG. 50B, cradle 1272 on a bottom side includes biasing member 1900 integrally formed with cradle 1272. In another exemplary embodiment, biasing member 1900 comprises one or more independent components and is supported by cradle 1272. A bottom side of cradle 1272 further includes a recess 1372 to accommodate core keeper 1110 when core keeper 1110 is positioned within an envelope of core body 1112.

Figure 53:
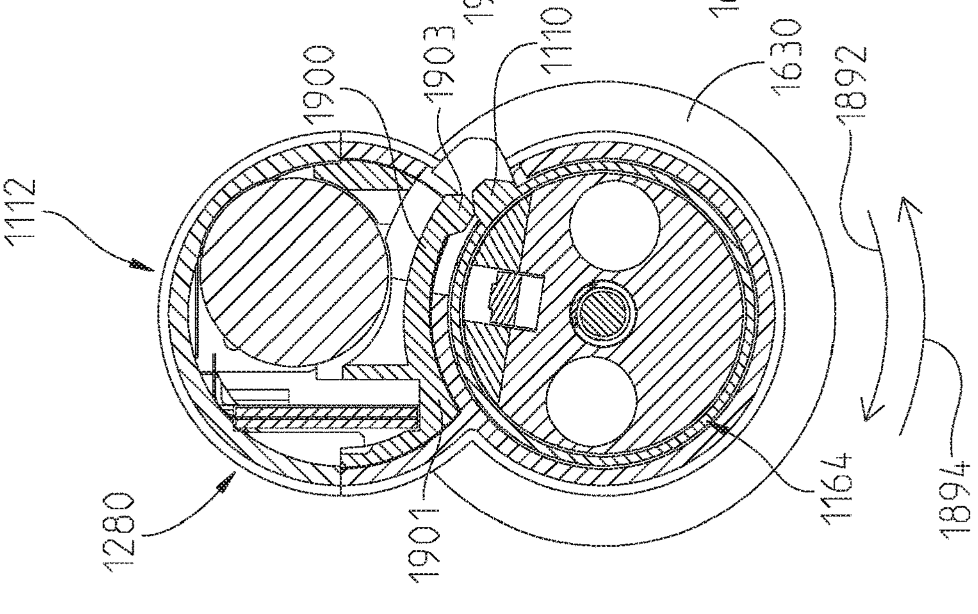
FIG. 53 illustrates a sectional view of the electro-mechanical lock core assembly along lines 53-53 of FIG. 49 with a core keeper in a first position outside of an envelope of a core body of the core assembly of FIG. 49 and abutting a biasing arm of the biasing member of a cradle of a control assembly of the electro-mechanical lock core assembly of FIG. 49.

In the exemplary embodiment shown in FIG. 53, biasing member 1900 includes a base 1901 integrally formed with cradle 1272. A biasing arm 1903 is integrally formed with base 1901 and extends generally outwardly therefrom. In this way, biasing arm 1903 cantilevers from base 1901. In the exemplary embodiment shown in FIGS. 50B and 53-55, biasing arm 1903 mirrors the generally arcuate shape of a bottom side of cradle 1272. A distal end of biasing arm 1903 includes a raised portion configured to abut core keeper 1110 when core keeper 1110 is either positioned outside of the envelope of core body 1112 (see FIG. 53) or when core keeper 1110 is received at or immediately within the envelope of core body 1112 (see FIGS. 54 and 55).

As illustrated in FIG. 53, biasing member 1900 biases core keeper 1110 to be positioned external to core body 1112. Accordingly, core keeper 1110 remains outside the envelope of core body 1112 unless and until a torque in a direction 1894 is applied to control sleeve 1164 sufficient to overcome a biasing torque exerted by biasing member 1900 in direction 1892. When such a sufficient torque is applied to control sleeve 1164 in direction 1894, biasing arm 1903 deflects upwardly relative to base 1901. As torque is continually applied to control sleeve 1164 in direction 1894, core keeper 1110 rotates inwardly past the raised portion of the distal end of biasing arm 1903 and is retracted within the envelope of core body 1112. Once core keeper 1110 has rotated past the raised portion of the distal end of biasing arm 1903, biasing arm 1903 returns to its original shape and core keeper 1110 is now retained within the envelope of core body 1112. Core keeper 1110 remains within the envelope of core body 1112 unless and until a torque in direction 1892 is applied to control sleeve 1164 sufficient to upwardly deflect biasing arm 1903 relative to base portion 1901 such that core keeper 1110 is positioned outside of core body 1112.

Referring back to FIGS. 31 and 32, control pin 700 has been moved in direction 702 relative to knob base shaft 680. The ability to move control pin 700 in direction 702 relative to clutch 152 is limited because the head of control pin 700 bottoms out against the clutch 152. An advantage, among others, is that an unauthorized operator is unable to visually inspect the region between clutch 152 and core plug 160 and to prevent the ability to inject an adhesive in the space between clutch 152 and core plug 160.

Figure 31:
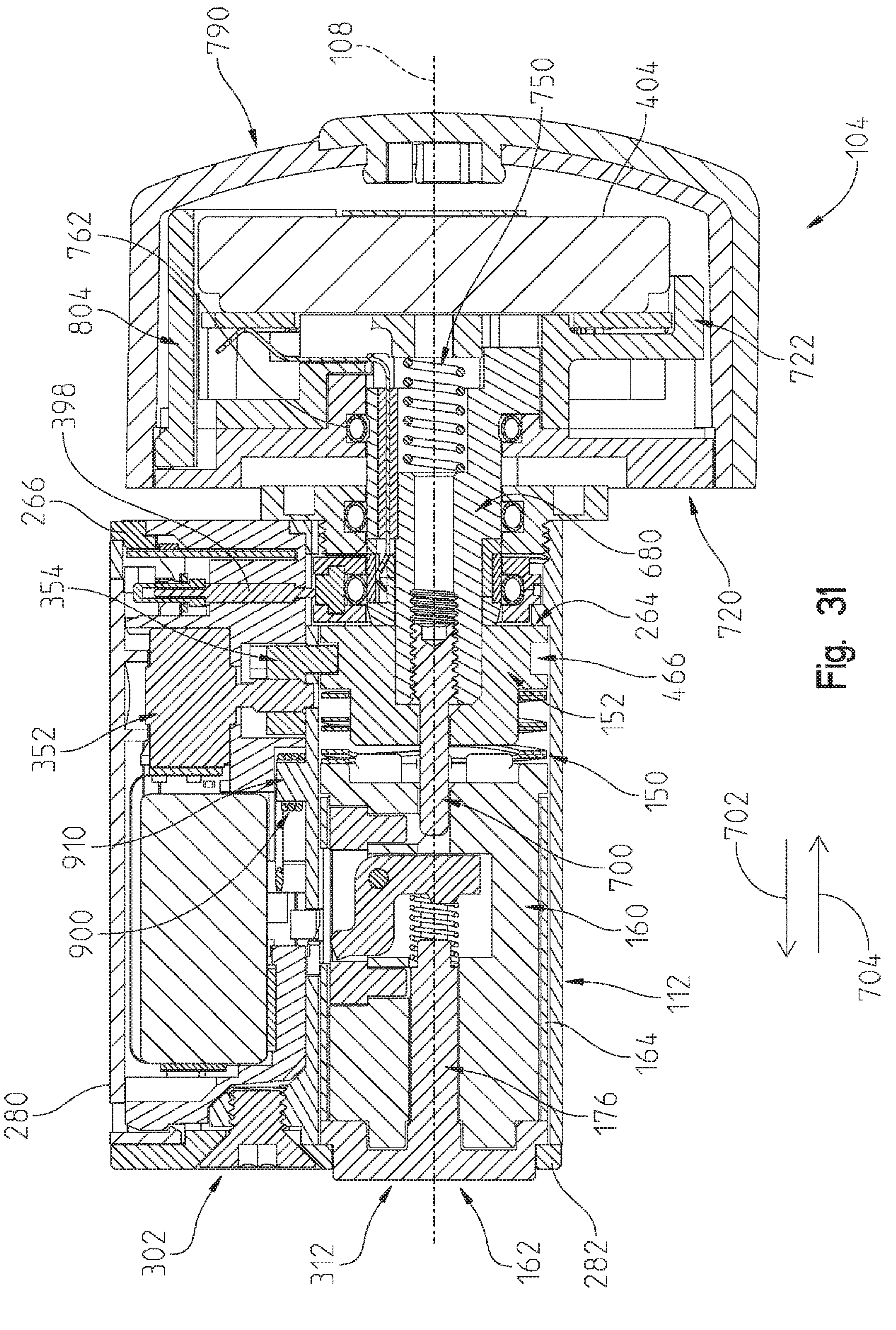
FIG. 31 illustrates the sectional view of FIG. 26 with a control pin of the operator actuation assembly positioned in an active position compared to an inactive position shown in FIG. 26.
Figure 32:
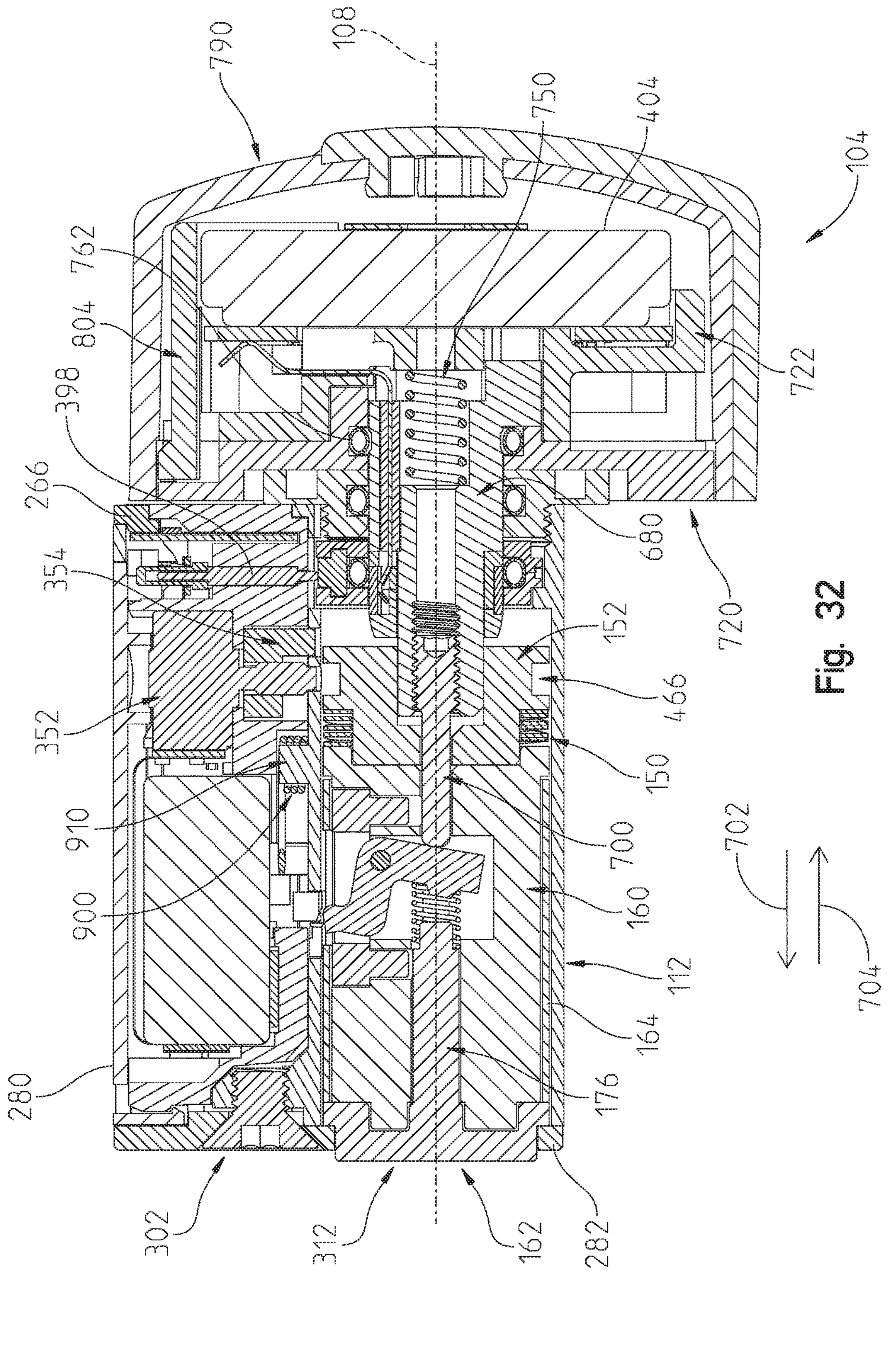
FIG. 32 illustrates the sectional view of FIG. 26 with the blocker of the control assembly in the second release position of FIG. 21 and the operator actuation assembly and clutch of the lock actuator assembly in an engaged position of the lock actuator assembly with the control pin of the operator actuation assembly positioned in the active position of FIG. 31 and moving a bell crank of the lock actuator assembly to a control position compared to a use position of FIG. 26.

FIG. 31 corresponds to FIG. 26 and FIG. 32 corresponds to FIG. 29. In FIG. 32, electro-mechanical lock core 100 is in a control position wherein control pin 700 actuates bell crank 190 to raise second leg 240 of bell crank 190 into opening 238 of control sleeve 164. With second leg 240 of bell crank 190 in opening 238 of control sleeve 164 and engagement features 156 of clutch 152 are engaged with engagement features 154 of core plug body 160, when an operator rotates operator actuation assembly 104 about longitudinal axis 108 control sleeve 164 rotates with core plug body 160 and core keeper 110 is retracted to within core body 112. With core keeper 110 retracted into core body 112, electro-mechanical lock core 100 may be removed from lock cylinder 122.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An interchangeable lock core for use with a lock device having a locked state and an unlocked state, the interchangeable lock core removable from an opening of the lock device with the aid of a tool, the interchangeable lock core comprising:

a lock core body having an exterior lock core body envelope, the lock core body including an upper lock core body section having a first cylindrical portion with a first maximum lateral extent, a lower lock core body section having a second cylindrical portion with a second maximum lateral extent, and a waist having a third maximum lateral extent, the third maximum lateral extent being less than the first maximum lateral extent and being less than the second maximum lateral extent;

a moveable plug positioned within the lower core body section, the moveable plug having a first position relative to the lock core body which corresponds to the lock device being in the locked state, and a second position relative to the lock core body, which corresponds to the lock device being in the unlocked state, the moveable plug being rotatable between the first position and the second position about a moveable plug axis;

an operator actuation assembly operable to selectively actuate the moveable plug, the operator actuation assembly moveably supported by the lock core body;

a core keeper moveably coupled to the lock core body, the core keeper positionable in a retain position, in which the core keeper extends beyond the exterior lock core body envelope to hold the lock core body in the opening of the lock device, and a remove position, in which the core keeper is retracted relative to the exterior lock core body envelope to permit removal of the lock core body from the opening of the lock device; and an actuator adjustably supported relative to the lock core body, a position of the actuator relative to the lock core body being adjustable, the actuator having an allow position, allowing the core keeper to be actuated by the moveable plug from the retain position to the remove position and, a disallow position, in which the actuator does not allow the core keeper to be actuated by the moveable plug between the retain position and the remove position, the actuator having a tool receiver adapted to be engaged with the tool such that the tool adjusts the actuator between the allow position and the disallow position, the tool receiver positioned within an exterior operator actuation assembly envelope when viewed from a direction along the moveable plug axis;

wherein the operator actuation assembly includes a cover removeable from a remainder of the operator actuation assembly to provide access to the tool receiver of the actuator.

2. The interchangeable lock core of claim 1, wherein the moveable plug axis intersects the operator actuation assembly, the exterior operator actuation assembly envelope defined about the moveable plug axis.

3. The interchangeable lock core of claim 1, further comprising:

a moveable member; and a control sleeve carrying the core keeper, the actuator operable in the allow position to position the moveable member to rotationally lock the control sleeve to the moveable plug, whereby rotational movement of the moveable plug when the control sleeve is rotationally locked to the moveable plug rotates the control sleeve to move the core keeper from the retain position to the remove position;

in the allow position, the actuator is operatively coupled to the core keeper through the moveable member and the control sleeve.

4. The interchangeable lock core of claim 1, wherein the actuator undergoes a rotation to move between the allow position and the disallow position.

5. The interchangeable lock core of claim 4, wherein the actuator undergoes both the rotation and a translation to move between the allow position and the disallow position.

6. The interchangeable lock core of claim 1, wherein the operator actuation assembly comprises a knob including a removeable knob cover selectively covering a power source located in the knob.

7. The interchangeable lock core of claim 1, further comprising:

a motor actuatable between a motor disallow position, in which the operator actuation assembly is disallowed from actuating the moveable plug, and a motor allow position, in which the operator actuation assembly is allowed to actuate the moveable plug.

8. An interchangeable lock core for use with a lock device having a locked state and an unlocked state, the interchangeable lock core being removable from an opening of the lock device, the interchangeable lock core comprising:

a lock core body having an exterior lock core body envelope;

a moveable plug positioned in the lock core body, the moveable plug having a first position relative to the lock core body, which corresponds to the lock device being in the locked state, and a second position relative to the lock core body, which corresponds to the lock device being in the unlocked state;

a core keeper moveably coupled to the lock core body, the core keeper positionable in a retain position, in which the core keeper extends beyond the exterior lock core body envelope to hold the lock core body in the opening of the lock device, and a remove position, in which the core keeper is retracted relative to the exterior lock core body envelope to permit removal of the lock core body from the opening of the lock device;

an actuator moveable relative to the core keeper, the actuator supported by the lock core body and moveable relative to the lock core body in two degrees of freedom, the actuator having a first position corresponding to the remove position of the core keeper and a second position corresponding to the retain position of the core keeper, the actuator requiring a movement in each of the two degrees of freedom to move from the second position to the first position, wherein the actuator comprises a tool receiving socket.

9. The interchangeable lock core of claim 8, wherein the movement in each of the two degrees of freedom comprises a translation and a rotation.

10. The interchangeable lock core of claim 9, whereby, after the translation, the actuator is operatively coupled to the core keeper, whereby, after the translation, the rotation of the actuator allows a rotation of the core keeper.

11. The interchangeable lock core of claim 8, wherein the actuator comprises a control pin threadedly received in at least a portion of the interchangeable lock core.

12. The interchangeable lock core of claim 8, further comprising:

a motor actuatable between a motor disallow position, in which an operator actuation assembly is disallowed from actuating the moveable plug, and a motor allow position, in which the operator actuation assembly is allowed to actuate the moveable plug.

13. An interchangeable lock core for use with a lock device having a locked state and an unlocked state, the interchangeable lock core being removable from an opening of the lock device with the aid of a tool, the interchangeable lock core comprising:

a lock core body having an exterior lock core body envelope;

a moveable plug positioned in the lock core body, the moveable plug having a first position relative to the lock core body, which corresponds to the lock device being in the locked state, and a second position relative to the lock core body, which corresponds to the lock device being in the unlocked state;

a core keeper moveably coupled to the lock core body, the core keeper positionable in a retain position, in which the core keeper extends beyond the exterior lock core body envelope to hold the lock core body in the opening of the lock device, and a remove position, in which the core keeper is retracted relative to the exterior lock core body envelope to permit removal of the lock core body from the opening of the lock device; and an actuator moveably supported relative to the lock core body, the actuator having an allow position allowing the core keeper to be actuated by the moveable plug from the retain position of the core keeper to the remove position of the core keeper, and a disallow position, in which the actuator does not allow the core keeper to be actuated by the moveable plug between the retain position and the remove position, the actuator having a tool receiver adapted to be engaged with the tool such that a rotation of the tool relative to the moveable plug will move the actuator between the allow position and the disallow position when the tool is engaged with the tool receiver.

14. The interchangeable lock core of claim 13, wherein the rotation of the tool relative to the plug to move the actuator between the allow position and the disallow position causes a linear displacement of the actuator.

15. The interchangeable lock core of claim 13, further comprising:

a moveable member; and a control sleeve carrying the core keeper, the actuator operable in the allow position to position the moveable member to rotationally lock the control sleeve to the moveable plug, whereby rotational movement of the moveable plug when the control sleeve is rotationally locked to the moveable plug rotates the control sleeve to move the core keeper from the retain position to the remove position;

in the allow position, the actuator operatively coupled to the core keeper through the moveable member and the control sleeve.

16. The interchangeable lock core of claim 13, wherein the actuator undergoes a rotation to move between the allow position and the disallow position.

17. The interchangeable lock core of claim 13, wherein the actuator undergoes both a rotation and a translation to move between the allow position and the disallow position.

18. The interchangeable lock core of claim 13, further comprising:

a motor actuatable between a motor disallow position, in which an operator actuation assembly is disallowed from actuating the moveable plug, and a motor allow position, in which the operator actuation assembly is allowed to actuate the moveable plug.

19. An interchangeable lock core for use with a lock device having a locked state and an unlocked state, the lock device including an opening sized to receive the interchangeable lock core, the interchangeable lock core comprising:

a lock core body having an interior, the lock core body including an upper portion having a first maximum lateral extent, a lower portion having a second maximum lateral extent, and a waist portion having a third maximum lateral extent, the third maximum lateral extent being less than the first maximum lateral extent and being less than the second maximum lateral extent, the lower portion, the upper portion, and the waist portion forming an envelope of the lock core body;

a moveable plug positioned within a first portion of the interior of the lock core body proximate a first end of the lock core body, the moveable plug having a first position relative to the lock core body which corresponds to the lock device being in a locked state and a second position relative to the lock core body which corresponds to the lock device being in the unlocked state, the moveable plug being rotatable between the first position and the second position about a moveable plug axis;

a core keeper moveably coupled to the lock core body, the core keeper being positionable in a retain position, in which the core keeper extends beyond the envelope of the lock core body to hold the lock core body in the opening of the lock device and a remove position, in which the core keeper is within the envelope of the lock core body to permit removal of the lock core body from the opening of the lock device;

an operator actuatable assembly including an operator actuatable input device extending beyond a second end of the lock core body, the second end being opposite the first end;

a clutch moveable between an engaged position, in which the operator actuatable assembly is operatively coupled to the moveable plug, and a disengaged position, in which the operator actuatable assembly is free-spinning relative to the moveable plug; and an actuator positionable by the clutch, the actuator having a first position relative to the clutch, in which the actuator operatively couples the clutch to the core keeper and a second position relative to the clutch, in which the actuator is incapable of operatively coupling the clutch to the core keeper.

* * * * *